(12) United States Patent  
Huebner

(10) Patent No.: US 9,179,182 B2  
(45) Date of Patent: Nov. 3, 2015

(54) INTERACTIVE MULTI-DISPLAY CONTROL SYSTEMS

(76) Inventor: Kenneth J. Huebner, Milwaukee, WI (US)

( * ) Notice: Subject to any disclaimer, the term of this patent is extended or adjusted under 35 U.S.C. 154(b) by 490 days.

(21) Appl. No.: 13/084,687

(22) Filed: Apr. 12, 2011

(65) Prior Publication Data

US 2012/0262487 A1    Oct. 18, 2012

(51) Int. Cl.
| | |
|---|---|
| *G06F 3/033* | (2013.01) |
| *G09G 5/08* | (2006.01) |
| *H04N 21/44* | (2011.01) |
| *G06F 3/01* | (2006.01) |
| *G06F 3/03* | (2006.01) |
| *G06F 3/038* | (2013.01) |
| *H04N 21/41* | (2011.01) |
| *H04N 21/422* | (2011.01) |
| *H04N 21/442* | (2011.01) |
| *G06F 3/14* | (2006.01) |

(52) U.S. Cl.
CPC ................ *H04N 21/44* (2013.01); *G06F 3/016* (2013.01); *G06F 3/038* (2013.01); *G06F 3/0325* (2013.01); *G06F 3/1423* (2013.01); *H04N 21/4122* (2013.01); *H04N 21/42222* (2013.01); *H04N 21/44218* (2013.01); *G06F 3/1446* (2013.01); *G06F 2203/0382* (2013.01); *G09G 2356/00* (2013.01)

(58) Field of Classification Search
USPC ........................................ 345/157; 341/176  
See application file for complete search history.

(56) References Cited

U.S. PATENT DOCUMENTS

| | | | | |
|---|---|---|---|---|
| 5,835,078 A | * | 11/1998 | Arita et al. ..................... | 345/158 |
| 5,938,308 A | | 8/1999 | Feldman et al. | |
| 6,131,807 A | * | 10/2000 | Fukuda et al. ................ | 235/494 |
| 6,151,424 A | * | 11/2000 | Hsu .............................. | 382/294 |
| 6,346,933 B1 | | 2/2002 | Lin | |
| 6,554,431 B1 | | 4/2003 | Binsted et al. | |
| 6,809,779 B2 | * | 10/2004 | Chang et al. .................. | 348/734 |
| 6,834,965 B2 | | 12/2004 | Raskar et al. | |
| 7,137,707 B2 | | 11/2006 | Beardsley et al. | |
| 7,562,989 B2 | * | 7/2009 | Ushiro .......................... | 353/119 |
| 7,596,466 B2 | | 9/2009 | Ohta | |
| 7,874,681 B2 | | 1/2011 | Huebner | |
| 8,723,803 B2 | * | 5/2014 | Banning ....................... | 345/169 |
| 8,907,889 B2 | * | 12/2014 | Sweetser et al. .............. | 345/156 |
| 2001/0010514 A1 | * | 8/2001 | Ishino .......................... | 345/158 |
| 2006/0072076 A1 | | 4/2006 | Smoot et al. | |
| 2006/0264260 A1 | | 11/2006 | Zalewski et al. | |
| 2007/0126864 A1 | | 6/2007 | Bhat et al. | |
| 2007/0126938 A1 | | 6/2007 | Tan et al. | |
| 2007/0216644 A1 | | 9/2007 | Nam et al. | |
| 2007/0273838 A1 | | 11/2007 | Hong et al. | |
| 2007/0282564 A1 | | 12/2007 | Sprague et al. | |
| 2008/0012824 A1 | | 1/2008 | Grunnet-Jepsen et al. | |
| 2008/0096654 A1 | | 4/2008 | Mondesir et al. | |
| 2008/0100825 A1 | | 5/2008 | Zalewski | |
| 2008/0180395 A1 | | 7/2008 | Gray | |
| 2008/0192007 A1 | | 8/2008 | Wilson | |
| 2008/0278445 A1 | | 11/2008 | Sweetser et al. | |

(Continued)

*Primary Examiner* — Kwang-Su Yang  
(74) *Attorney, Agent, or Firm* — Andrus Intellectual Property Law, LLP

(57) ABSTRACT

An interactive video control system that can control multiple displays, such as a panel image and/or a projected image using motion gestures from a moveable controller. Further, a plurality of display images may be modified such that the images appear at least partially aligned and combined. The control system may be comprised of a moveable, handheld controller and console.

28 Claims, 32 Drawing Sheets

(56) References Cited

U.S. PATENT DOCUMENTS

| | | |
|---|---|---|
| 2008/0284724 A1 | 11/2008 | Alten |
| 2009/0009469 A1 | 1/2009 | Hsu et al. |
| 2009/0015791 A1 | 1/2009 | Chang et al. |
| 2009/0040195 A1 | 2/2009 | Njolstad et al. |
| 2009/0052730 A1 | 2/2009 | Lin |
| 2009/0066646 A1 | 3/2009 | Choi et al. |
| 2009/0203445 A1 | 8/2009 | Dohta et al. |
| 2009/0207322 A1 | 8/2009 | Mizuuchi et al. |
| 2009/0241052 A1* | 9/2009 | Ha et al. .................. 715/772 |
| 2009/0249245 A1 | 10/2009 | Watanabe |
| 2009/0251559 A1 | 10/2009 | Mekenkamp et al. |
| 2009/0279107 A1* | 11/2009 | Deliwala .................. 356/623 |
| 2009/0284602 A1* | 11/2009 | Chu .......................... 348/159 |
| 2009/0315829 A1 | 12/2009 | Maison et al. |
| 2010/0013695 A1* | 1/2010 | Hong et al. ............... 341/176 |
| 2010/0103330 A1 | 4/2010 | Morrison et al. |
| 2011/0025925 A1 | 2/2011 | Hansen |
| 2011/0115823 A1* | 5/2011 | Huebner .................. 345/661 |
| 2011/0163952 A1* | 7/2011 | Hong et al. ............... 345/157 |
| 2011/0213472 A1* | 9/2011 | Clayton et al. ............ 700/11 |
| 2012/0086857 A1* | 4/2012 | Kim et al. ................ 348/563 |
| 2013/0038792 A1* | 2/2013 | Quigley et al. ........... 348/515 |

* cited by examiner

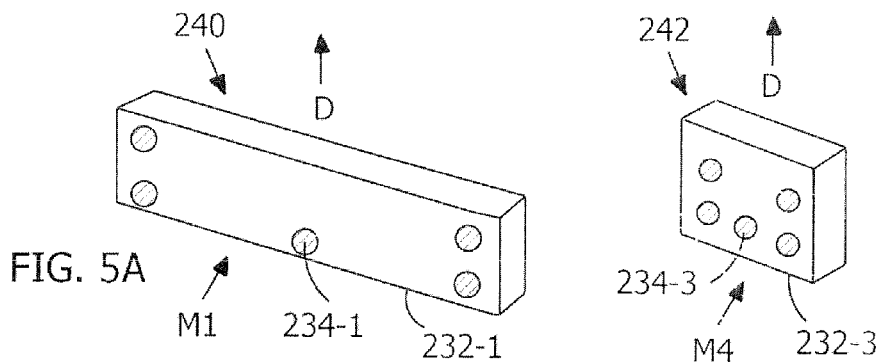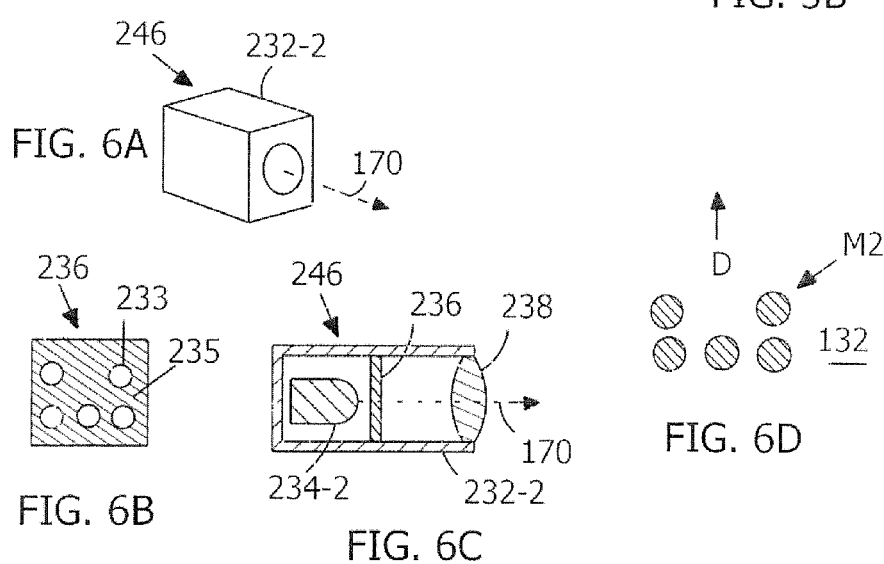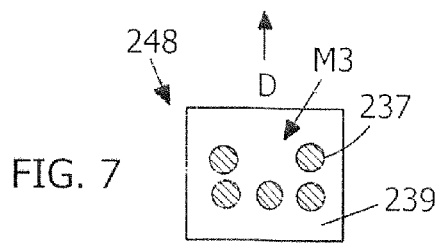

INTERACTIVE MULTI-DISPLAY CONTROL SYSTEMS

FIELD OF THE DISCLOSURE

The present disclosure generally relates to interactive video control systems. In particular, the present disclosure relates to interactive video control systems that may control multiple image displays.

BACKGROUND OF THE INVENTION

There are many types of interactive video control systems that allow a user to move a control device, often a handheld controller, which results in a displayed image to be modified. One type of controller is a video game controller, which a user moves through space to interact with a video game display. This type of controller is presently limited to interacting with a single stationary display, such as a TV screen.

Another type of video controller is a TV controller, which is typically aimed at a TV set to move a graphic cursor. Unfortunately, this controller is also limited to interacting with a single stationary display.

Manufacturers are currently making image projectors that can be embedded into handheld devices. However, these projectors tend to only project images, rather than promote user interactivity.

The end result is our homes and offices have an increasing number of image displays that remain separate and unconnected.

Therefore, an opportunity exists for a video control system that manages multiple displays. That is, in a system having more than one image display, a user may wish to control and interact with each using intuitive, motion gestures. The system may be used, for example, in the business, medical, and entertainment fields.

SUMMARY

The present invention relates to interactive video control systems that may control multiple image displays. In some embodiments of the disclosure, a control system is comprised of a handheld controller that may be waved, aimed, and clicked in 3D space by a user. The controller may control one or more panel displays (e.g., flat screen TVs) and/or projected displays (e.g., projectors with screens).

For example, when a controller is aimed at a first remote display, the display image of the first remote display is modified in respect to the controller's movement. When the controller is aimed at a second remote display, the display image of the second remote display is modified in respect to the controller's movement.

In some embodiments, a handheld controller contains an image projector that projects a controller display on a surface. When a user waves the controller in space, internal spatial sensors generate a move signal within the system enabling the controller to modify the controller display, and optionally, one or more remote displays.

For example, a handheld controller may be used to manage a video game console connected to a TV screen. When a user waves the controller through space, an animated character delightfully walks across the TV screen. When the controller is aimed at a nearby wall, the character disappears from the TV screen and reappears on the wall, creating a 3D world that extends beyond the TV screen.

Some embodiments may be comprised of a handheld controller and support devices, such as a display console.

BRIEF DESCRIPTION OF THE DRAWINGS

The drawings illustrate the best mode presently contemplated of carrying out the disclosure. In the drawings:

FIG. 5A is a perspective view of an embodiment of a marker located on a light bar emitter.

FIG. 5B is a perspective view of an embodiment of a marker located on a light array emitter.

FIG. 6A is a perspective view of an embodiment of a light beam emitter.

FIG. 6B is a front elevation view of an embodiment of a beam mask filter of the light beam emitter of FIG. 6A.

FIG. 6C is a section view of the light beam emitter of FIG. 6A.

FIG. 6D is an elevation view of a marker created by the light beam emitter of FIG. 6A.

FIG. 7 is an elevation view of an embodiment of a marker located on a light reflector.

DETAILED DESCRIPTION OF THE INVENTION

Figure 1:
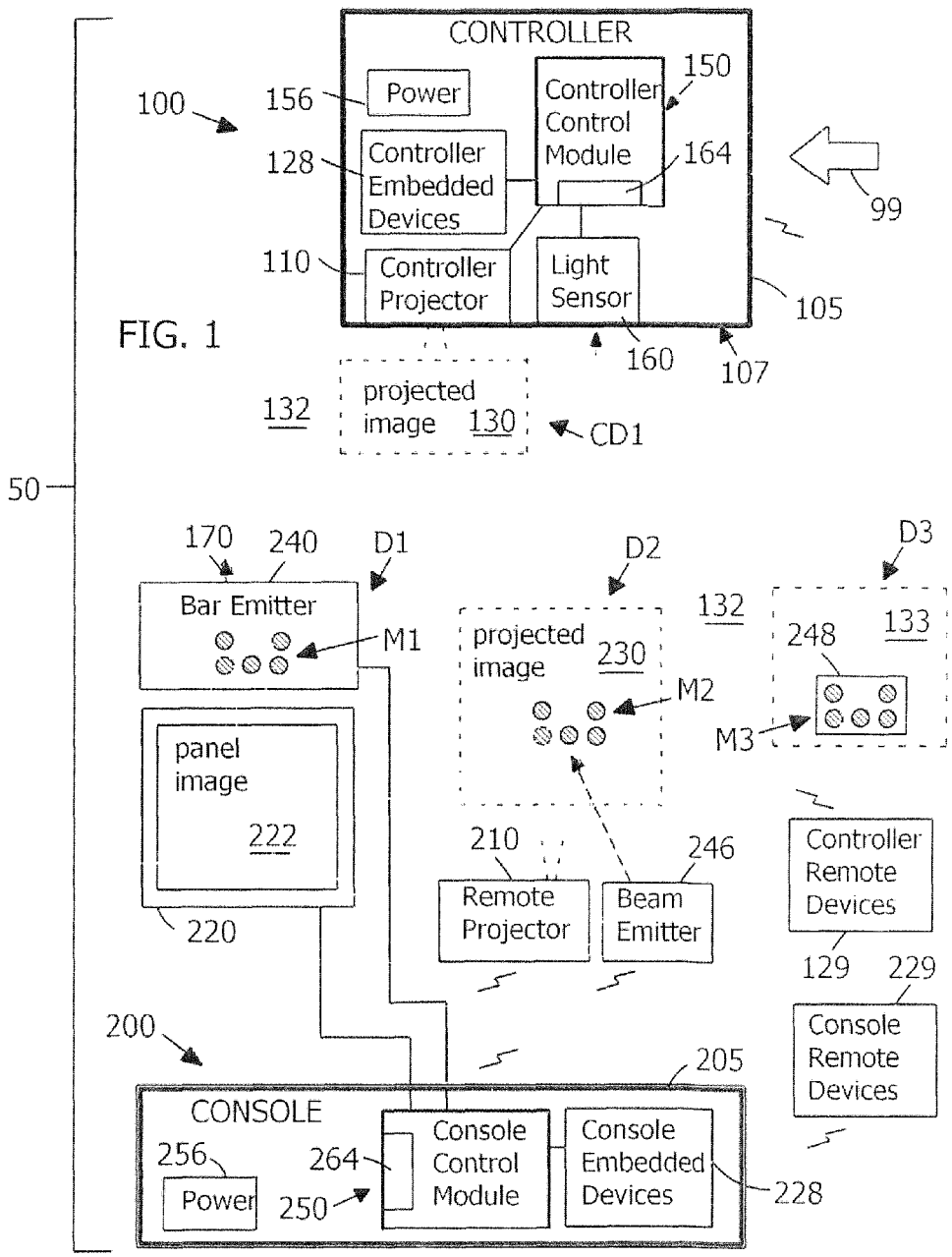
FIG. 1 is a block diagram of a first embodiment of a multi-display control system of the present disclosure.

The term "may" used throughout this application refers to having the potential to, and not in a mandatory sense (e.g., as "must"). The terms "a", "an", and "the" refers to one or more items. Where only one item is intended, the term "one" or similar language is used. The term "and/or" refers to any and all combinations of one or more of the associated list items.

The terms "component", "adapter", "module", "interface", "circuit", "program", "method", and like terms are intended to include hardware, firmware, and/or software.

The term "operatively connected" refers to a wireless and/or wired means of communication between components, unless otherwise indicated. The term "wired" refers to any kind of conduit, such as electrical wire or optical fiber.

The terms "key", "keypad" "key press" and like terms are meant to broadly include all types of user input devices and their respective action, including for example, a touch pad, gesture-sensitive camera, control button, or touch sensitive display.

The term "multimedia" refers to media rich information, such as video, graphic, audio, haptic, program instructions, and/or program data.

The term "haptic" refers to tactile stimulus presented to a user, often provided by a vibrating device when placed near the user's skin. A "haptic signal" refers to a signal that activates a haptic device.

The term "panel" generally refers to a panel TV, 3D display, tablet PC, laptop computer, or other display device capable of displaying an image on its display surface. Whereby, the terms "panel image" and "panel display" refer to an image presented by or on a panel. The panel may be any shape and dimension, planar and/or three-dimensional, such as a sphere. The panel image may be self-illuminated (e.g., liquid-crystal display) or lit by ambient light (e.g., electronic ink display).

The terms "projector" and "project" refers to an image projector or its respective action of projecting a light image onto an ambient surface. Whereby, the terms "projected image" and "projected display" generally refer to an illuminated image presented by an image projector on a projection surface. The "projection surface" may be of any shape and dimension, such as a wall or chair.

The term "image displays" refers to displays of all types, such as panel displays and/or projected displays. The term "display images" refers to images of all types, such as panel images and/or projected images.

The term "global position" refers to a controller's spatial position and/or rotation relative to the position of a position marker.

The term "display outline" refers to a display image's outer shape and spatial position.

The term "graphic object model" refers to a 2D and/or 3D model having at least one graphic object (e.g., character, tree, or house) that may be rendered on display images.

The term "point of view" (POV) refers to the perspective of the graphic object model rendered on the display image, such as image scale, position, and rotation.

The term "anisotropic" describes a graphic shape or pattern that has a distinct characteristic in a specific direction. That is, an anisotropic shape or pattern has an asymmetry along at least one axis; whereby, a direction or rotation angle may be determined as the shape is rotated. For example, a "U" shape is an anisotropic shape.

Multi-Display Control System

Turning now to the figures, FIG. 1 is a block diagram of a first embodiment of a multi-display control system 50. The control system 50 may be comprised of a handheld controller 100 and a display console 200, along with multiple image displays.

Controller

FIG. 1 shows the handheld controller 100, which may be compact and mobile, grasped and moved as shown by arrow 99 through 3D space by a user's hand (not shown). The controller 100 may alternatively be attached to a user's clothing or body and worn as well. The controller 100 may enable a user to make interactive motion, aim-and-click gestures at surrounding image displays.

The controller 100 may be comprised of, but not limited to, a controller housing 105, a power source 156, a controller projector 110, a light sensor 160, a light detect adapter 164, controller embedded devices 128, and a controller control module 150.

The housing 105 may be of handheld size (e.g., 70 mm wide×110 mm deep×20 mm thick) and made of, for example, easy to grip plastic. The housing 105 may be of any shape, e.g. a steering wheel, rifle, gun, golf club, or fishing pole.

Located at a front end 107 of controller 100 may be the controller projector 110, which can project a lighted image on a surface. Projector 110 may be a light emitting diode (LED)- or laser-based, micro electro-mechanical system (MEMS) image projector, although other types of image projectors may be used. Projector 110 is an optional component such that an alternative controller having no projector 110 could still be used to control one or more remote image displays.

The controller 100 may also be comprised of the light sensor 160 that detects light for spatial position sensing. Light sensor 160 may be comprised of a digital camera, photo detector, 3D-depth camera, and/or other light-sensitive device. Sensor 160 may be sensitive to a specific range of visible light (e.g. yellow) and/or invisible light (e.g., infrared or ultraviolet). For example, sensor 160 may be a CMOS (complementary metal oxide semiconductor)- or CCD (charge coupled device)-based camera sensitive to infrared light.

The controller embedded devices 128 are substantially contained within controller 100 and may enhance interactivity. Examples of embedded devices 128 are motion sensors, vibrators, audio speakers, mobile image displays, keypad, and pushbutton switches.

The controller remote devices 129 are substantially detached from controller 100 and may increase its capabilities. Examples of remote devices 129 are video/music players, cell phones, and computers.

The controller 100 may be managed by the controller control module 150, such as a microprocessor-based circuit that generates and distributes multimedia signals. The control module 150 may be operatively connected to, but not limited to, the controller projector 110, the light sensor 160, the controller embedded devices 128, and the controller remote devices 129.

Moreover, module 150 may include the light detect adapter 164, which provides light analysis support for the light sensor 160.

Finally, controller 100 may include the power source 156 that may provide energy to the controller control module 150, light detect adapter 164, embedded devices 128, controller projector 110, and light sensor 160. Power source 156 may be, for example, a portable battery or a power cable to an external power supply.

Some embodiments of the controller may be integrated with and integral to an appliance, such as a mobile phone or video/music player.

Some embodiments of the controller may not be limited to only handheld usage. For example, some embodiments of the controller may be integrated with and integral to an appliance, such as a vehicle, robot, or toy.

Some embodiments of the controller may contain a plurality of light sensors 160 and/or projectors 110 for enhanced capability.

Finally, system 50 may be comprised of a plurality of controllers 100, where each controller may control and modify one or more image displays.

Display Console

FIG. 1 shows the control system 50 may be further comprised of the display console 200 that acts as a support device and may be located, for example, on a floor or table. The console 200 may be a dedicated control device, or the console 200 may be integrated with and integral to an appliance, such as but not limited to a TV set top box, video player, game console, projector, or display panel.

Console 200 may be comprised of, but not limited to, a console housing 205, a console control module 250, a light emit adapter 264, console embedded devices 228, and a power supply 256.

The console housing 205 may be of various dimension and shapes. For example, housing 205 may be of compact size (e.g., 80 mm wide×100 mm high×20 mm thick).

The console 200 may be managed by the console control module 250, such as a microprocessor-based circuit that generates and distributes multimedia signals. The control module 250 may be operatively connected to, but not limited to, console embedded devices 228, and console remote devices 229.

Moreover, module 250 may include the light emit adapter 264, which supports light signal generation.

Finally, console 200 may have power source 256 that may provide energy to the console control module 250, the light emit adapter 264, and embedded devices 228. Power source 256 may be, for example, a portable battery or a power cable to an external power supply.

Alternative console embodiments may not be limited to only stationary devices. For example, an alternate console may be integrated with and integral to an appliance, such as a cell phone, video/audio player, vehicle, robot, and/or toy.

Finally, system 50 may alternatively be comprised of a plurality of consoles 200, operatively connected and forming a scalable network for improved system performance.

Controller Display CD1—Projected Image from Controller

Figure 2:
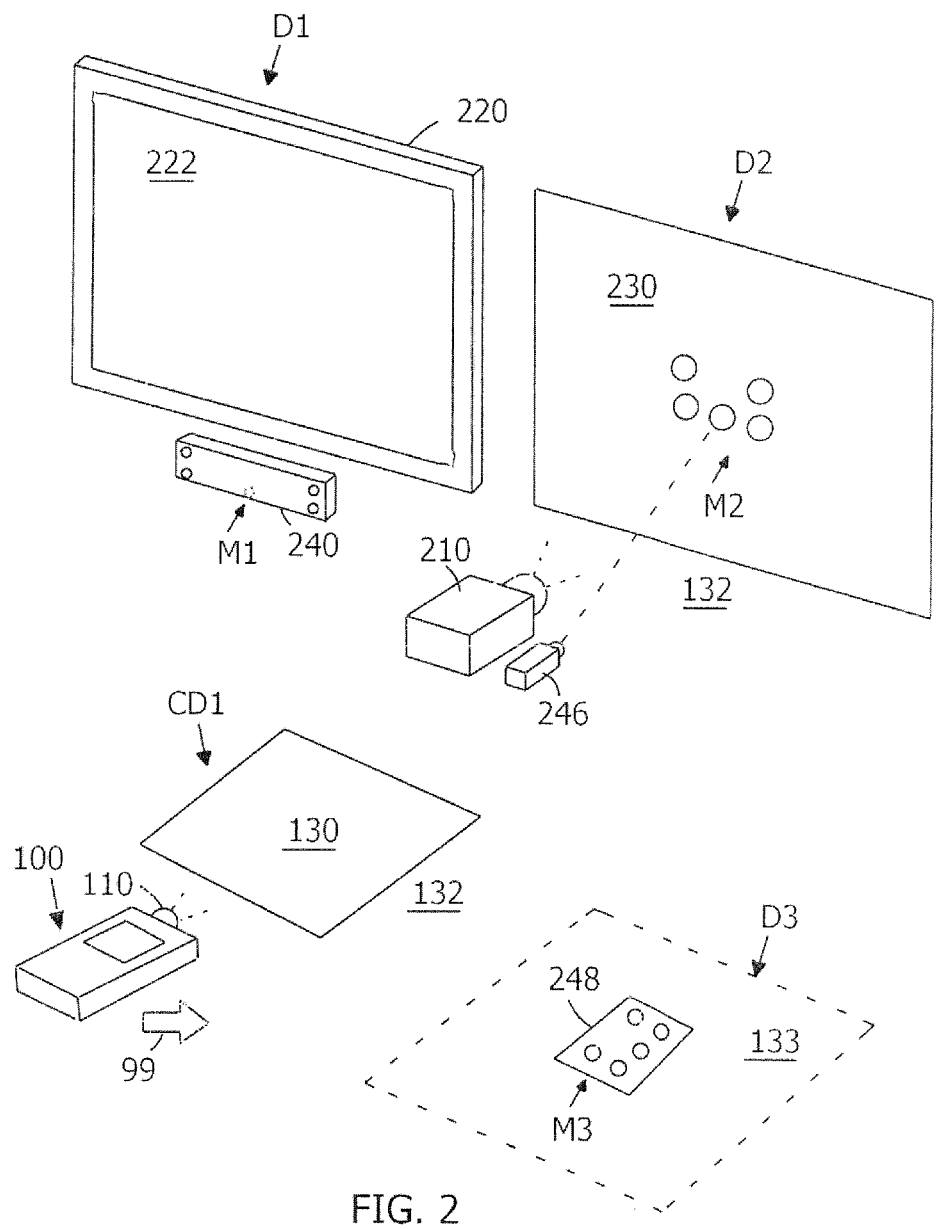
FIG. 2 is a perspective view of exemplary display embodiments of the control system of FIG. 1, such as a controller display, a remote panel display, a remote projected display, and an imaginary display.

Turning now to FIGS. 1 and 2, some image display embodiments are presented, although other types of image displays may be considered. FIGS. 1 and 2 show a controller display CD1 that may be comprised of a projected image 130 on a projection surface 132 being illuminated by the controller projector 110 within controller 100. As the handheld controller 100 is moved in the direction shown by arrow 99 through space by a user (not shown), the projected image 130 may move across a wall, table, or other surface.

Remote Panel Display D1—Panel Image with Light Bar Emitter

FIGS. 1 and 2 show a remote panel display D1 may be comprised of a panel image 222, a display panel 220, an active position marker M1, and a light bar emitter 240. The panel image 222 is created by panel 220, such as a TV set. The panel 220 may be liquid crystal display (LCD)- or organic light emitting diode (OLED)-based, although other display types may be used.

The position marker M1 emits and/or reflects light and optically indicates the position of remote display D1 relative to controller 100. Marker M1 may be located substantially nearby or overlap the panel image 222. Marker M1 may be generated by the light bar emitter 240 comprised of one or more light sources.

An alternate remote display, similar to display D1, may be comprised of a display panel having an integral light bar emitter. Whereby, the display panel generates marker M1.

Remote Projected Display D2—Projected Image with Light Beam Emitter

FIGS. 1 and 2 show a remote projected display D2 that may be comprised of a projected image 230, a remote projector 210, an active position marker M2, and a light beam emitter 246. The projected image 230 is illuminated on the projection surface 132 or like surface by the remote projector 210. Projector 210 may be incandescent-, LED-, or laser-based, although other types of projectors may be used. Projector 210 may be located anywhere in the user's environment, such as ceiling mounted.

The position marker M2 emits and/or reflects light from surface 132 and optically indicates the position of display D2 relative to controller 100. Marker M2 may be located substantially nearby or overlap image 230. Marker M2 may be generated by light beam emitter 246 comprised of one or more light sources.

An alternative display embodiment may be comprised of an alternative projector and alternative light beam emitter, such that the light beam emitter is integral to the projector such that the projector generates marker M2 on surface 132.

Remote Imaginary Display D3—Defined Surface with Light Reflector

FIGS. 1 and 2 show a display having no image, referred to as a remote imaginary display D3 comprised of a defined surface 133 and a passive position marker M3 located on a light reflector 248. The defined surface 133 may coincide with, but not limited to, the projection surface 132 or alternate surface.

The position marker M3 emits and/or reflects light from surface 133 and optically indicates the position of display D3 relative to controller 100. Marker M3 may be located substantially nearby or overlapping the imaginary display D3. Marker M3 is created by the light reflector 248, which reflects ambient light and/or artificial light from the system.

Alternative Configurations for the Multi-Display System

As presented earlier in FIG. 1, the control system 50 may control and modify displays D1, D2, and D3. In some alternative configurations, control system 50 may control and modify one display, or a plurality of displays. Further, in some alternative configurations, system 50 may utilize one type of display, such as projected displays, or combinations of displays, such as projected, panel, and/or imaginary displays. Further, in some alternative configurations, system 50 may utilize one type of marker, such as passive markers (e.g., light reflectors), or combinations of markers such as active and/or passive markers.

As can be seen in FIGS. 1 and 2, the position markers M1, M2, and M3 are associated with displays D1, D2, and D3, respectively. However, in some alternative configurations the system may have one position marker associated with a plurality of image displays. In other alternative configurations, the system may have a plurality of position markers associated with one image display.

The position markers M1, M2, and M3 of FIGS. 1 and 2 may be used interchangeably. For example, in an alternative configuration, passive marker M3 and light reflector 248 may replace marker M1 and bar emitter 240, such that marker M3 is located nearby or overlapping display D1. In another alternative configuration, passive marker M3 and light reflector 248 may replace marker M2 and beam emitter 246, such that marker M3 is located nearby or overlapping display D2. In yet another alternative configuration, active marker M2 (along with beam emitter 246) may replace marker M1, such that marker M2 is located nearby or overlapping display D1.

For enhanced tracking of a passive marker (such as reflector 248 of FIG. 1), the control system 50 of FIG. 1 may have an alternative controller similar to controller 100 but may be further comprised of at least one light emitter that illuminates (e.g., with visible and/or invisible light) one or more passive markers, such as marker M3 on light reflector 248.

If substantially all passive markers are utilized, an alternative control system may be constructed similar to control system 50 of FIG. 1 having the light detect adapter 164 and light sensor 160, but where the light emit adapter 264 and light emitters 240 and 246 have been removed from the system. Whereby, the alternative control system may rely on its light detect adapter and light sensor to detect one or more passive markers, such as marker M3 on light reflector 248.

Finally, the control system 50 of FIG. 1 may have an alternative standalone controller, similar to controller 100 but substantially contained in its housing 105 is the display console 200. In such an embodiment, controller 100 and console 200 may be integrated as a standalone controller with substantially combined capabilities.

Controller Control Module—Details

As shown earlier, FIG. 1 shows the controller 100 may be comprised of the controller control module 150.

Figure 3:
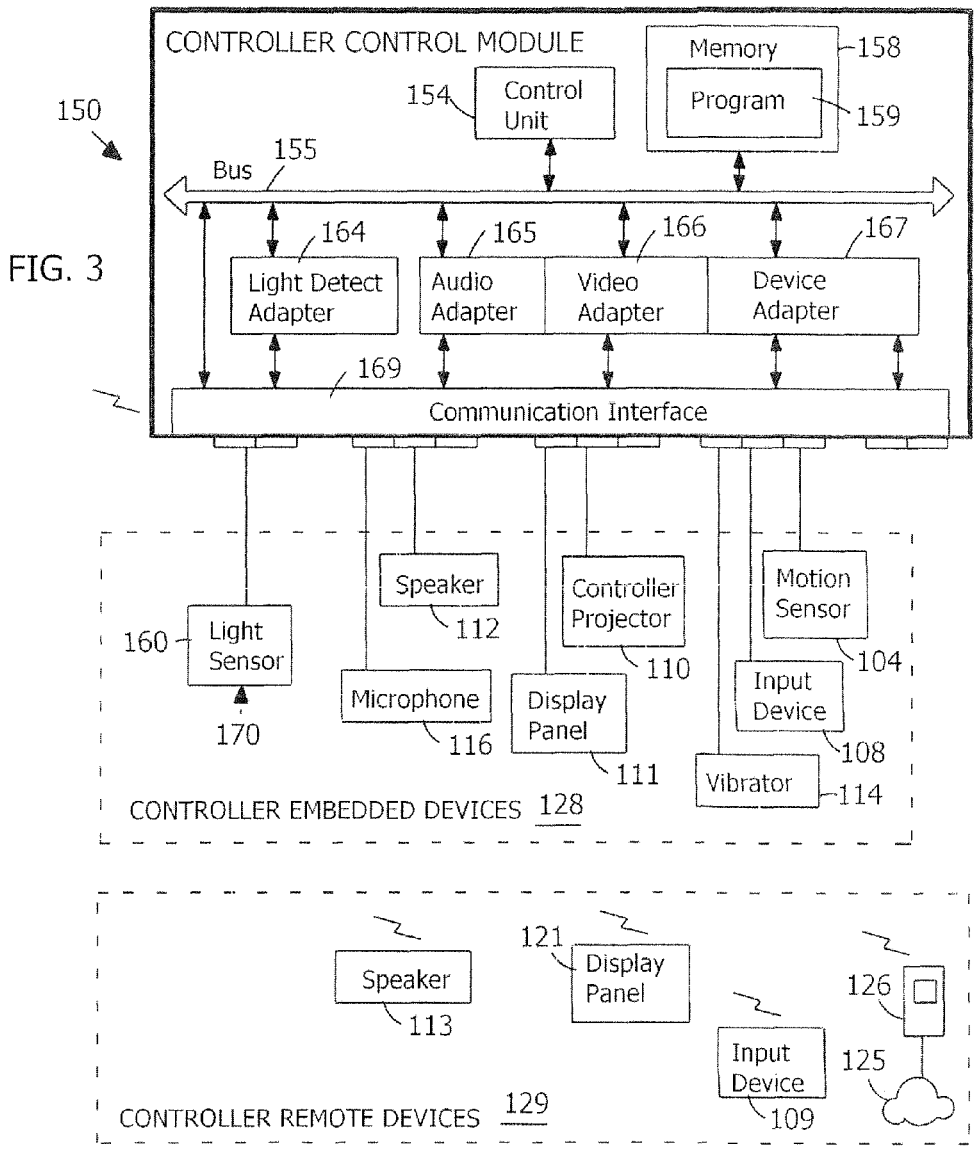
FIG. 3 is a block diagram of an embodiment of a controller control module of the control system of FIG. 1, along with embodiments of controller embedded devices and controller remote devices.

Turning now to FIG. 3, there presented is a detailed block diagram of the controller control module 150. Module 150 may be comprised of, but not limited to, a control unit 154, a memory 158, a program 159, a bus 155, the light detect adapter 164, an audio adapter 165, a video adapter 166, a device adapter 167, and a communication interface 169.

As can be seen in both FIGS. 1 and 3, the control module 150 may be operatively connected, via wired and/or wireless communication, to embedded devices 128 and remote devices 129.

FIG. 3 further shows examples of controller embedded devices 128, such as the light sensor 160, the controller projector 110, a speaker 112, a microphone 116, a mobile display panel 111, a motion sensor 104, a user input device 108, and a haptic vibrator 114.

FIG. 3 also shows examples of controller remote devices 129, such as a remote speaker 113, a remote display panel 121, a remote input device 109, a multimedia appliance 126, and a data network 125.

Speakers 112 and 113 may be able to receive discrete audio signals and generate audible sound. Speaker 112 may use wired communication, while remote speaker 113 may use wireless communication to receive audio signals.

Microphone 116 may be able to receive ambient sound waves and transmit an audio signal using wired communication.

Controller projector 110 may be able to receive a video signal by wired communication and project an image.

Display panels 111 and 121 may be able to receive video signals and display images. Panel 111 may use wired communication, while panel 121 may use wireless communication to receive the video signals.

Input devices 108 and 109 may be able perceive user touch and/or user gestures and transmit user input signals. Input device 108 may use wired communication, while remote input device 109 may use wireless communication to transmit input signals. Examples of input devices 108 and 109 are control buttons, keypads, and gesture-sensitive cameras.

Vibrator 114 is able to receive a haptic signal by wired communication and generate tactile stimulus for a user. Vibrator 114 may be any type of haptic device, such as an electric vibrator.

The motion sensor 104 may be able to detect spatial movement and transmit a move signal, for example, using wired communication. The motion sensor 104 may be comprised of one or more spatial sensors, such as an accelerometer, an electronic compass (e.g., magnetometer), a gyroscope, a spatial triangulation sensor, and/or a global positioning system (GPS) receiver, as illustrative examples.

The multimedia appliance 126 may wirelessly (or optionally by wire) transmit and/or receive a data signal. Further, appliance 126 may be operatively connected to the data network 125 (e.g., internet, local area network (LAN), cable network, and/or cell phone network). Examples of multimedia appliances 126 are music/video players, PC tablets, TV set-top boxes, routers, computers, and cell phones.

FIG. 3 shows the control unit 154 may manage activities of module 150. The control unit 154 may be comprised of, for example, at least one microprocessor or microcontroller having appreciable processing speed (e.g., 1 ghz) to execute program instructions.

The bus 155 transfers data signals and may be operatively connected to, but not limited to, the control unit 154 and control module 150 components, such as memory 158, adapters 164-167, and interface 169. Thus, the control unit 154 may control the control module 150 components, devices 128, and/or devices 129. Further, the control module's 150 components, devices 128, and/or devices 129 may notify the control unit 154 of system states (e.g., user input).

Memory 158 may be a computer-readable media for storing a program 159. Memory 158 may be RAM, ROM, Flash, or hard drive, although other memory types in whole, part, or combination may be used, including fixed or removable, volatile or nonvolatile memory.

Program 159 may be comprised of computer executable instructions (e.g., operating system and applications) and/or data (e.g., multimedia).

The communication interface 169 may provide wired and/or wireless communication with devices 128 and 129. Interface 169 may be comprised of, but not limited to, processing units, codecs, antennae, and data transceivers, all of which are not shown for sake of brevity.

For wired communication, interface 169 may provide one or more wired interface connections (e.g., coaxial, optical fiber, High-Definition Multimedia Interface (HDMI), component video and audio, and/or USB).

For wireless communication, interface 169 may use modulated electromagnetic waves of one or more frequencies (e.g., RF, infrared, visible) and/or modulated audio waves of one or more frequencies (e.g., ultrasonic, audible, or infrasonic). Interface 169 may use wireless communication circuits adapted from current art. For example, a wireless video circuit may be constructed from wireless video transmitters and receivers (e.g., Amimon AMN2120/AMN2220 WHDI IC).

Interface 169 may use various wired and/or wireless communication protocols (e.g., TCP/IP, WiFi, Zigbee, Bluetooth, USB, Ethernet, Wireless Home Digital Interface (WHDI), and/or cellular telephone).

The video adapter 166 may provide module 150 with video signal generation, processing, and/or recording capability. The adapter 166 may operatively connect to interface 169, which may operatively connect to projector 110 and display panels 111, 121. Adapter 166 may be comprised of, but not limited to, processing units, codecs, and/or memory, all of which are not shown for sake of brevity. Further, interface 169 may provide wired and/or wireless video communication with one or more embedded devices 128 (e.g., projector 110, panel 111) and/or remote devices 129 (e.g., panel 121, appliance 126). One or more discrete video signals may be processed by adapter 166 and interface 169. Adapter 166 may be implemented using various video circuits adapted from current art. For example, U.S. Patent Application 2009/0141011 describes a multi-display video circuit, the disclosure of which is incorporated herein by reference.

The audio adapter 165 may provide module 150 with audio signal generation, processing, and/or recording capability. Adapter 165 may operatively connect to interface 169, which may operatively connect to speakers 112, 113 and microphone 116. Adapter 165 may be comprised of, but not limited to, processing units, codecs, and/or memory, all of which are not shown for sake of brevity. Further, interface 169 may provide wired and/or wireless audio communication with one or more embedded devices 128 (e.g., speaker 112, microphone 116) and/or remote devices 129 (e.g., speaker 113, appliance 126). One or more discrete audio signals may be processed by adapter 165 and interface 169. Adapter 165 may be implemented from audio signal circuits adapted from current art.

The light detect adapter 164 may provide module 150 with functionality for detection of a light sensor's view, image view analysis, and/or computing a controller position. Adapter 164 may operatively connect to interface 169, which may operatively connect to light sensor 160. Adapter 164 may be comprised of, but not limited to, processing units, codecs, and memory, all of which are not shown for sake of brevity. Further, interface 169 may provide wired and/or wireless view signal communication with one or more embedded devices 128 (e.g. light sensor 160) and/or remote devices 129. One or more discrete light view signals may be processed by adapter 164 and interface 169. Adapter 164 may be constructed from light detection circuits and view analysis functions adapted from current art.

The device adapter 167 may provide module 150 with device input/output (I/O) signal generation, processing, and/or recording capability. Adapter 167 may operatively connect to the communication interface 169, which may operatively connect to the motion sensor 104, vibrator 114, user input devices 108 and 109, and multimedia appliance 126. Adapter 167 may be comprised of, but not limited to, processing units, codecs, and/or amplifiers, all of which are not shown for sake of brevity. Further, interface 169 may provide wired and/or wireless I/O communication with one or more embedded devices 128 (e.g., motion sensor 104, input device 108, vibrator 114) and/or remote devices 129 (e.g., input device 109, multimedia appliance 126). One or more discrete I/O signals may be processed by adapter 167 and interface 169. Adapter 167 may be implemented from I/O signal circuits adapted from current art.

Alternative embodiments of the controller control module 150 may be considered. Components of module 150 may be added, removed, and/or combined, in part or whole. For example, the light detect adapter 164 may be removed and replaced with executable view analysis functions defined in program 159. In such an embodiment, the control unit 154 may provide light view analysis and compute a controller position for the system.

Some alternative embodiments may not require video support, such as a controller that does not have the controller projector 110. In such an embodiment, the video adapter 166, controller projector 110, and panel 111 may be removed from the system.

Alternative arrangements, types, and numbers of embedded devices 128 and remote devices 129, having wireless and/or wired communication with module 150, may be used.

Console Control Module—Details

As described earlier, FIG. 1 shows the console 200 may be comprised of the console control module 250.

Figure 4:
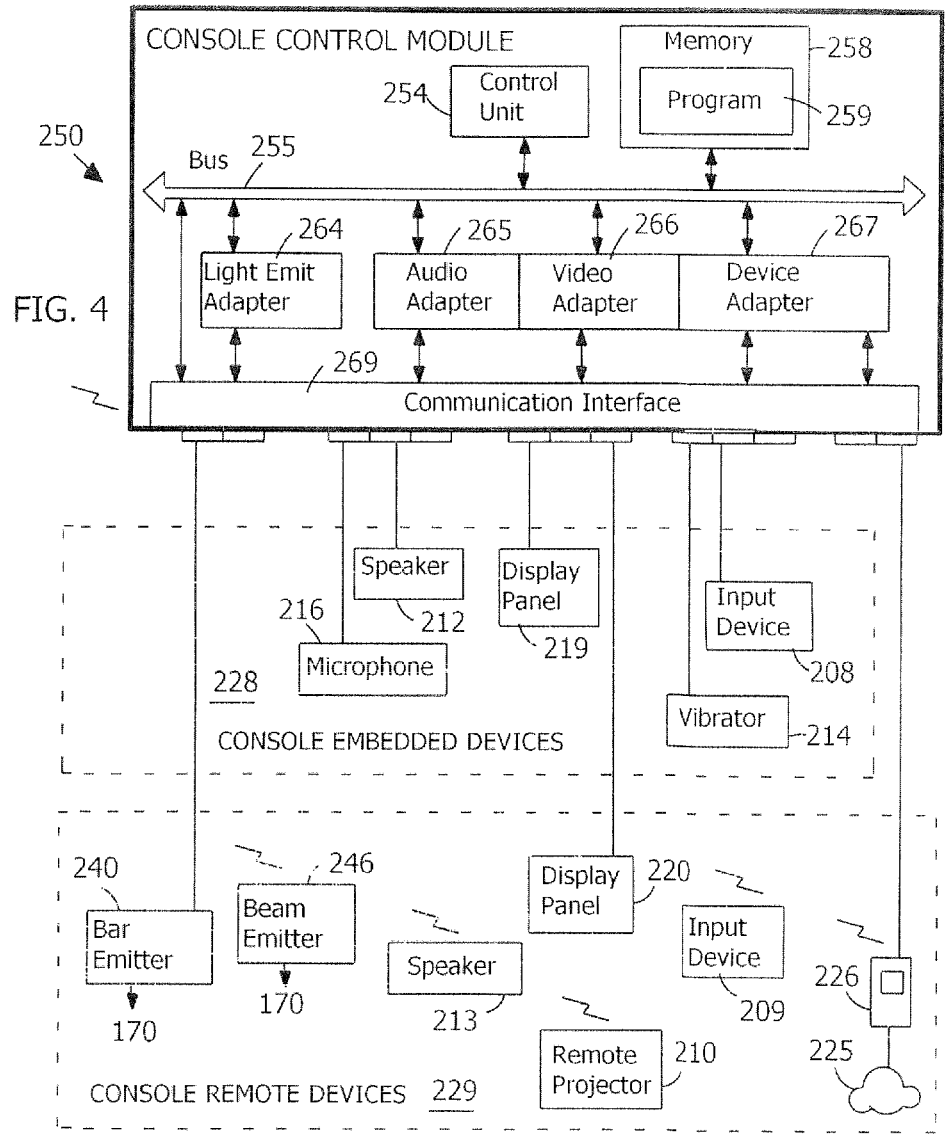
FIG. 4 is a block diagram of an embodiment of a console control module of the control system of FIG. 1, along with an embodiments of console embedded devices and console remote devices.

Turning now to FIG. 4, there presented is a detailed block diagram of the console control module 250. Module 250 may be comprised of, but not limited to, a control unit 254, a memory 258, a program 259, a bus 255, the light emit adapter 264, an audio adapter 265, a video adapter 266, a device adapter 267, and a communication interface 269.

As the reader may recognize, FIG. 4 indicates the console control module 250 may be substantially similar in construction and function to the controller control module (reference numeral 150 in FIG. 3), except the previously disclosed light detect adapter has been replaced with the light emit adapter 264, which allows the console control module 250 to generate light emit signals. In addition, module 250 may be able to generate, process, and/or record one or more discrete video, audio, and/or device I/O signals. That is, the control unit 254, memory 258, program 259, bus 255, audio adapter 265, video adapter 266, device adapter 267, and communication interface 269 may be substantially similar in construction and function to the previously mentioned control unit (reference numeral 154 of FIG. 3), memory (reference numeral 158 of FIG. 3), program (reference numeral 159 of FIG. 3), bus (reference numeral 155 of FIG. 3), audio adapter (reference numeral 165 of FIG. 3), video adapter (reference numeral 166 of FIG. 3), device adapter (reference numeral 167 of FIG. 3), and communication interface (reference numeral 169 of FIG. 3), respectively.

As can be seen in both FIGS. 1 and 4, the console control module 250 may be operatively connected, via wired and/or wireless communication, to console embedded devices 228 and console remote devices 229.

FIG. 4 further shows examples of console embedded devices 228, such as a speaker 212, a microphone 216, a compact display panel 219, a user input device 208, and a vibrator 214.

FIG. 4 also shows examples of console remote devices 229, such as the light beam emitter 246, the light bar emitter 240, a remote speaker 213, the remote projector 210, the display panel 220, a remote input device 209, a multimedia appliance 226, and a data network 225.

Many of the embedded devices 228 and remote devices 229 may be substantially similar in construction and function as the embedded and remote devices (reference numerals 128 and 129 of FIG. 3) of the controller control module. For example, the speaker 212, remote speaker 213, microphone 216, input device 208, vibrator 214, multimedia appliance 226, and data network 225 may be substantially similar in construction and function to the previously mentioned speaker (reference numeral 112 of FIG. 3), remote speaker (reference numeral 113 of FIG. 3), microphone (reference numeral 116 of FIG. 3), input device (reference numeral 108 of FIG. 3), vibrator (reference numeral 114 of FIG. 3), multimedia appliance (reference numeral 126 of FIG. 3), and data network (reference numeral 125 of FIG. 3), respectively.

Moreover, the remote projector 210 may be able to wirelessly receive a video signal and project an image. Display panels 219 and 220 may be able to receive by wire discrete video signals and present display images.

The light bar emitter 240 and the light beam emitter 246 may be able to receive discrete light emit signals and generate light 170. Emitter 240 may use wired communication, while emitter 246 may use wireless communication to receive light emit signals.

Finally, the light emit adapter 264 may provide module 250 with light emit signal generation capability. Adapter 264 may operatively connect to interface 269, which may operatively connect to light emitters 240 and 246. Adapter 264 may be comprised of but not limited to, processor units, switches, and amplifiers, all of which are not shown for sake of brevity. Further, interface 269 may provide wired and/or wireless light emit signal communication with at least one embedded device 228 and/or remote device 229 (e.g., emitters 240 and 246) At least one discrete light emit signal may be generated by adapter 264 and transmitted by interface 269 to at least one light emitter, such as emitter 240 or 246. Adapter 264 may be constructed from light generation and modulation circuits adapted from current art.

Alternative embodiments of the console control module 250 may be used. Components of module 250 may be added, removed, and/or combined, in part or whole. For example, the light emit adapter 264 may be replaced by emit signal functions defined in program 259, such that control unit 254 may provide emit signals to light emitters.

Alternative arrangements, types, and numbers of embedded devices 228 and remote devices 229, having wireless and/or wired communication with module 250, may be used.

Position Markers

Now turning to FIGS. 5A-7, some exemplary active and passive position marker embodiments are presented, although alternative types of position markers may be used. Active position markers generally have dedicated light emitters that provide detectable light, while passive position markers may rely on ambient light or a non-dedicated light source for illumination. FIG. 5A shows a perspective view of the active position marker M1 located on light bar emitter 240. Emitter 240 is comprised of a housing 232-1 of compact size (e.g., 150 mm W×40 mm H×70 mm D) having one or more illuminators 234-1 that are detectable by a light sensor (not shown).

Illuminators 234-1 may emit light and be LED- and/or laser-based with light wavelengths in the visible light (e.g., white) and/or invisible light (e.g., infrared, ultraviolet), although alternative types of illuminators may be used. For example, illuminators 234-1 may be comprised of LEDs that emit infrared light. Multiple illuminators 234-1 may form an anisotropic shape or pattern; whereby, a light sensor (not shown) may perceive a full 360-degree rotation of marker M1. As shown, marker M1 has five illuminators 234-1 that form a "U" shape, having a visual direction D detectable by a light sensor (such as light sensor 160 of FIG. 1).

FIG. 5B shows a perspective view of an active position marker M4 located on a light array emitter 242. The light array emitter 242 is comprised of a housing 232-3 of compact size (e.g., 30 mm W×20 mm H×10 mm D) having a compact arrangement of illuminators 234-3. The light array emitter 242 may be constructed similar to the previously described light bar emitter (reference numeral 240 in FIG. 5). Illuminators 234-3 may form an anisotropic shape or pattern of light, such as the "U" shaped position marker M4, having a detectable, visual direction D.

FIG. 6A shows a perspective view of the light beam emitter 246 having a housing 232-2 (e.g., 20 mm W×20 mm H×50 mm D) that emits light 170. FIG. 6B shows a top view of a beam mask filter 236 that may be made of, for example, a thin, clear plastic sheet lithographically printed with a light opaque region 235 and a light transparent region 233.

FIG. 6C provides a section view of emitter 246 comprised of the beam mask filter 236, along with an optical lens 238 and at least one illuminator 234-2. The illuminator 234-2 may be LED- or laser-based and emit visible and/or invisible light (e.g., infrared light), although alternative types of illuminators may be considered. During operation, illuminator 234-2 may emit light filtered by filter 236, transmitted by lens 238, and projected forward as light 170.

The result can be seen in FIG. 6D, where the active position marker M2 is illuminated on the surface 132, such as a wall. Marker M2 may form an anisotropic shape or pattern such that its rotation angle or visual direction D may be detected with a light sensor (not shown).

An alternative beam emitter may have filter 236 replaced with an optical diffraction element and illuminator 234-2 replaced with a coherent light source, such as a laser.

FIG. 7 shows an elevation view of the passive position marker M3 located on light reflector 248. Reflector 248 may be comprised of light reflective indicia 237 (e.g., retro-reflectors, mirrors, reflective ink) substantially located (e.g., printed, embossed, or molded) on a substrate 239, such as a plastic or paper sheet, although other types of indicia and substrates may be considered, including alternative 2D and/or 3D shapes. The reflector 248 may have an adhesive applied to its backside (not shown) such that it can be attached to any surface, such as a wall or image display. Reflector 248 may reflect ambient light and/or artificial light and be detectable by a light sensor (such as light sensor 160 of FIG. 1). Moreover, the reflector's indicia 237 may form a distinctive shape or pattern, such as an anisotropic shaped marker M3, having a detectable visual direction D.

Alternative position markers may be comprised of other types of anisotropic shapes or patterns, such a "V" shape, "T" shape, etc. having a detectable visual direction.

Other alternative position markers may be comprised of graphic shapes or patterns that are not anisotropic. For example, a linear "--" shape is a substantially isotropic shape (symmetrical on more than one axis) having multiple detectable visual directions. Whereby, the control system may rely on its motion sensors (e.g., accelerometer and electronic compass) to determine the controller's rotation angle relative to an isotropic position marker.

Though not shown in FIGS. 5A-7, each position marker may further have a unique light shape, pattern, or optical machine-readable identifier (e.g., 1D or 2D barcode). Whereby, each position marker located nearby or overlapping a display may uniquely identify the display to the control system. Alternatively, or in combination, each active position marker (e.g. shown in FIGS. 5A-6D) may emit light that is modulated and encoded with a unique identifier so that each active position marker located nearby or overlapping a display may uniquely identify the display to the control system.

Finally, the active position markers of FIGS. 5A-6D may require an internal battery (not shown) and/or external power cable (not shown) to provide energy to their respective illuminators. For example, while referring back to FIG. 1, the bar emitter 240 may be connected by a power cable to the console control module 250, such that marker M1 may be illuminated.

Basic Operations of the Multi-Display Control System

Continuing with FIG. 1, the controller 100 and the console 200 may share operational tasks of the system. That is, both the controller control module 150 and the console control module 250 may communicate tasks and data during operation of system 50.

To present a controller display, the controller control module 150 may facilitate video signal communication with controller projector 110, such that module 150 may control and modify the projected image 130 of the controller display CD1.

To present remote displays, the console control module 250 may facilitate video signal communication with display panel 220 and wireless remote projector 210. Thus, module 250 may control and modify the panel image 222 and the projected image 230 of remote displays D1 and D2, respectively.

For controlling the displays, system 50 may determine the position and movement of controller 100 in respect to the displays, such as displays D1, D2, and D3. To accomplish this, the system may go through the following, but not limited to, exemplary operation:

First, the system may illuminate a position marker in the vicinity of a display. For example, the console control module 250 may activate the light emit adapter 264, which transmits a light emit signal to the wireless beam emitter 246. Emitter 246 then generates light for position marker M2 near display image 230.

Then to detect the position marker M2, the controller control module 150 may activate its light detect adapter 164, which activates the controller's light sensor 160. The light sensor 160 may observe the illuminated position marker M2 and transmit a light view signal to the light detect adapter 164.

Whereupon, the light detect adapter 164 may convert the view signal into a "photograph" or image view and store the view in memory. The view may be comprised of pixels, where each pixel has an x-y coordinate and a light intensity value.

The light detect adapter 164 may proceed to convert the view's light pattern into a controller's global position in 3D space. This may be accomplished by using computer vision techniques adapted from current art, such as edge detection, pattern analysis, and camera pose estimation.

For example, adapter 164 may use an edge detection method to segment the view into light blobs or regions of brightly lit pixels. The light blobs may be used to identify the marker using pattern identification methods (e.g., hausdorff distance or 2D barcode scan functions) adapted from current art. The blobs x-y pixel coordinates may then be used as input to a camera pose estimation method that computes a spatial position of the light sensor 160 relative to the observed marker M2.

Hence, the control system's adapter 164 may determine a controller global position relative to the position marker M2. Further, the controller's motion sensor information may augment the computation of the controller global position.

Then in FIG. 1, the controller control module 150 may take receipt of the controller global position from the adapter 164. Whereupon, the controller control module 150 transmits the position to the console control module 250 of the console 200.

Finally, the console control module 250 may modify the image 230 of the display D2 to correspond to the movement and position of controller 100.

Computing a Controller Global Position

Figure 8A:
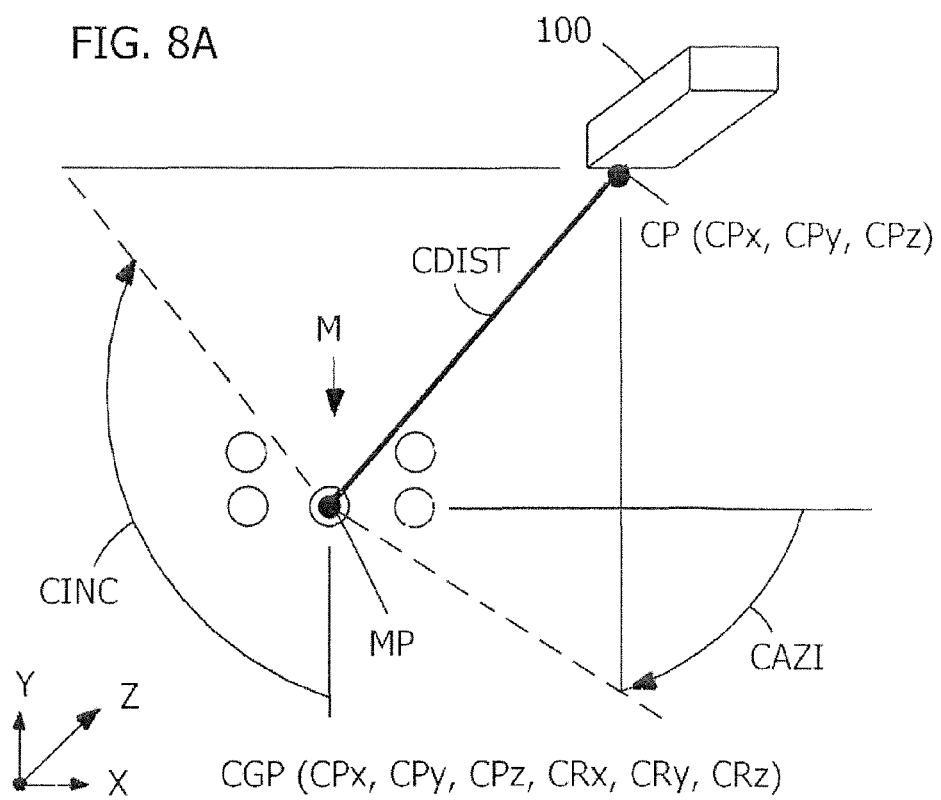
FIG. 8A is a diagram defining a controller translational position for the control system of FIG. 1.
Figure 8B:
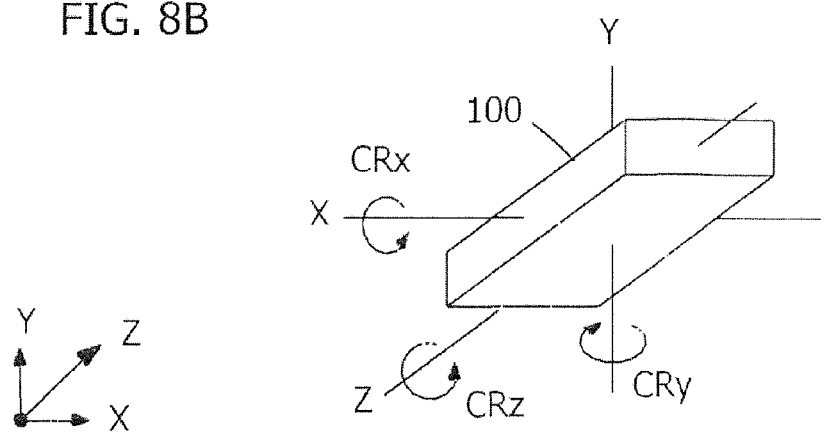
FIG. 8B is a diagram defining a controller rotation position for the control system of FIG. 1.

A method to compute the controller's global position is presented, but alternative methods may work as well. FIGS. 8A and 8B present diagrammatic views of controller 100 in 3D Cartesian space defined by an x-y-z coordinate system.

FIG. 8A shows the translational position of the controller 100 relative to a marker position MP of a marker M. The marker position MP may defined as the origin of the x-y-z coordinate system, where MP=(0, 0, 0).

A controller position CP may be computed as a point in 3D Cartesian space relative to the marker position MP, where CP=(CPx, CPy, CPz) represents x-y-z spatial coordinates.

A controller azimuth CAZI may be computed as an angle in 3D polar space relative to the marker's x-axis, having a range of $0° \leq CAZI \leq 180°$.

A controller inclination CINC may be computed as an angle in 3D polar space relative to the marker's y-axis, having a range of $0° \leq CINC \leq 180°$.

A controller distance CDIST may be computed as a distance in 3D space relative to the marker position MP.

FIG. 8B shows the rotational position of the controller 100 in respect to the x-y-z coordinate system.

A controller x-axis rotation angle CRx or pitch angle may be computed having a range of $-180° \leq CRx < +180°$.

A controller y-axis rotation angle CRy or yaw angle may be computed having a range of $-180° \leq CRy < +180°$.

A controller z-axis rotation angle CRz or roll angle may be computed having a range of $-180° \leq CRz < +180°$.

Hence, the system may compute the controller's 100 rotational position CRP, where CRP=(CRx, CRy, CRz).

Finally, a controller global position CGP may be a composite of both translational and rotational coordinates:

$$CGP=(CPx, CPy, CPz, CRx, CRy, CRz).$$

During computation, there may exist a controller global position for each controller and position marker. For example, if the system is comprised of two controllers and three position markers, a total of six controller global positions may be computed.

The controller global position CGP is obtained from information contained in a light view or "photograph" of a position marker in 3D space. So turning now to FIGS. 9A-9G, there presented are example light views of various poses relative to the position marker M. The light views show the position marker M as observed by a light sensor (as shown in FIG. 1, reference numeral 160) within a controller. The dashed lines in FIGS. 9A-9G are provided to assist the reader and are not observed by the light sensor.

Figure 9A:
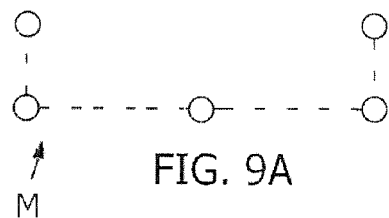
FIG. 9A is an elevation view of a light view of a marker from a close range.
Figure 9B:
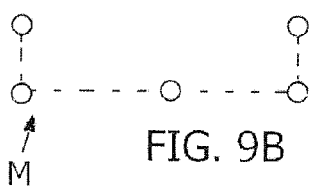
FIG. 9B is an elevation view of a light view of a marker from a distant range.

FIG. 9A shows a light view from the controller positioned near marker M, while FIG. 9B shows a light view from the controller positioned farther away from marker M. As suggested, the observed size of marker M may be used to compute the controller distance CDIST (in FIG. 8A).

Figure 9C:
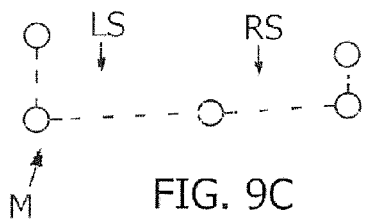
FIG. 9C is an elevation view of a light view of a marker near a left side.
Figure 9D:
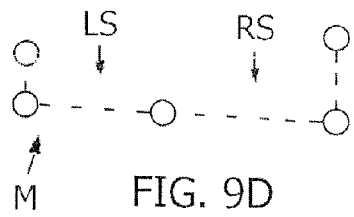
FIG. 9D is an elevation view of a light view of a marker near a right side.

FIG. 9C shows a light view where the controller is left of marker M causing foreshortening of a right side RS in respect to a left side LS of marker M. FIG. 9D shows a light view when the controller is right of marker M causing foreshortening of the left side LS in respect to the right side RS of marker M. As suggested, the controller azimuth angle CAZI may be computed (as in FIG. 8A).

Figure 9E:
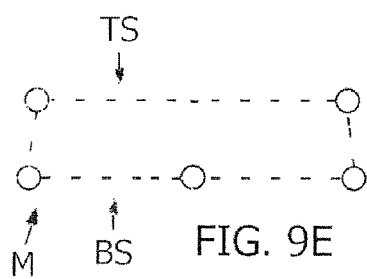
FIG. 9E is an elevation view of a light view of a marker near a bottom side.
Figure 9F:
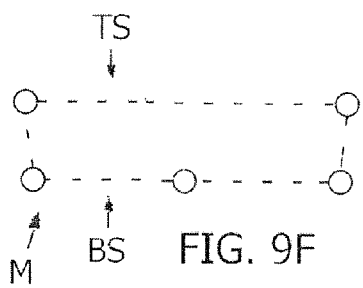
FIG. 9F is an elevation view of a light view of a marker near a top side.

FIG. 9E shows a light view where the controller is below marker M causing foreshortening of a top side TS in respect to a bottom side BS of marker M. FIG. 9F shows a light view when the controller is above marker M causing foreshortening of the bottom side BS in respect to the top side TS of marker M. As suggested, the controller inclination angle CINC may be computed (as in FIG. 8A).

Figure 9G:
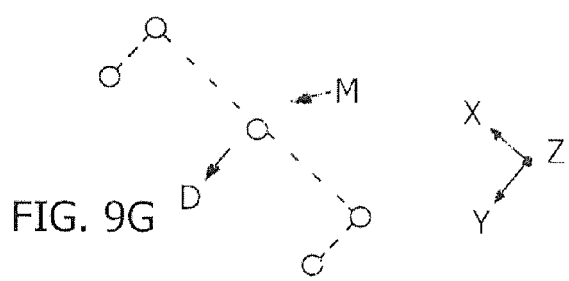
FIG. 9G is an elevation view of a light view of a marker rotated on an orthogonal axis.

Finally, FIG. 9G shows a light view where the controller has been rotated in space in respect to marker M. As suggested, the visual direction D of marker M is detectable and the controller's rotation angles CRx, CRy, and CRz may be determined (as in FIG. 8B).

Computing a Controller Aim Point

Figure 10:
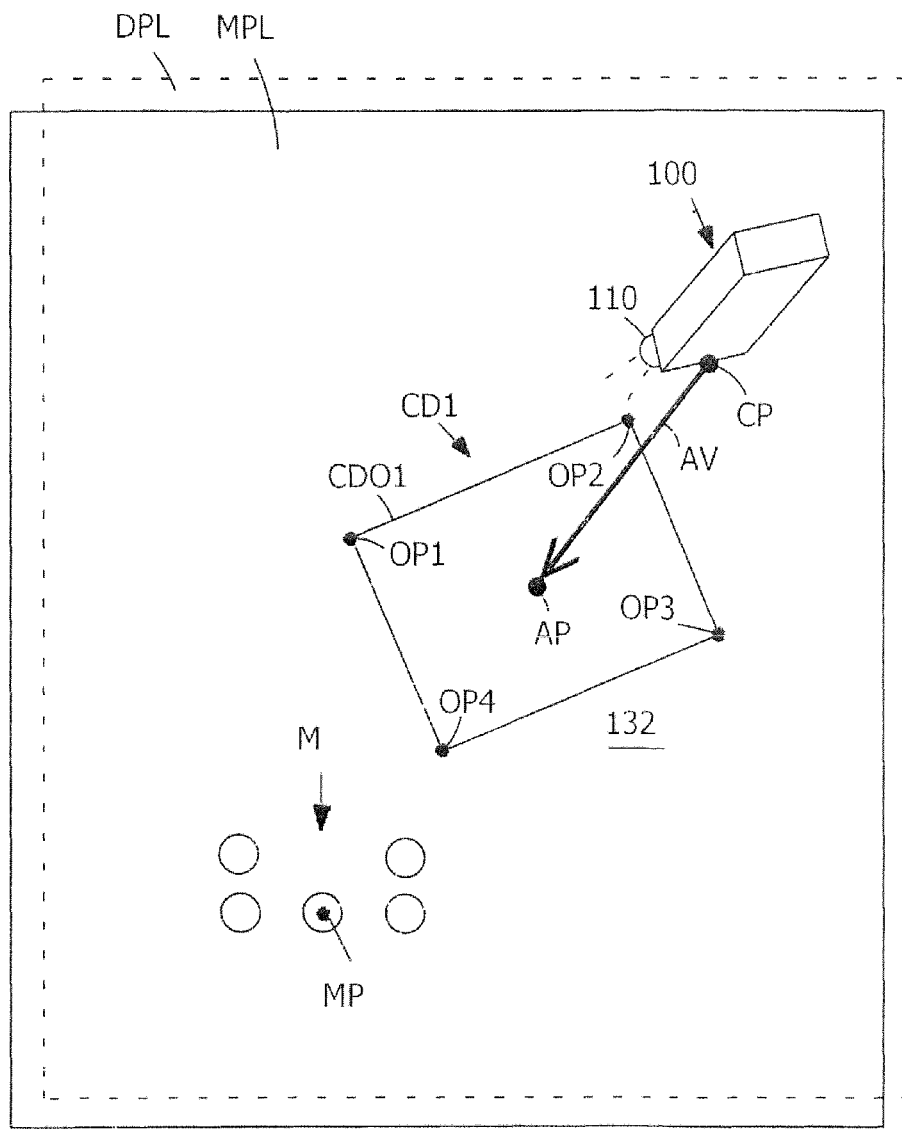
FIG. 10 is a diagram of a controller aim point for the control system of FIG. 1.

A method to compute the controller's aim point on a display surface is presented, but alternative methods may work as well. FIG. 10 shows a diagram of controller 100 at a controller position CP having an aim vector AV. The aim vector AV is a 3D spatial vector that extends from controller position CP to an aim point AP, which coincides with a marker plane MPL and a display plane DPL.

The marker plane MPL is a plane on which a position marker M resides. The display plane DPL is a plane on which the surface of an image display (not shown) resides.

The aim point AP may be computed as a point in 3D space that exists on the marker plane MPL and display plane DPL, relative to the marker position MP, where exemplary formulas read:

$$AP_x = [((\tan(CR_y) \cdot CP_z) + CP_x) \cdot \cos(CR_z)] - [((\tan(CR_x) \cdot CP_z) + CP_y) \cdot \sin(CR_z)]$$

$$AP_y = [((\tan(CR_x) \cdot CP_z) + CP_y) \cdot \cos(CR_z)] + [((\tan(CR_y) \cdot CP_z) + CP_x) \cdot \sin(CR_z)]$$

$$AP_z = CP_z$$

$$AP = (AP_x, AP_y, AP_z)$$

Computing a Controller Display Outline

FIG. 10 presents a diagram that shows a controller display outline CDO1, which is the outline of a controller display CD1. As can be seen, the controller 100 having the projector 110 creates the controller display CD1 on surface 132. Projector 110 may create a light beam having a predetermined horizontal throw angle (e.g., 30 degrees) and vertical throw angle (e.g. 20 degrees). Whereby, the controller display outline CDO1 may be computed using trigonometric functions adapted from current art. Input parameters to the trigonometric functions, for example, may include controller global position CGP, aim point AP, and projector 110 throw angles. Thus, the controller display outline CDO1 comprised of outline points OP1, OP2, OP3, and OP4 may be computed.

Overview of Methods for the Control System

Methods to operate the multi-display control system and all other control system embodiments disclosed herein are presented, but alternative methods may be considered as well. The methods may be implemented as a list of computer executable instructions stored in a computer-readable media (e.g., RAM, ROM, hard disk, or compact disk) and executed by one or more control modules (e.g., reference numerals 150 and 250 of FIG. 1). Further, though the disclosed methods may designate a specific control module for method execution, this in no way should limit the scope of invention, as alternative method embodiments may designate method execution to alternate control modules.

Some methods may enable the exchange of data among devices (e.g., controllers, consoles, etc.) using a command message for system-wide data-synchronization.

Object-oriented programming may be used. For example, an "Object" may be defined in system memory as having behavior and attributes that represent a real-world object.

Method notation follows program code conventions. One dimensional array variables have a label followed by a bracketed term, such as "Outline[D]" where a D array item is selected. Two-dimensional array variables have a label followed by two bracketed terms, such as "Outline[C, D]" where a D array item in a C array is selected.

Finally, since the control system may be reconfigured by the user, methods are provided such that new controllers and displays may be added to the system.

Start the Multi-Display Control System

Referring briefly to FIG. 1, the console 200 may begin its operation, for example, when a user presses a pushbutton switch (not shown) on console 200 causing energy from power source 256 to flow to control module 250 and embedded devices 228. Further, the controller 100 may begin its operation, for example, when a user presses a pushbutton switch (not shown) on the controller 100, causing energy from power source 156 to flow to control module 150 and embedded devices 128. The control modules 150 and 250 may then begin to execute program methods. For example, the console control module 250 may execute the main method (presented in FIG. 11).

Main Method for Operating the Multi-Display System

Figure 11:
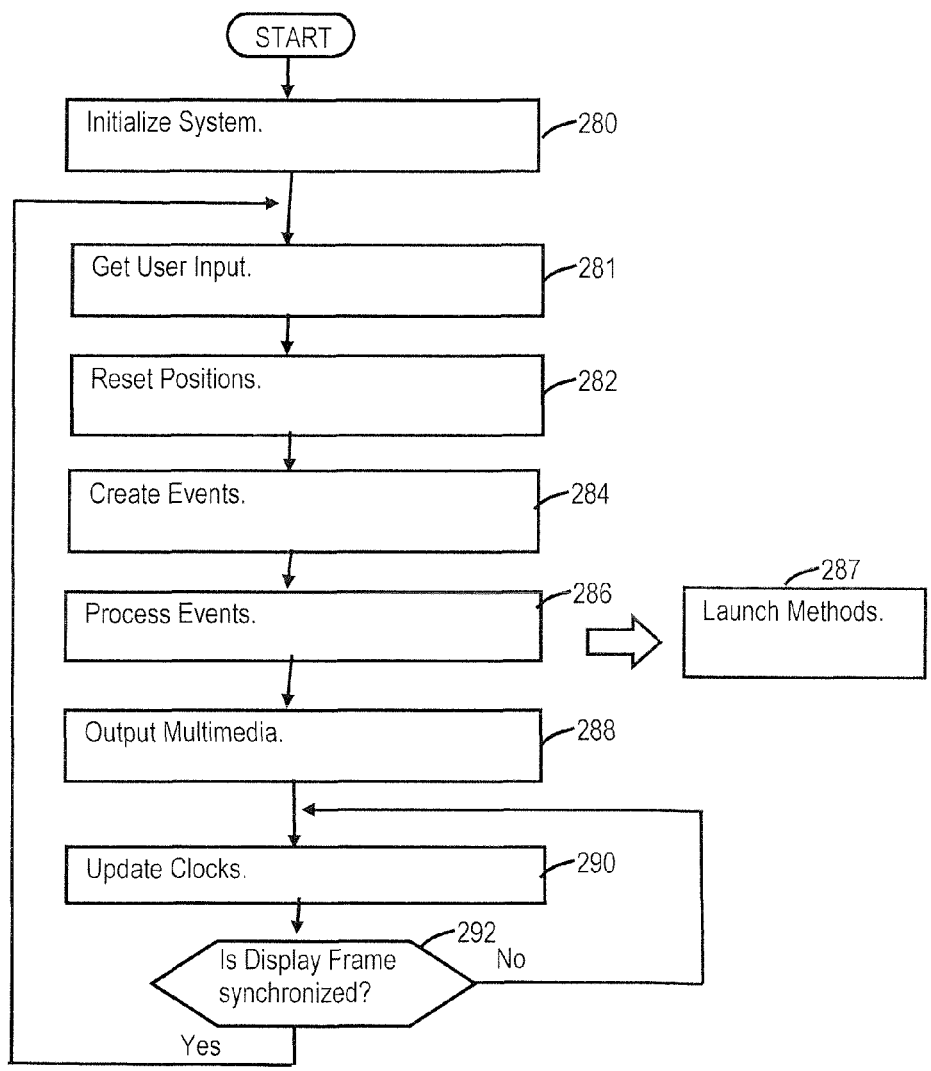
FIG. 11 is a flow diagram of a main method of operation for the system of FIG. 1.

Turning to FIG. 11, a main method for operating the system is presented. At least one control module (e.g., reference numeral 250 and/or reference numeral 150 in FIG. 1) may execute this method such as, for example, the console control module (e.g., reference numeral 250 in FIG. 1).

In step 280, a control module (e.g., reference numeral 250 in FIGS. 1 and 4) may allocate memory, build data structures, and load default data. The control module may create default "Console Object 1", which is a logical description in memory of a console. Console Object 1 attributes are set, such as a Console ID=1, Console Type, etc.

The control module may create default Controller Object 1, which is a logical description in memory of a handheld controller. The Controller Object 1 attributes are set, such as Controller ID=1, Controller Type, etc. Controller Object 1 may be added to an Active Controller List, which is an ordered list of all Controller Objects registered with the system.

The control module may create a default Display Object 1, which is a logical description in memory of an image display. The Display Object 1 attributes are set, such as Display ID=1, Display Type, etc. Display Object 1 may be added to an Active Display List, which is an ordered list of all Display Objects registered with the system.

The control module may also create a default Marker Object 1, which is a logical description in memory of a position marker. The Marker Object 1 attributes are set, such as Marker ID=1, Marker Type, etc. Marker Object 1 may be added to an Active Marker List, which is an ordered list of all Marker Objects registered with the system.

Finally, the control module may transmit an "Initialize System" command for system-wide data synchronization, so all devices are informed of system start. The command may include a copy of Console Object 1, Controller Object 1, Display Object 1, Marker Object 1, and other default data.

In step 281, the control module may receive user input data (e.g., button press) from all controllers and consoles; whereupon, input data is stored in memory. The control module may receive motion data from all controllers; whereupon, motion data is stored in memory.

In step 282, the control module may compute positions (e.g. global positions, aim points, etc.) for all controllers; whereupon, position data is stored in memory. The control module may compute all display outlines and clipped outlines, and display images are aligned for best visual effect.

In step 284, the control module may create action events; whereupon, event data is stored in memory. An "event" is a logical description in memory of an action, such as a controller key was pressed.

In step 286, the control module may process the events.

In step 287, in response to specific events, the control module may launch (e.g., as threads or processes) one or more methods that execute concurrently with the method of FIG. 11, For example, the control module may launch a method to add a controller, add a display, calibrate a display, etc.

In step 288, the control module may render display graphics (e.g., PNG file) in off-screen memory. The control module may then transfer display graphics to at least one video adapter for video signal output to one or more image displays.

The control module may also transfer audio data (e.g., MP3 file) to at least one audio adapter for audio signal output to one or more speakers.

The control module may also transfer haptic data (e.g., wave data) to at least one device adapter for haptic signal output to one or more vibrators.

In step 290, the control module may update clocks and timers so the system operates in a time-coordinated manner.

Finally, in step 292, if the control module determines that the graphic display frame is synchronized (e.g., every ⅓₀ of a second), then loop to method step 280 to repeat the process. Otherwise, the control module's method goes back to step 290 to wait for the clocks to update, assuring smooth display animation.

Method for Adding a Controller to the System

Figure 12:
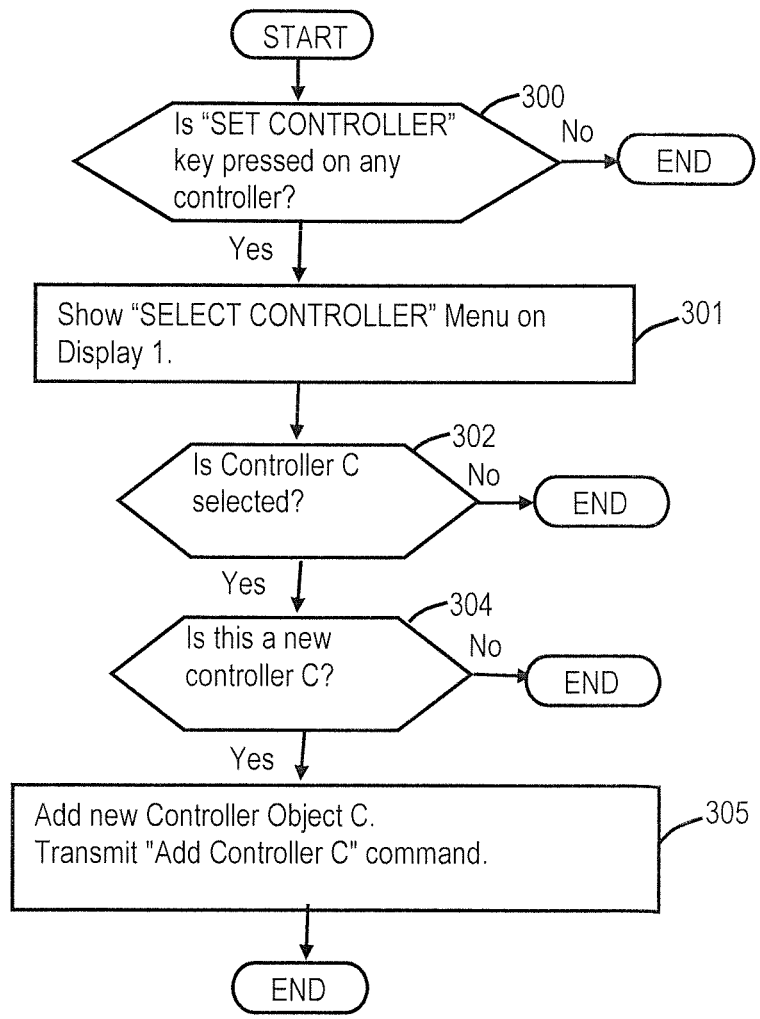
FIG. 12 is a flow diagram for registering an additional controller with the system of FIG. 1.

Turning to FIG. 12, a flow diagram is presented for adding a new handheld controller to the system.

In step 300, if a control module (e.g., FIG. 4 reference numeral 250 or FIG. 3 reference numeral 150) detects a controller's "Set Controller" key was pressed by a user, continue to step 302. Otherwise, the method ends.

In step 302, the control module shows a message "Select Controller" on default display 1. In addition, an option menu is presented with a list of controller IDs, such as "1", "2", "3", "4", and "Exit."

In step 303, if the user scrolls down the option menu using a controller's keypad and selects a controller C (e.g., "2"), then skip to step 304. Otherwise, the "Exit" option was selected and the program ends.

In step 304, if the control module determines this is a new, unregistered controller C, then continue to step 305. Otherwise, the program ends.

In step 305, the control module may create a new Controller Object C, where C is a unique identifier (e.g., "2"), along with attributes such as a Controller Type, etc.

Then Controller Object C may be added to the Active Controller List. The control module may transmit "Add Controller C" command with a copy of the Controller Object C for system-wide data synchronization, so all devices are aware of the added handheld controller.

Alternative methods may allow any number of controllers to be registered. Alternative methods may include an operation to remove a controller from the system.

Method for Adding a Display to the System

Figure 13A:
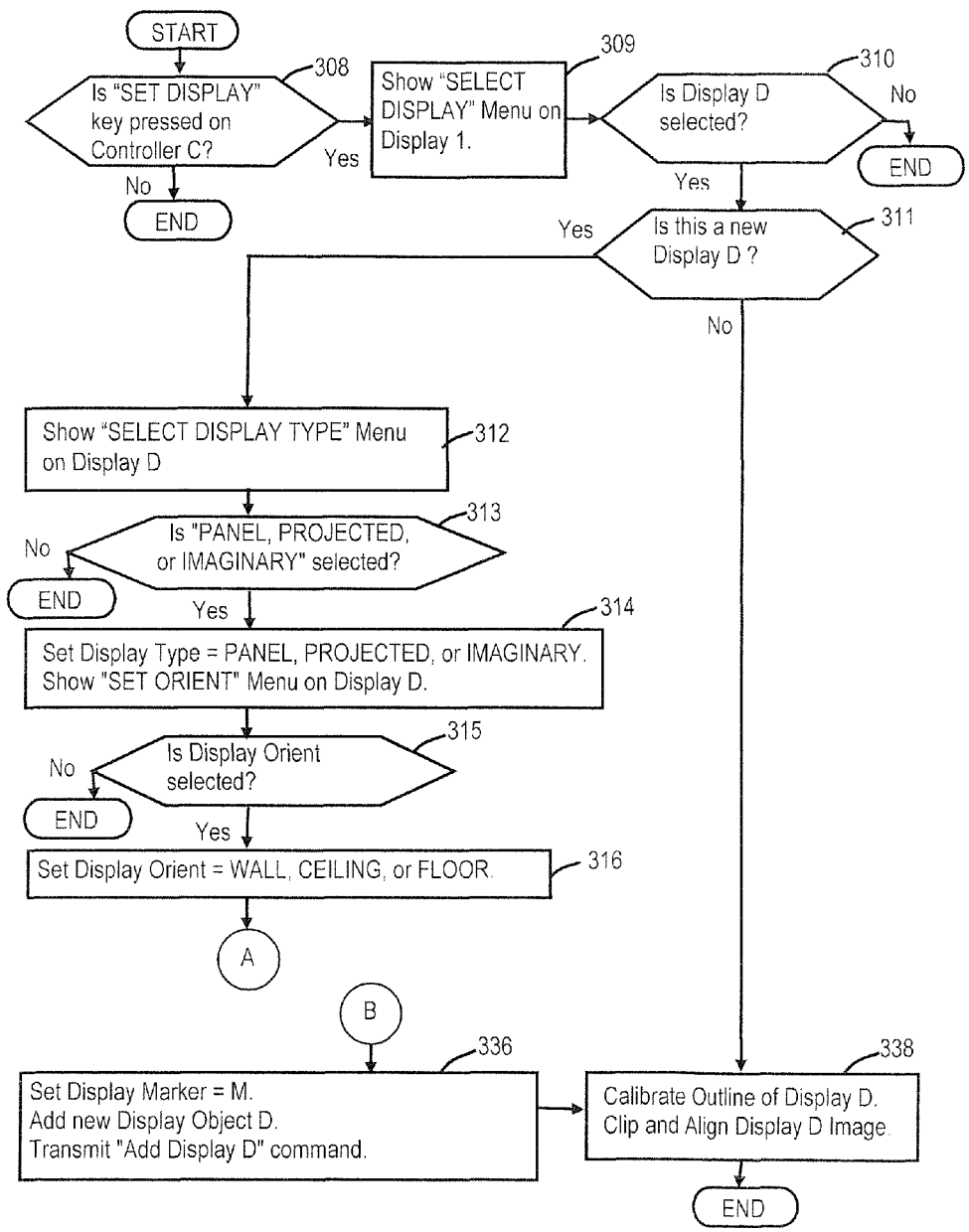
FIGS. 13A and 13B is a flow diagram for registering an additional image display with the system of FIG. 1.
Figure 13B:
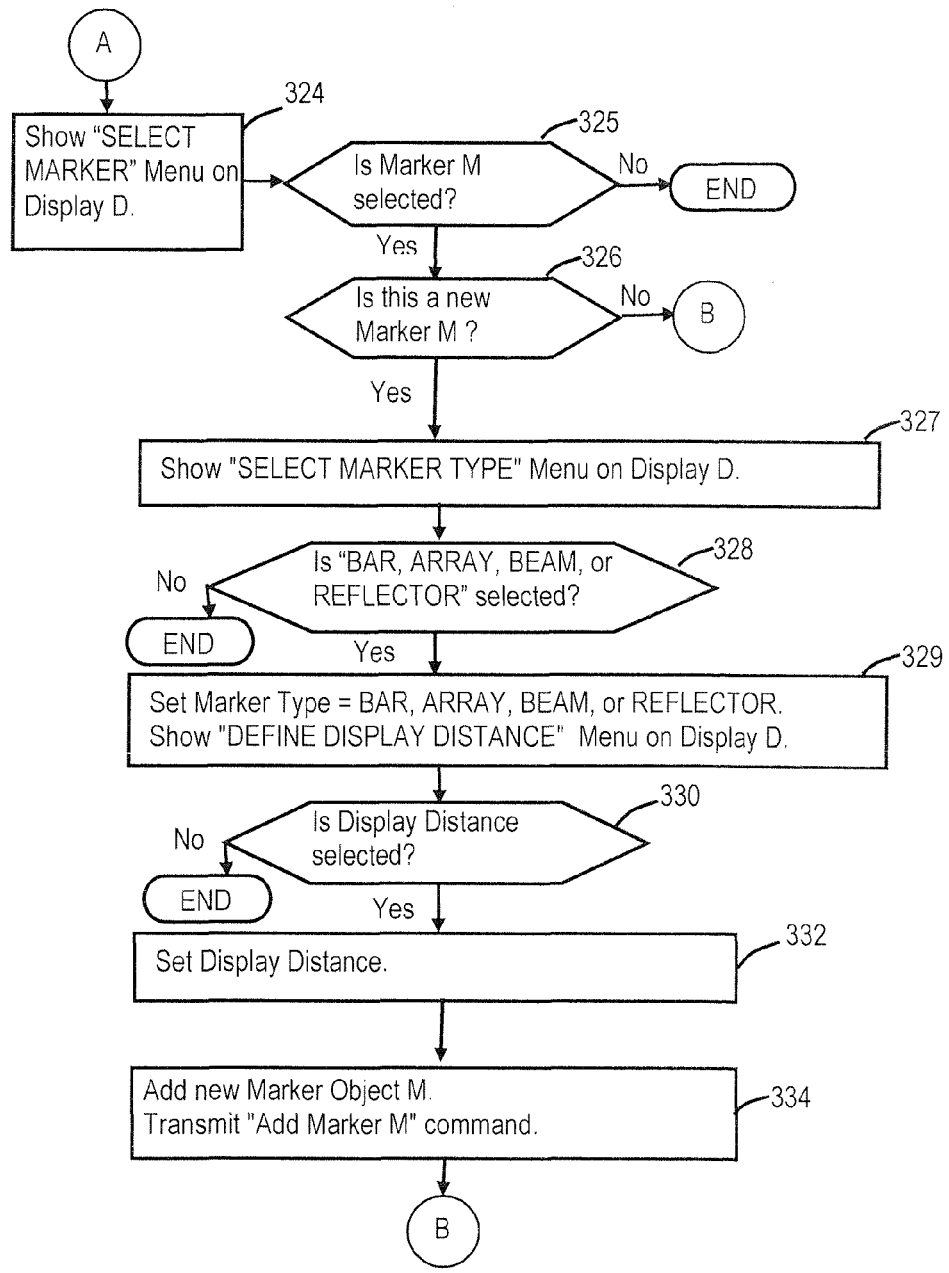

FIGS. 13A and 13B show a flow diagram for adding a new image display to the system.

In FIG. 13A, step 308, if a control module (e.g., FIG. 4 reference numeral 250 or FIG. 3 reference numeral 150) detects a controller C "Set Display" key was pressed by a user, continue to step 309. Otherwise, the method ends.

In step 309, the control module may show a message "Select Display" on default display 1. An option menu may be presented with a list of display IDs, such as "1". "2", "3", . . . through "16", along with "Exit."

In step 310, if the user scrolls down the option menu using a controller C keypad and selects a display D (e.g., "2"), then go to step 311. Otherwise, "Exit" was selected and the program ends.

In step 311, if the control module determines this is a new, unregistered display D, then continue to step 312. Otherwise, skip to step 338.

In step 312, the control module may show a message "Select Display Type" on display D. An option menu appears with text options "Panel", "Projected", "Imaginary", and "Exit."

In step 313, if the user scrolls down the option menu using the controller C keypad and selects the "Panel", "Projected", or "Imaginary" option, continue to step 314. Otherwise, "Exit" was selected and the program ends.

In step 314, the control module may set a variable Display Type=PANEL, PROJECTED, or IMAGINARY, according to the prior selected option. The control module may show a message "Select Display Orientation" on display D, along with option menu of items: "Wall", "Ceiling", "Floor", and "Exit."

In step 315, if the user scrolls down the option menu using the controller C keypad and selects an orientation (e.g., "Wall"), then continue to step 316. Otherwise, the user has selected "Exit" and the program ends.

In step 316, the control module may set a variable Display Orient=WALL, CEILING, or FLOOR, according to the prior selected option.

Now turning to FIG. 13B, step 324, the control module may show a message "Select Marker" on display D. An option menu may be presented with a list of Marker IDs, such as "1", "2", "3", . . . through "16", along with "Exit."

In step 325, if the user scrolls down the option menu using the controller C keypad and selects a marker M (e.g., "2"), then go to step 326. Otherwise, "Exit" was selected, so the program ends.

In step 326, if the control module determines this is a new, unregistered marker M, then continue to step 327. Otherwise, return to step 336 of FIG. 13A.

In step 327, the control module may show a message "Select Marker Type" on display D, along with an option menu of items: "Bar", "Array", "Beam", "Reflector", and "Exit."

In step 328, if the user scrolls down the option menu using the controller C keypad and selects a marker type (e.g., Bar), skip to step 329. Otherwise, the user has selected "Exit" option and the program ends.

In step 329, the control module may set a variable Marker Type=BAR, ARRAY, BEAM, or REFLECTOR, according to the prior selected option. The control module may show a message "Define Display Distance" on display D, along with an option menu of items: "1.0 meter", "1.5 meters", . . . through "10.0 meters", and "Exit."

In step 330, if the user scrolls down the option menu using the controller C keypad and selects a distance (e.g., "1.5 meters"), then continue to step 332. Otherwise, the user has selected "Exit" and the program ends.

In step 332, control module may set a variable Display Distance=1.0, 1.5, or 10.0, according to the prior selected option, and continue to step 334.

In step 334, control module may create a new variable Marker Object M, along with attributes such as Marker ID (e.g., "2"), Marker Type, Marker Code (e.g., from 2D barcode), Display Distance, etc.

The control module may add the new Marker Object M to the Active Marker List. The control module may transmit an "Add Marker M" command with a copy of the Marker Object M for system-wide data synchronization, so all devices are aware of the added marker.

Then returning to FIG. 13A, step 336, the control module may create a new Display Object D, along with attributes such as Display ID (e.g., "2"), Display Type, the Display Orient, Display Marker=M, etc.

The Display Object D graphic attributes may also be set. For example, the control module may set a graphic point of view (POV) that corresponds to the value of Display Orient (e.g., CEILING). Whereby, the perspective of the rendered display image is adjusted (such as a display image of blue sky is presented on a ceiling).

The control module may add the new Display Object D to the Active Display List. The control module may transmit an "Add Display D" command with a copy of the Display Object D for system-wide data synchronization, so all devices are aware of the added display.

Finally, in step 338, the control module may calibrate display D so the system is aware of its spatial outline or perimeter. The control module may also clip the display D image to avoid overlap with other display images. The control module may further align the display D image with other display images.

Alternative methods may allow one or more displays to be added to the system. Alternative methods may enable a plurality of position markers to be associated with one image display. Alternative methods may include an operation to remove a display and/or marker from the system.

Calibrating a Display Position

As a controller moves through 3D space, the display's perspective and shape changes from the vantage point of the controller. Thus, knowing a display position may benefit the control system.

Figure 15:
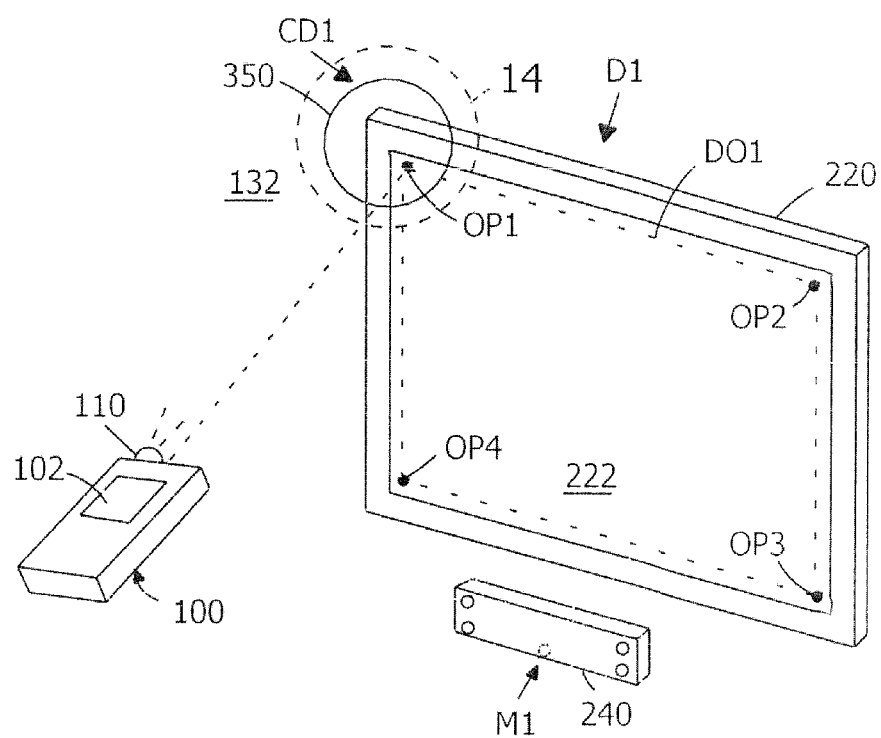
FIG. 15 is a perspective view of calibrating a display position for the system of FIG. 1.

Turning to FIG. 15, a perspective view is presented of display D1 being calibrated. The marker M1 is located on bar emitter 240 located below the image 222 of panel 220.

To start calibration, a user (not shown) aims the controller 100 at display D1. An optional feature of calibration, the controller projector 110 may further illuminate the controller display CD1 with a pointer image 350, such as an arrow, character, or round spot. The system may then render a graphic icon 354 as a visual indicator on a corner of image 222, as shown in the close-up view of FIG. 14.

Then in FIG. 15, the user aims the controller 100 at an outline point OP1 and presses keypad 102. The system receives a user input signal and stores point OP1 in memory. The user then aims the controller and presses the keypad 102 at three more positions in sequence. Again, the system receives input signals and sequentially stores points OP2, OP3, and OP4 in memory. The system may compute a display outline DO1 in 3D space comprised of points OP1. OP2, OP3, and OP4. Hence, the system learns the outline position of display D1 in respect to its marker M1.

Figure 14:
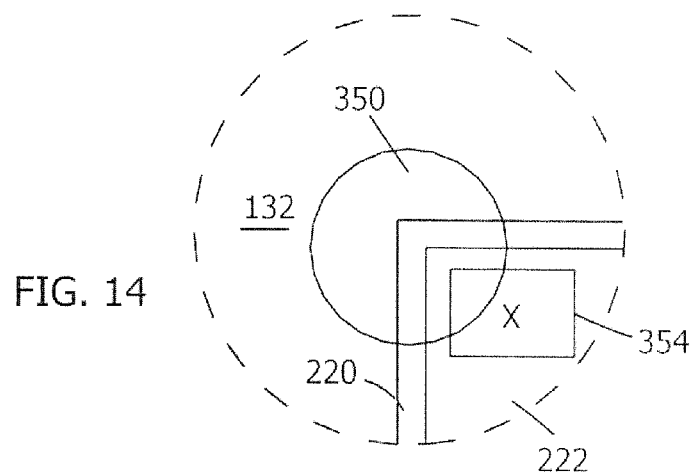
FIG. 14 is a close-up view of a graphic icon when calibrating a display position for the system of FIG. 1.

Using the procedure of FIGS. 14 and 15, other display types and marker types may be calibrated as well. For example, while referring to FIG. 2, display D2 with marker M2 may be calibrated, and display D3 with marker M3 may be calibrated.

Method for Calibrating a Display Position

Figure 16:
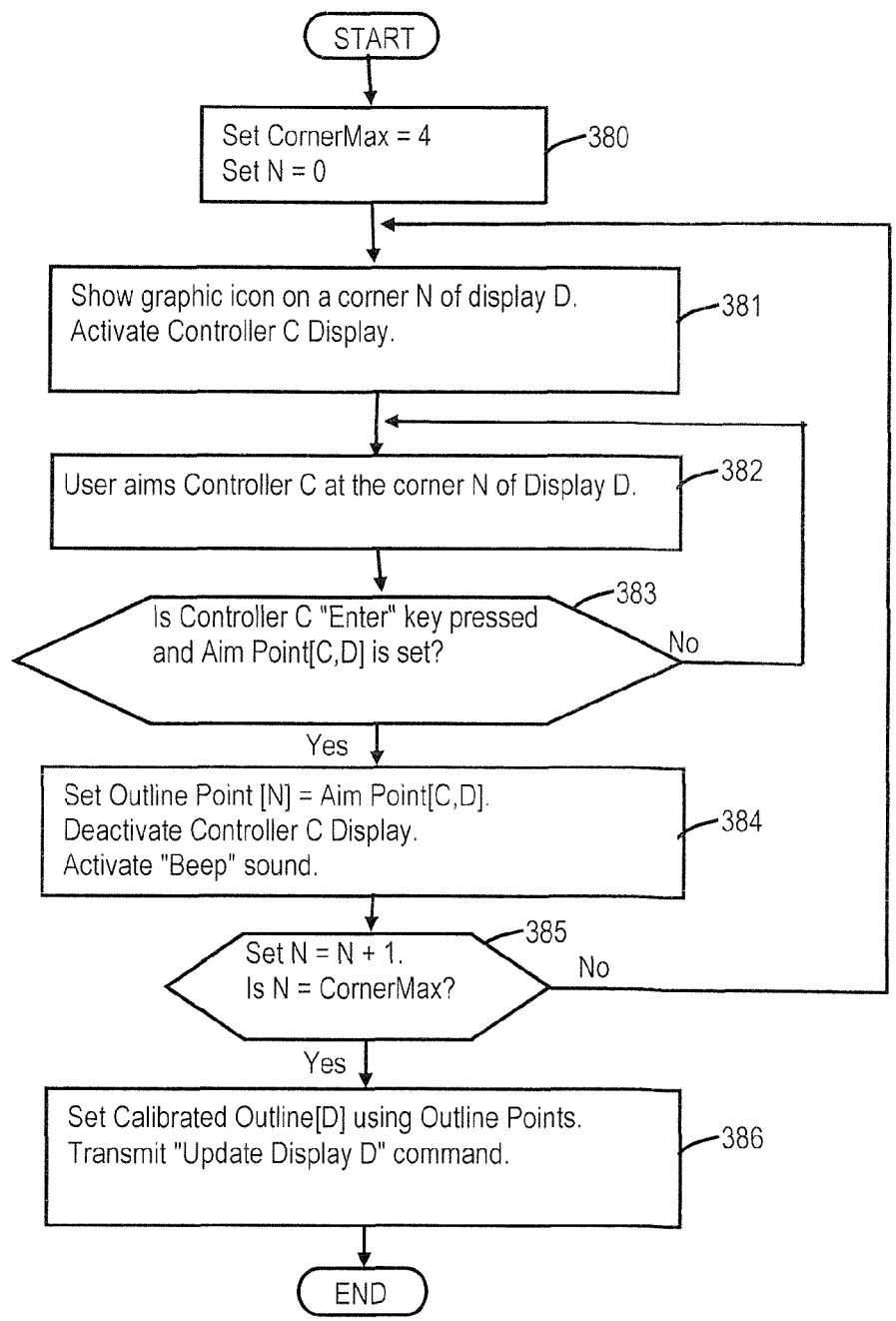
FIG. 16 is a flow diagram of a method for calibrating a display position for the system of FIG. 1.

FIG. 16 shows a method for calibrating a display position. This method may be invoked by another method, such as the method of FIG. 13A, step 338. Whereby, a controller C and a display D are presumed selected already.

To begin with step 380, a control module (e.g., FIG. 4 reference numeral 250 or FIG. 3 reference numeral 150) sets a variable CornerMax=4 and sets a variable N=0.

In step 381, the control module renders a graphic icon on a corner N of display D. Further, controller C may activate its controller display illuminating a pointer image on a nearby projection surface.

In step 382, a user aims the controller C at corner N of display D.

In step 383, if the control module detects the user pressed a controller C "Enter" key and a controller C Aim Point for display D is set, continue to step 384. Otherwise, go back to step 382.

In step 384, the control module sets a variable Outline Point [N]=Controller C Aim Point, so that the outline point of display D is recorded. The control module may deactivate the controller display of controller C and activate a "beep" audio effect to indicate successful entry.

In step 385, the control module increments variable N. If variable N=CornerMax, then all outline points of display D have been recorded, so continue to step 386. Otherwise, return to step 381.

Finally, in step 386 the control module converts the Outline Points into a variable Calibrated Outline, which is stored in Display Object D in memory. The Calibrated Outline may be a 2D polygon shape defined in 3D space. The control module may transmit an "Update Display D" command along with a copy of Display Object D for system-wide data synchronization.

Alternative calibration methods may include steps to prohibit modifying display D, such as when display D is an imaginary display (e.g., FIG. 2 reference numeral D3) having no display image, where Display Type[D]=IMAGINARY.

Methods for Clipping and Aligning a Remote Display Image

Figure 17A:
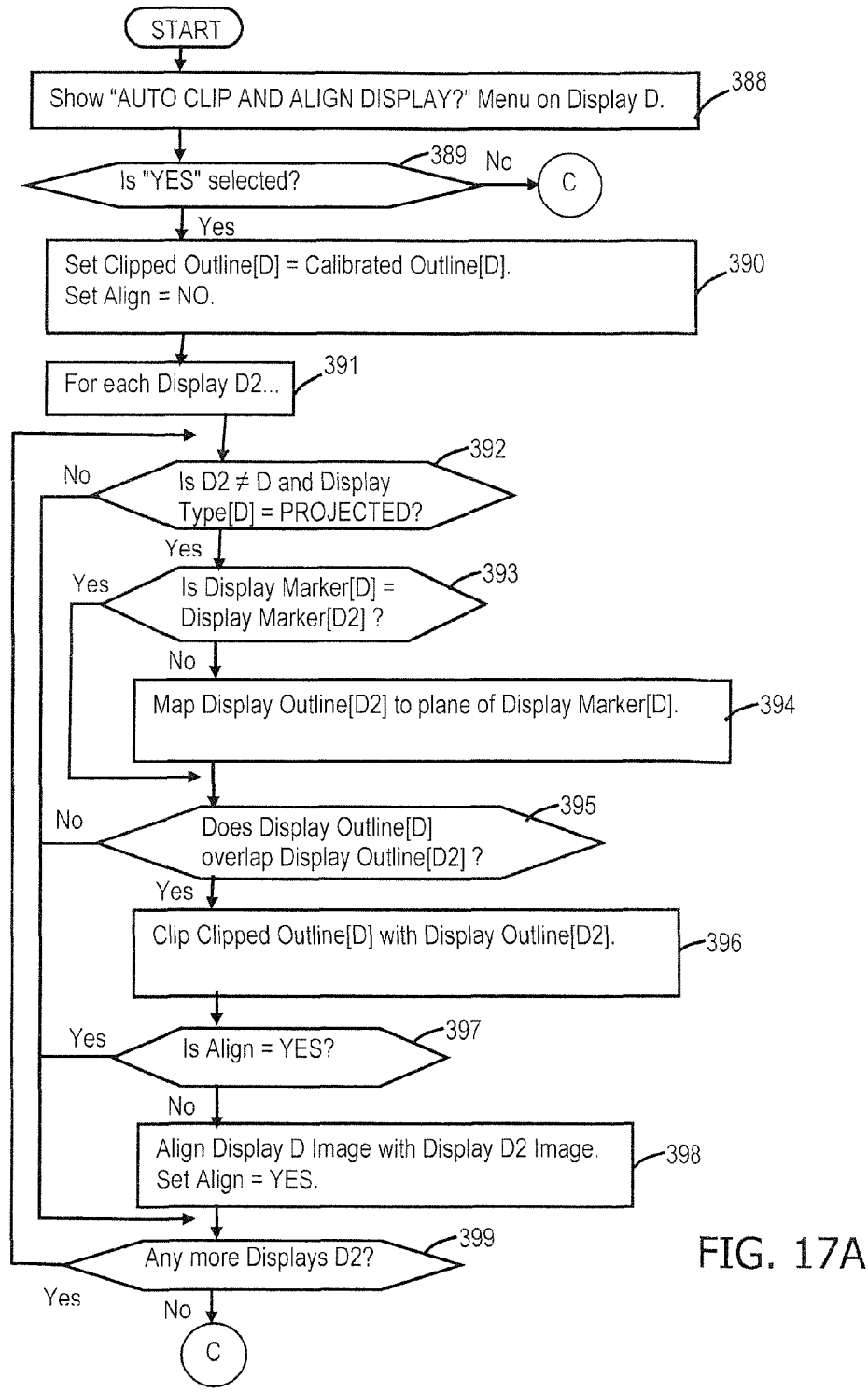
FIGS. 17A and 17B is a flow diagram of a method for clipping and aligning a remote display for the system of FIG. 1.
Figure 17B:
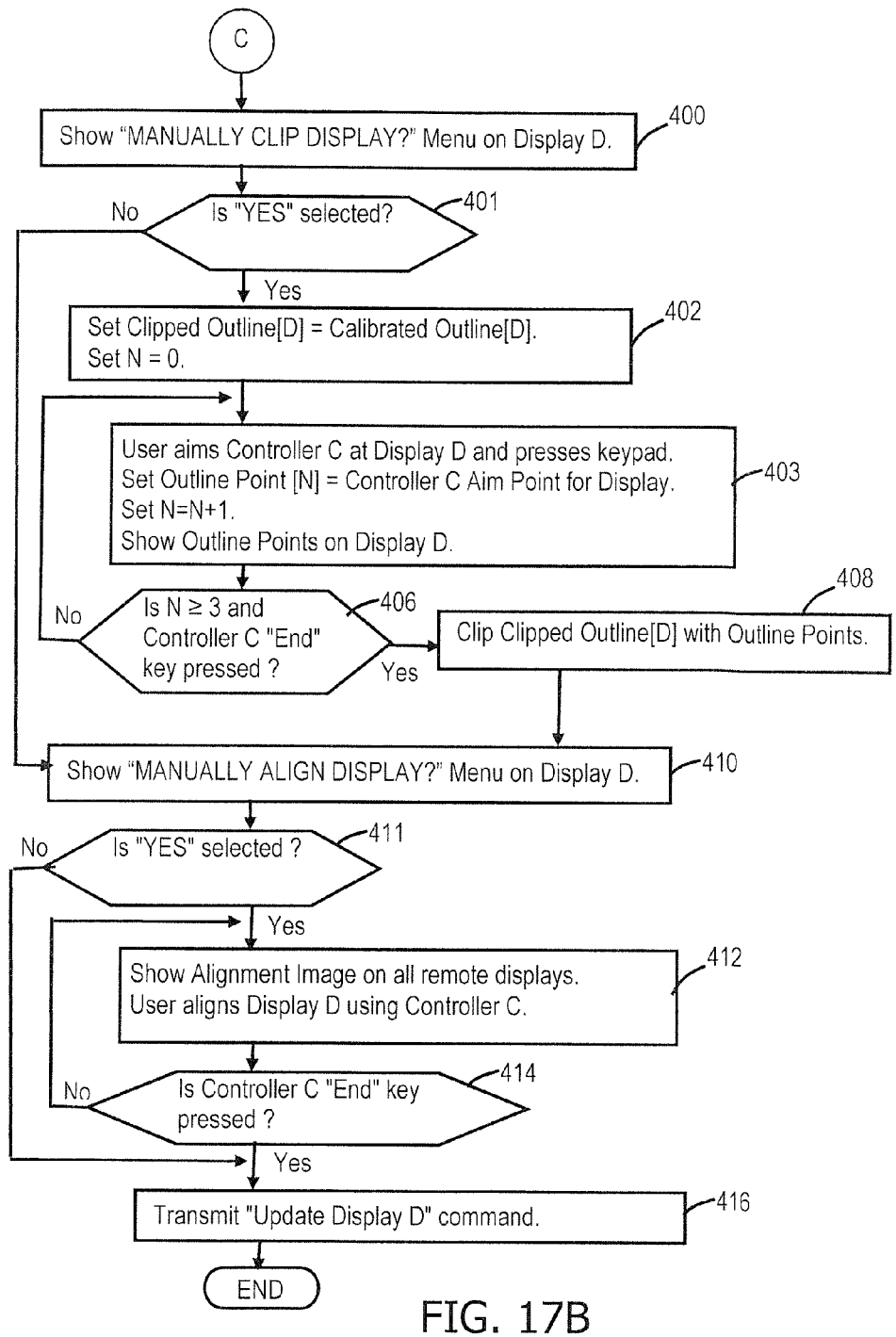

Turning now to FIGS. 17A and 17B, a method is shown for clipping and aligning a display image. This method may be invoked by another method, such as the method of FIG. 13A, step 338. Whereby, a controller C and a display D are presumed selected already.

In FIG. 17A, step 388, a control module (e.g., FIG. 4 reference numeral 250 or FIG. 3 reference numeral 150) shows a message "Auto clip and align display?" on display D with an option menu of "Yes" and "No."

In step 389, if a user holding a controller C scrolls down the option menu using a controller C keypad and selects "Yes", continue to step 390. Otherwise, "No" was selected so skip to step 400 (in FIG. 17B).

In step 390, the control module sets a variable Clipped Outline for display D equal to the previously stored Calibrated Outline. The Clipped Outline may be a 2D polygon shape defined in 3D space. The control module also sets a variable Align=NO.

Then in step 391, the control module selects each display in the Active Display List, starting with display D2.

In step 392, if the control module determines display D2 has a different identifier than display D, and if the Display Type[D]=PROJECTED, then continue to step 393. Otherwise, skip to step 399.

In step 393, if display D and display D2 share the same position marker, then skip to step 395. Otherwise, display D and display D2 have different markers, so continue to step 394.

In step 394, the control module may map the Display D2 Outline to the marker plane of display D. Mapping may be accomplished using, for example, matrix coordinate transforms adapted from current art.

In step 395, if the Display D Outline overlaps the Display D2 Outline, then continue to step 396. Otherwise, skip to step 399. The control module may detect if display outlines overlap using, for example, a polygon collision detection function adapted from current art.

In step 396, the control module may clip the Display D Clipped Outline with Display D2 Outline. The clipping operation may use, for example, a polygon clipping algorithm adapted from current art.

Then continuing in step 397, if variable Align=YES, skip to step 399. Otherwise, continue to step 398.

In step 398, the control module may modify the display D image and the display D2 image such that at least partially aligned and separated images are formed, or an at least partially aligned and combined image is formed. For example, the control module may set the graphic point of view (POV) of display D equal to a POV of display D2, such that both displays share a common perspective of the graphic object model during graphic rendering. (See section "Graphic Rendering on Multiple Displays" for more details.) The control module then sets the variable Align=YES. Now continue to step 399.

In step 399, if the control module determines more displays need processing, then select the next display D2 from the Active Display List and go back to step 392. Otherwise, continue to step 400.

Turning now to FIG. 17B, step 400, the control module shows a message "Manually clip the display image?" on display D with an option menu of "Yes" and "No."

In step 401, if the user holding controller C scrolls down the option menu using the controller C keypad and selects "Yes", continue to step 402. Otherwise, "No" was selected so skip to step 410.

In step 402, the control module sets variable Clipped D Outline equal to the Calibrated D Outline, and then sets variable N=0.

In step 403, the user aims controller C at display D and presses the controller's keypad, generating an input signal. Whereupon, the control module receives the input signal, and sets a variable: Outline Point[N]=Controller C Aim Point for display D. The control module then increments variable N, and renders the Outline Points on display D so the user can view the clip region.

In step 406, if at least three Outline Points have been entered and a controller C "End" key was pressed, then continue to step 408. Otherwise, go back to step 403.

In step 408, the control module may clip the Clipped D Outline using the shape defined by the Outline Points. The clipping operation may use, for example, a polygon clipping algorithm adapted from current art. Now continue to step 410.

In step 410, the control module shows a message "Manually Align the Display Image?" on display D along with an option menu of "Yes" and "No".

In step 411, if the user holding controller C scrolls down the option menu using the controller C keypad and selects "Yes", continue to step 412. Otherwise, "No" was selected so skip to step 416.

In step 412, the control module may show an alignment image on all remote displays. The alignment image may be rendered from a pre-defined graphic object model, such as a 3D landscape. Whereby, the user adjusts the image of display D by pressing the controller C keypad (e.g., left/right, up/down, zoom in/out, rotate), which generates input signals. The control module may convert the input signals into movement of a graphic point of view POV defined in Display Object D. The result being, the user may modify the perspective of the alignment image on display D until the desired view appears. Now continue to step 414.

In step 414, if controller C "End" key is pressed, then continue to step 416. Otherwise, go back to step 412.

Finally, in step 416, the control module may transmit an "Update Display D" command along with a copy of Display Object D for system-wide data synchronization.

Method for Computing Controller and Display Positions

Figure 18A:
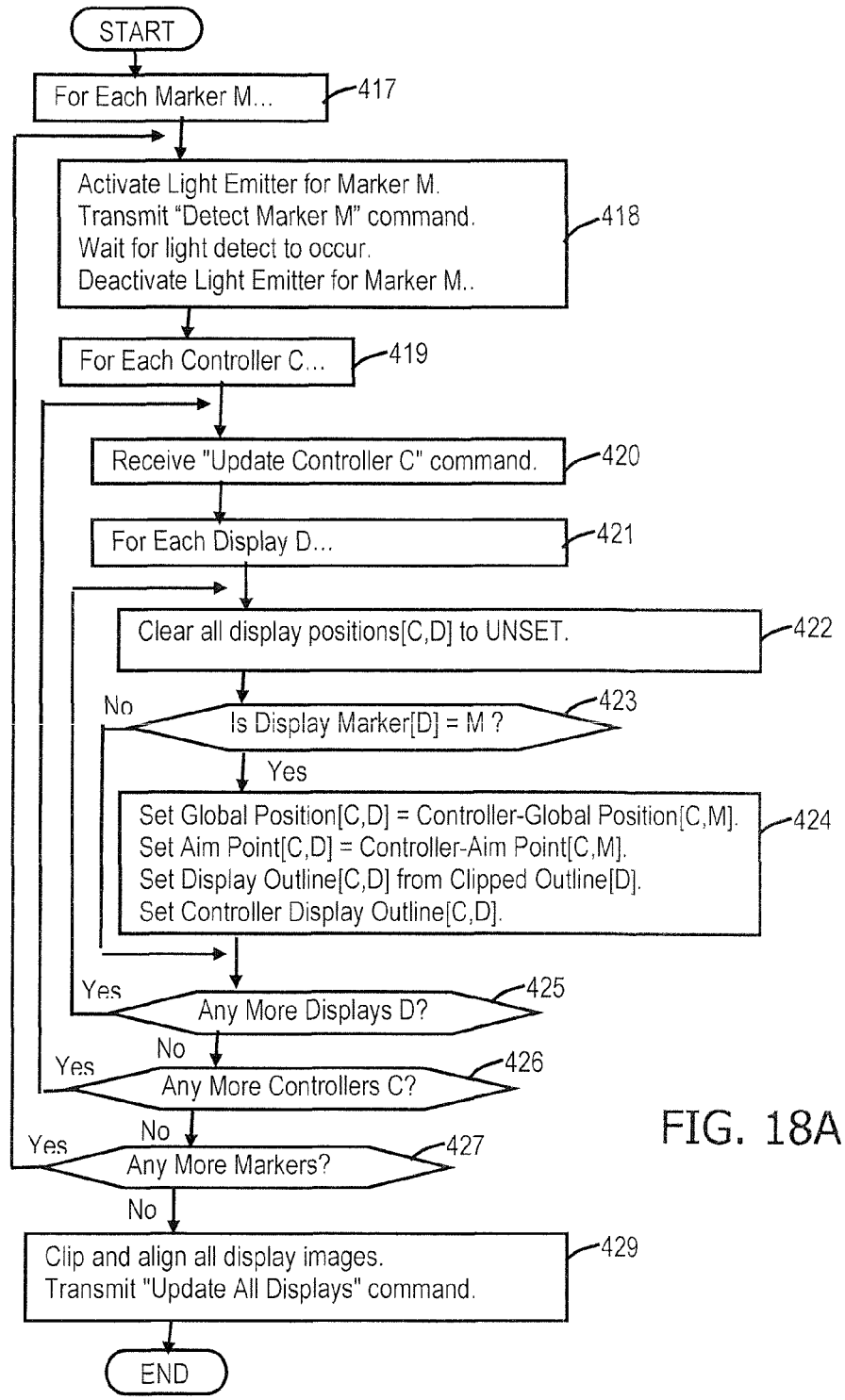
FIG. 18A is a flow diagram of a method for creating light for position markers and setting controller and display positions for the system of FIG. 1.
Figure 18B:
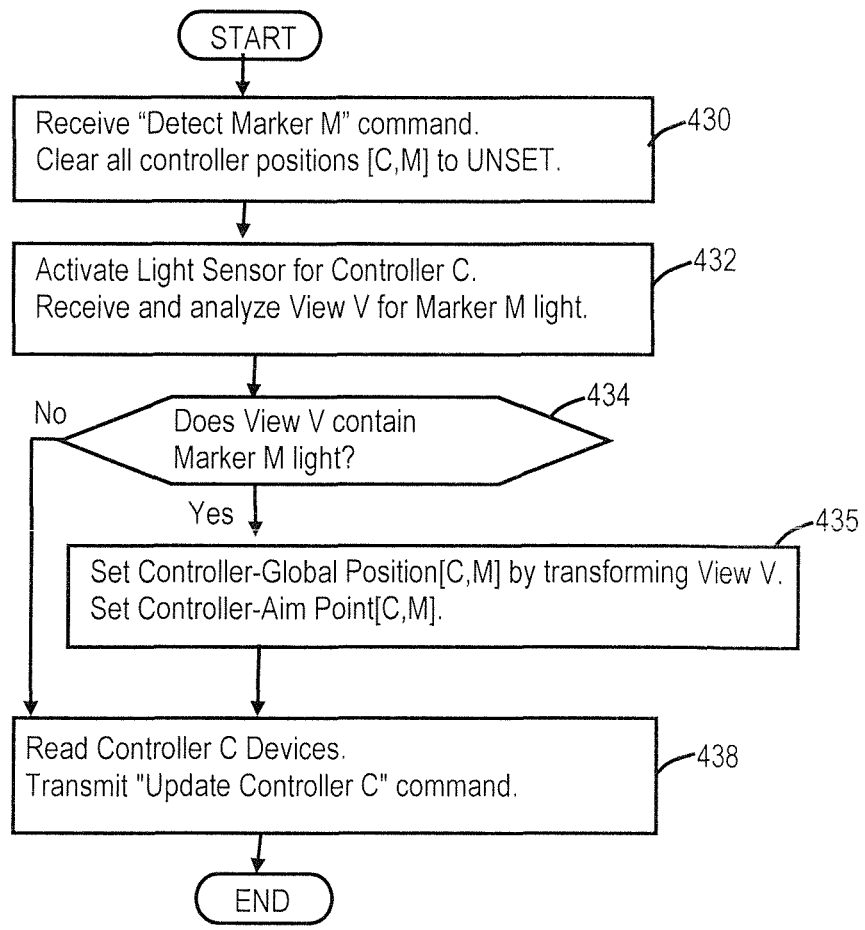
FIG. 18B is a flow diagram of a method for detecting light from a position marker and computing a controller position for the system of FIG. 1.

FIGS. 18A and 18B present methods that compute the positions of all controllers and displays. The method of FIG. 18A may be invoked, for example, periodically every 1/30 of a second (e.g., as from FIG. 11, step 282). Moreover, the method of FIG. 18A may be executed, for example, by the console control module (e.g., FIG. 1 reference numeral 250).

To begin with FIG. 18A, step 417, the console control module may select each marker in the Active Marker List, starting with marker M.

In step 418, console control module may activate its light emit adapter, which activates a light emitter that illuminates a position marker M. The control module may transmit system-wide a "Detect Marker M" command along with a copy of Marker Object M, so other devices (e.g., controllers) may begin light detection of marker M. The control module may then wait for a pre-determined period of time (e.g., 1/100 second) for light detection to occur. Once complete, the control module may deactivate its light emit adapter, which deactivates the light emitter for marker M.

In step 419, the console control module selects each controller in the Active Controller List, starting with controller C.

In step 420, the console control module may receive from controller C an "Update Controller C" command and a Controller Object C, which the control module stores in memory.

In step 421, the console control module selects each display in the Active Display List, starting with display D.

In step 422, the console control module may clear display positions in the Display Object D to an UNSET state, such as variables Global Position[C,D], Aim Point[C,D], Display Outline[C,D], and Controller Display Outline[C,D].

In step 423, if the control module determines marker M is associated with display D, then continue to step 425. Otherwise, skip to step 426.

In step 424, console control module sets a variable Global Position equal to Controller-Global Position. The control module also sets a variable Aim Point equal to Controller-Aim Point.

The control module also sets a variable Display Outline for display D. That is, the control module maps the pre-determined Clipped Outline for display D (from FIG. 17A) to a Display Outline relative to the controller C Global Position (from step 424). Coordinate mapping may computed, for example, using coordinate matrix transforms adapted from current art.

The control module also sets a variable Controller Display Outline of controller C. See section "Computing a Controller Display Outline" for more details.

In step 425, if the console control module determines more displays D need processing, then select the next display D from Active Display List and go back to step 422. Otherwise, continue to step 427.

In step 426, if the console control module determines more controllers C need processing, then select the next controller C from Active Controller List and go back to step 420. Otherwise, continue to step 428.

In step 427, if the console control module determines more markers M need processing, then select the next marker M from Active Marker List and go back to step 418.

In step 429, the console control module may clip and align all display images, including remote displays and/or controller displays. This may be accomplished with a method using image clipping and aligning techniques (similar to FIG. 17A, steps 390 to 399) adapted from current art.

Finally, the control module may transmit an "Update All Displays" command along with copies of all active Display Objects for system-wide data synchronization.

Turning now to FIG. 18B, a method for the light detect operation is presented. A plurality of controllers with controller control modules may execute the light detect operation concurrently. However, to simplify the discussion, only one controller C will be mentioned.

So starting with step 430, a controller C control module (e.g., FIG. 1 reference numeral 150) may receive the "Detect Marker M" command (e.g., from step 418 of FIG. 18A) having a marker M identifier. The control module may clear controller positions in the Controller Object C to an UNSET state, such as variables Controller-Global Position[C,M] and Controller-Aim Point[C,M].

In step 432, the controller control module may activate its light detect adapter to receive a view signal from the controller's light sensor (e.g., FIG. 1 reference numeral 160). The activated light sensor may use a shutter speed (e.g., ¹⁄₁₂₀ second) that allows capture of light from position marker M.

The control module (e.g., FIG. 1 reference numeral 150) may receive and convert the view signal into a View V, which is an image forward of the light sensor (e.g., FIG. 1 reference numeral 160). The control module and light detect adapter (e.g., FIG. 1 reference numeral 164) may then segment and analyze View V for light blobs or brightly lit regions that uniquely identify marker M. (For more details, see "Basic Operations of the Multi-Display Control System" section.)

In step 434, if View V contains marker M light blobs, continue to step 435. Otherwise, skip to step 438.

In step 435, the controller control module may convert the light blobs into a Global Position and Aim Point. (For more details, see "Basic Operations of the Multi-Display Control System," "Computing a Controller Global Position," and "Computing a Controller Aim Point" sections.)

In step 438, the controller control module may then store the computed Global Position and Aim Point in Controller Object C in memory.

Further, the control module may read input signals from the controller C user input devices (e.g., keypad, control buttons, etc.) and motion sensor devices (e.g., accelerometer, etc.). The control module may then convert the input signals to input data, which is stored in the Controller C Object in memory.

Finally, the control module may transmit an "Update Controller C" command, along with a copy of Controller Object C, for system-wide data synchronization. Once completed, the method ends.

The methods of FIGS. 18A and 18B suggest that all controller positions are computed for each position marker in sequence, although alternative methods may compute positions in a different order.

Some alternative methods may distribute the operations to the control modules differently.

Some alternative methods may activate the light emit adapter and light emitters at control system start and never deactivate the light emit adapter and emitters, such as methods of an alternative control system comprised of uniquely identifiable markers.

Some alternative methods may use improved light detection. For example, a control module may retrieve a view V1 when a marker M is illuminated, and retrieve a view V2 when the marker M is not illuminated. The control module may then compute a view V3, for example, by digital image subtraction of views V1 and V2.

Method to Create Events

Figure 19A:
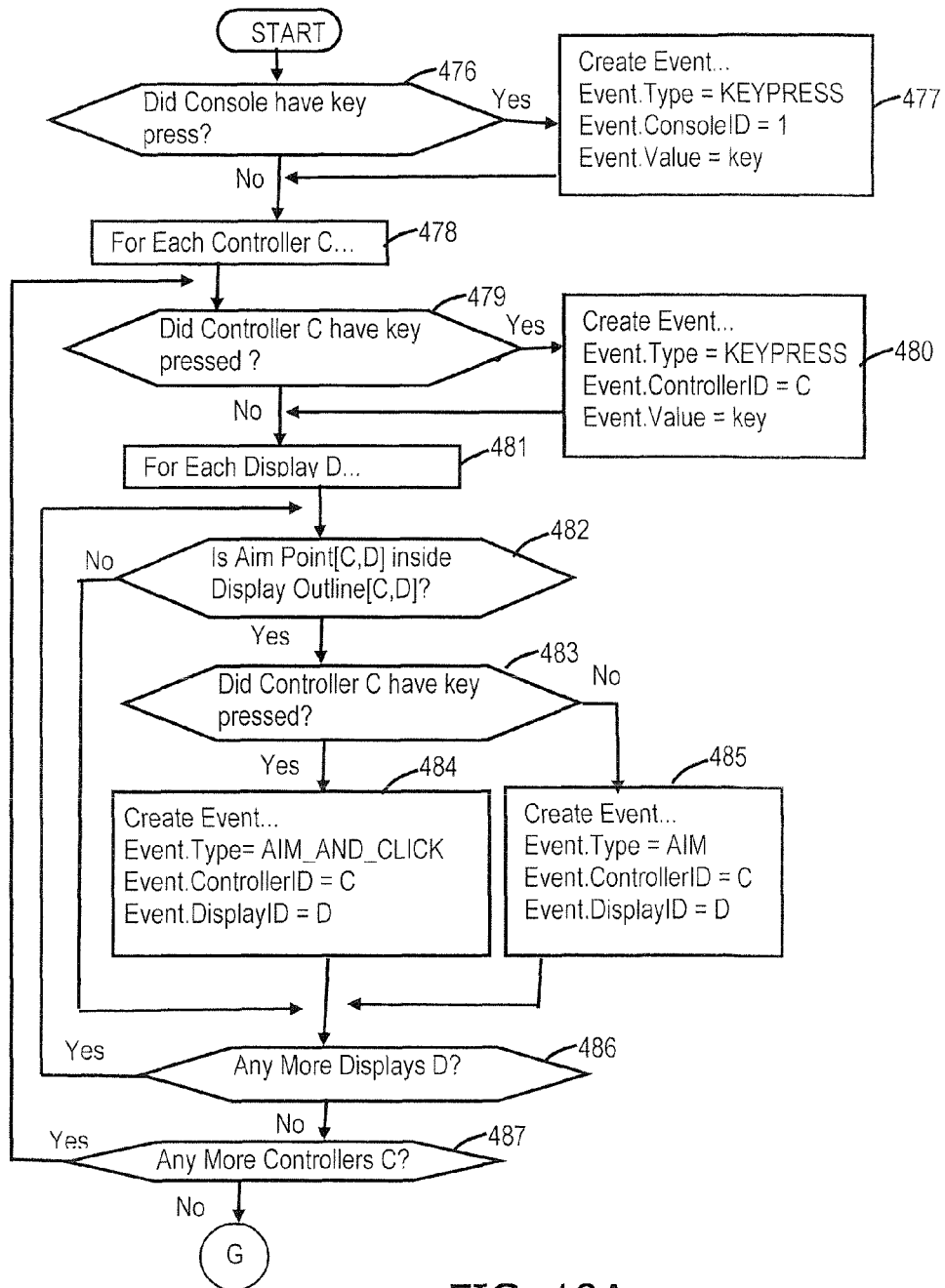
FIGS. 19A and 19B is a flow diagram of a method that creates action events for the system of FIG. 1.
Figure 19B:
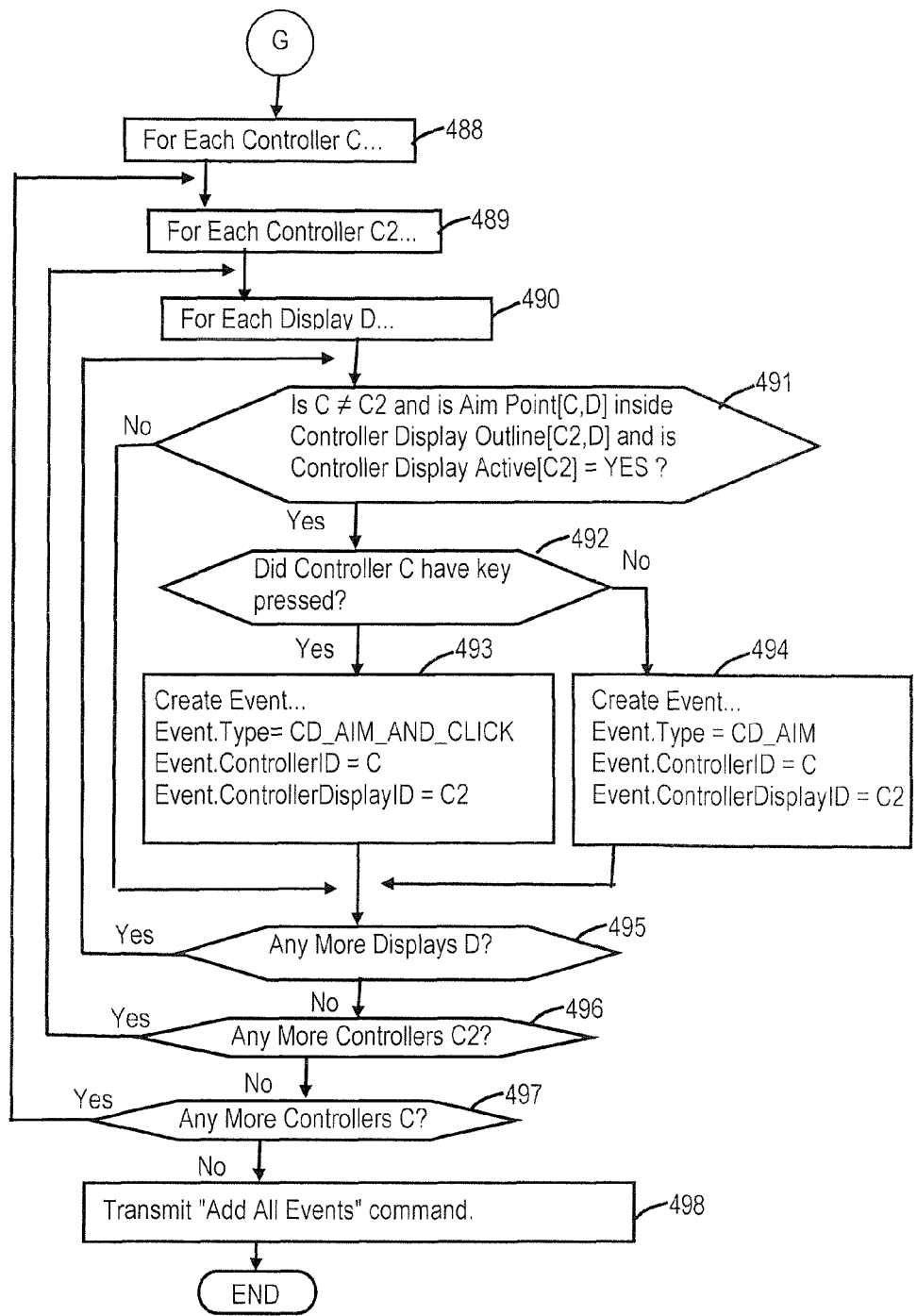

FIGS. 19A and 19B show a method for creating exemplary action events. This method may be invoked (e.g. every ¹⁄₃₀ second) by another method (e.g., as shown in FIG. 11, step 284) to convert system states (e.g., key press) into action events.

Starting with FIG. 19A, step 476, if a control module (e.g., FIG. 4 reference numeral 250 or FIG. 3 reference numeral 150) detects that the console had a key press of its keypad, then continue to 477. Otherwise, skip to 478.

In step 477, the control module creates an Event Object comprising attributes, such as an Event Type=KEYPRESS, a Console ID, a Key Value, etc., and stores the Event Object in memory, and continues to step 478.

In step 478, the control module selects each controller from the Active Controller List, starting with controller C.

Then in step 479, if the control module detects that the controller C had a key press, then continue to step 480. Otherwise, skip to step 481.

In step 480, the control module creates an Event Object comprising attributes, such as an Event Type=KEYPRESS, a Controller ID=C, a Key Value, etc., and stores the Event Object in memory, and continues to step 481.

Then in step 481, the control module selects each display from Active Display List, starting with display D.

In step 482, if the control module determines that the Controller C Aim Point is inside the Display D Outline, then continues to step 483. Otherwise, go to step 486. Determining if a point is inside a display outline may be computed, for example, by a point-inside-polygon detect function adapted from current art.

In step 483, if the control module detects that the controller's C keypad was pressed, then continue to step 484. Otherwise, go to step 485.

In step 484, the control module creates an Event Object comprising attributes, such as an Event Type=AIM_AND_CLICK, Controller ID=C, Display ID=D, etc., and stores Event Object in memory, and continues to step 486.

In step 485, the control module creates an Event Object comprising attributes, such as an Event Type=AIM, a Controller ID=C, Display ID=D, etc., and stores the Event Object in memory, and continues to step 486.

Then in step 486, if the control module determines more displays need processing, then select the next display D from Active Display List and go back to step 482. Otherwise, continue to step 487.

In step 487, if the control module determines more controllers need processing, then select the next controller C from Active Controller List and go back to step 479. Otherwise, continue to FIG. 19B, step 488.

In FIG. 19B, step 488, the control module selects each controller from Active Controller List, starting with controller C.

Then in step 489, the control module selects each controller from Active Controller List, starting with controller C2.

Then in step 490, the control module selects each display from Active Display List, starting with display D.

In step 491, if the control module determines that C is not equal to C2, and if Controller C Aim Point is inside the Controller C2 Display Outline, and if controller C display is active, then continue to step 492. Otherwise, go to step 495.

In step 492, if the control module detects that the controller's C keypad was pressed, then continue to step 493. Otherwise, go to step 494.

In step 493, the control module creates an Event Object comprising attributes, such as an Event Type=CD_AIM_AND_CLICK, a Controller ID=C, a Controller Display ID=C2, etc., and stores Event Object in memory, and skips to step 495.

In step 494, the control module creates an Event Object comprising attributes, such as an Event Type=CD_AIM, a Controller ID=C, Controller Display ID=C2, etc., and stores Event Object in memory, and continues to step 495.

Then in step 495, if the control module determines more displays need processing, then select the next display D from Active Display List and go back to step 491. Otherwise, continue to step 496.

In step 496, if the control module determines more controllers need processing, then select the next controller C2 from Active Controller List and go back to step 490. Otherwise, continue to step 497.

In step 497, if the control module determines more controllers need processing, then select the next controller C from Active Controller List and go back to step 489. Otherwise, continue to step 498.

Finally, in step 498, the control module transmits an "Add Events" command along with a copy of the newly created Event Objects for system-wide data synchronization.

Understandably, alternative methods may create other types of events for richer event processing.

Rendering Graphics on Multiple Displays

Figure 20:
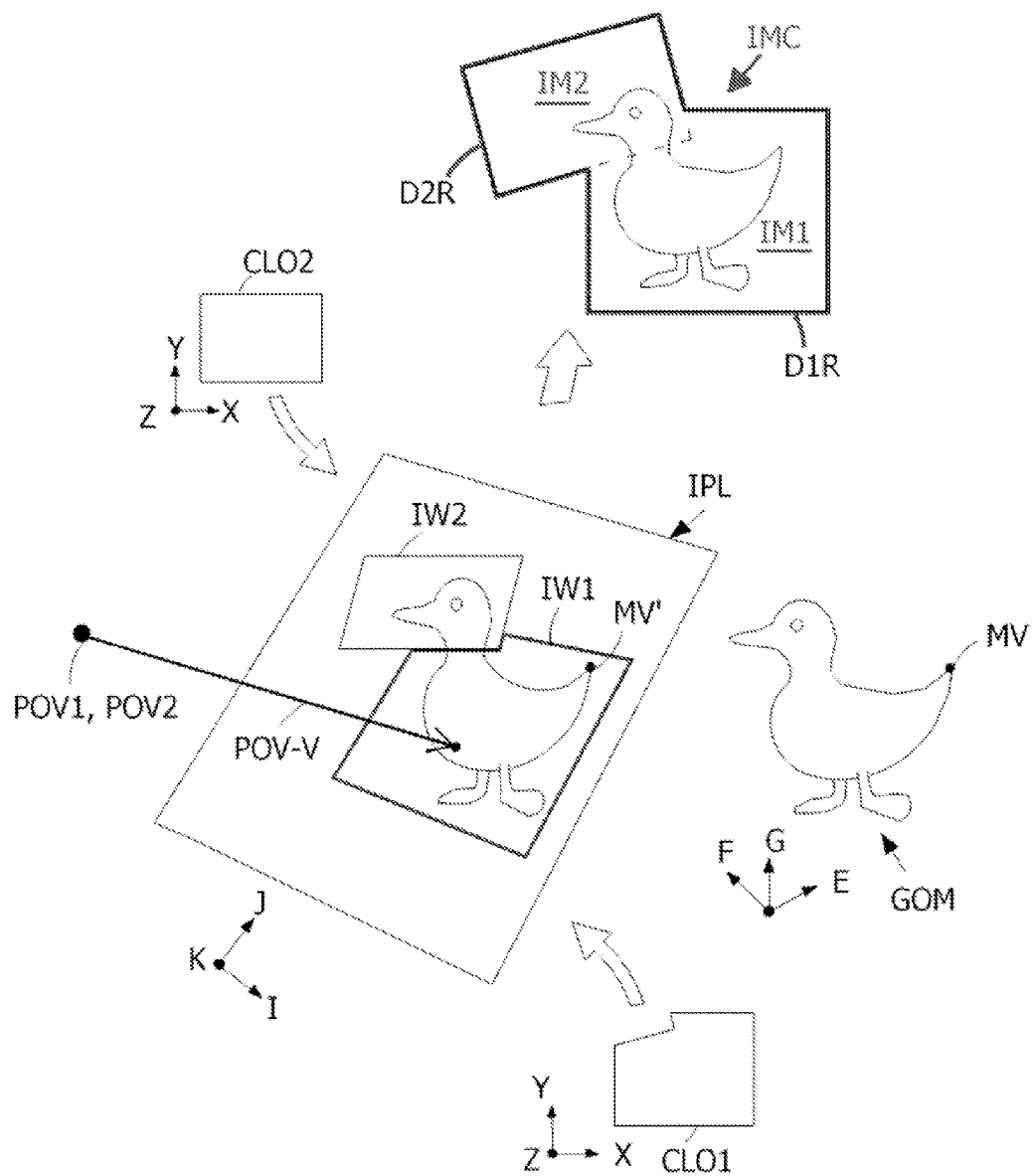
FIG. 20 is a diagram showing a graphic rendering process for the control system of FIG. 1.

FIG. 20 shows a diagram of a graphic rendering technique, although alternative techniques may be considered. A graphic object model GOM represents 2D and/or 3D objects that will be rendered on one or more image displays. The model GOM may define, for example, buildings, vehicles, and characters, such as a duck.

Further, the perspective of the rendered image may be defined by a graphic point of view POV1. Point of view POV1 may have a position, rotation, and a gaze direction vector POV-V.

During the rendering process, a control module (e.g., FIG. 4 reference numeral 250 or FIG. 3 reference numeral 150) may construct an image plane IPL that is orthogonal to the head of vector POV1. The control module may then geometrically project the model GOM onto the image plane IPL. For example, FIG. 20 shows a vertex MV has been projected to vertex MV' residing on the image plane IPL. Computer techniques to project a 3D object model onto a 2D plane are known in current art, such as matrix coordinate transforms.

Further, the rendering process may define a viewable portion of the final rendered image. For example, the control module may map a first clipped outline CLO1 onto the image plane IPL forming a first image window IW1.

The control module may then map and paint polygon surfaces of the object model GOM onto the image plane IPL. For example, graphic paint techniques in current art may include texture mapping and gouraud shading. Further, the control module may clip the painted image such that only the interior of the image window IW1 is painted with pixels.

The control module may then transfer the image window IW1 pixels to a video adapter (e.g., FIG. 4 reference numeral 266 or FIG. 3 reference numeral 166) for video output to an image display D1R.

The system may further align a first image and a second image for display. For example, the control module may use a second point of view POV2 that coincides with the first point of view POV1. The control module may use the second point of view POV2 to map a second clipped outline CLO2 to the image plane IPL, forming a second image window IW2. Whereupon, the control module may paint polygon surfaces of the object model GOM within window IW2 and transfer the window IW2 pixels to a video adapter (e.g., FIG. 4 reference numeral 266 or FIG. 3 reference numeral 166) for output to a second image display D2R. This results in a first display image IM1 and a second display image IM2 to form an at least partially aligned and combined image IMC, as presented by displays D1R and D2R.

Since the system (e.g., reference numeral 50 in FIG. 1) may generate graphics for multiple displays, the rendering technique may be used for each display within the system. That is, each display may have an independent and moveable graphic point of view POV1, such that each rendered display image may show a different perspective of the graphic object model GOM.

Interactive Control of Remote Displays

Figure 21:
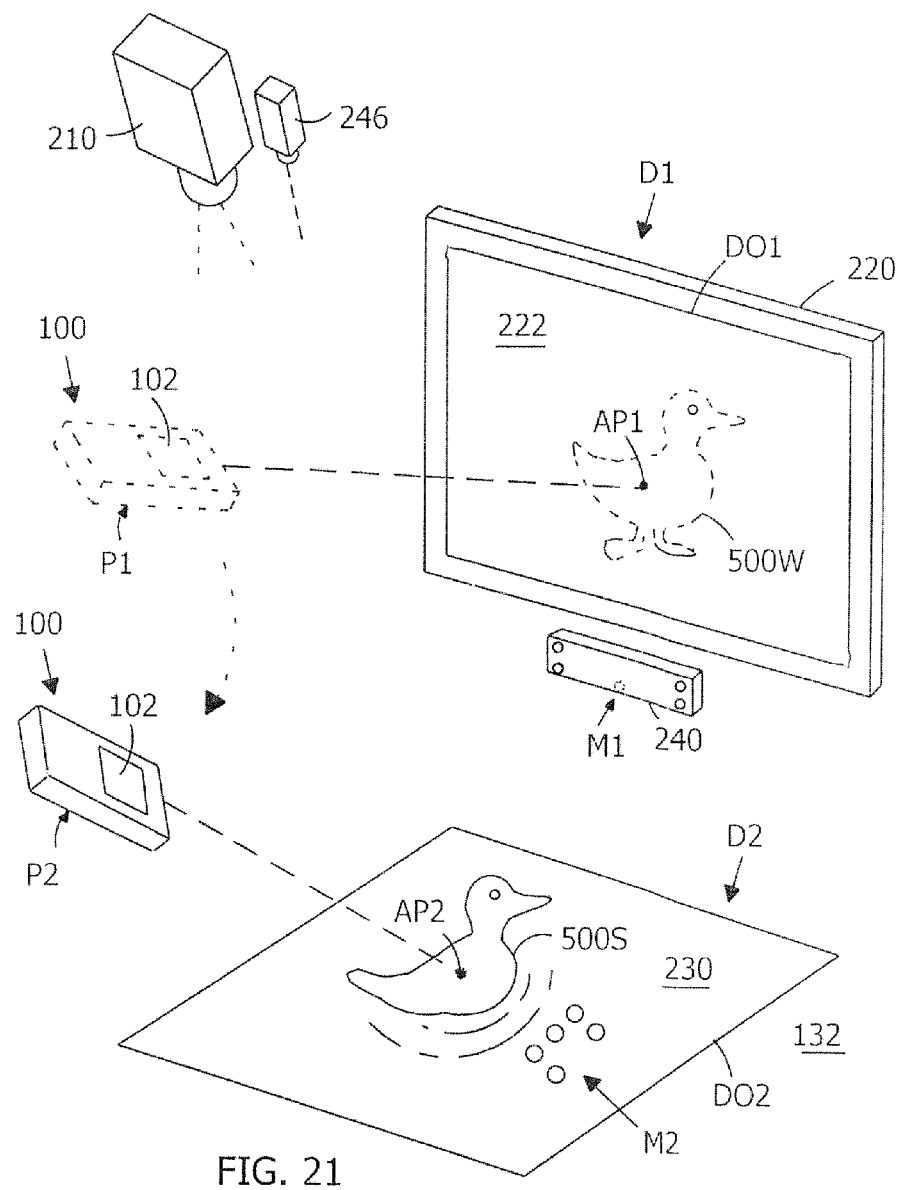
FIG. 21 is a perspective view of a controller in a first position controlling a first remote display, and then the controller is moved to a second position, where the controller controls a second remote display.

Turning now to FIG. 21, there presented is a display configuration having two remote displays being controlled by a user (not shown) moving the handheld controller 100 through space. The first remote display D1 may be comprised of display panel 220 mounted on a wall, with marker M1 located on bar emitter 240 located below image 222. The second remote display D2 may be comprised of projector 210 and beam emitter 246 mounted on a ceiling, creating the projected image 230 and marker M2 on surface 132, such as a floor. The controller 100 may not require a controller projector (as shown earlier in FIG. 1, reference numeral 110). Though not shown, the console (reference numeral 200 in FIG. 1) may be included in the current configuration.

In an exemplary operation, the controller 100 is located at a position P1 and aimed towards an aim point AP1. The system may determine that aim point AP1 exists inside a display outline DO1. If the system determines that controller 100 is aimed towards the vicinity of the first remote display D1, the system may modify the display D1 image in accordance to the movement of controller 100.

For example, if controller 100 is moved downwards, a walking duck 500W appears to move downwards on display D1. The system may create auditory effects (e.g., feet stomp) and haptic effects (e.g., controller vibration) that are coordinated with the modified display D1.

The user may then aim the controller 100 towards the vicinity of the first remote display D1 and press the keypad 102, generating an input signal within the system. The system may take receipt of the input signal and create an aim-and-click event. Subsequently, the system may modify display D1 image, such as causing the duck 500W to wiggle its tail, along with creating coordinated audio and haptic effects.

If controller 100 is moved farther down, the system computed aim point (not shown) may exist outside of the display outline DO1. Subsequently, the system may modify display D1 image, such that the duck 500W appears to move outside panel image 222 and is no longer visible on display D1.

Then, as shown in FIG. 21, the controller 100 may be at position P2 and aimed towards an aim point AP2. The system may determine that aim point AP2 exists inside a display outline DO2. If the controller 100 is aimed towards the vicinity of the second remote display D2, the system may modify display D2 image in accordance with the movement of controller 100.

For example, as controller 100 moves to the right, a swimming duck 500S moves to the right on display D2. The system may further produce auditory effects (e.g., water splashing) and haptic effects (e.g., the controller 100 vibrates) coordinated with the modified display D2.

The user may then aim the controller 100 towards the vicinity of the second remote display D2 and press the keypad 102, generating a user input signal within the system. The system may take receipt of the input signal and create an aim-and-click event. Whereby, the system may modify display D2 image, such as causing duck 500S to dive underwater, along with producing coordinated audio and haptic effects.

Alternative display configurations may use any number and types of markers and remote displays, such as projected displays and/or panel displays. For example, there may be displays on the floor, ceiling, and walls creating an immersible virtual world.

Alternative display configurations may have a plurality of remote displays spatially separated, juxtaposed, and/or overlapped.

Alternative configurations may have more than one moveable controller able to modify the displays.

Alternative configurations may have at least one moveable controller that moves a cursor, character, vehicle, avatar, document, and/or other graphic element on the displays.

Method for Control of Remote Displays

Figure 22:
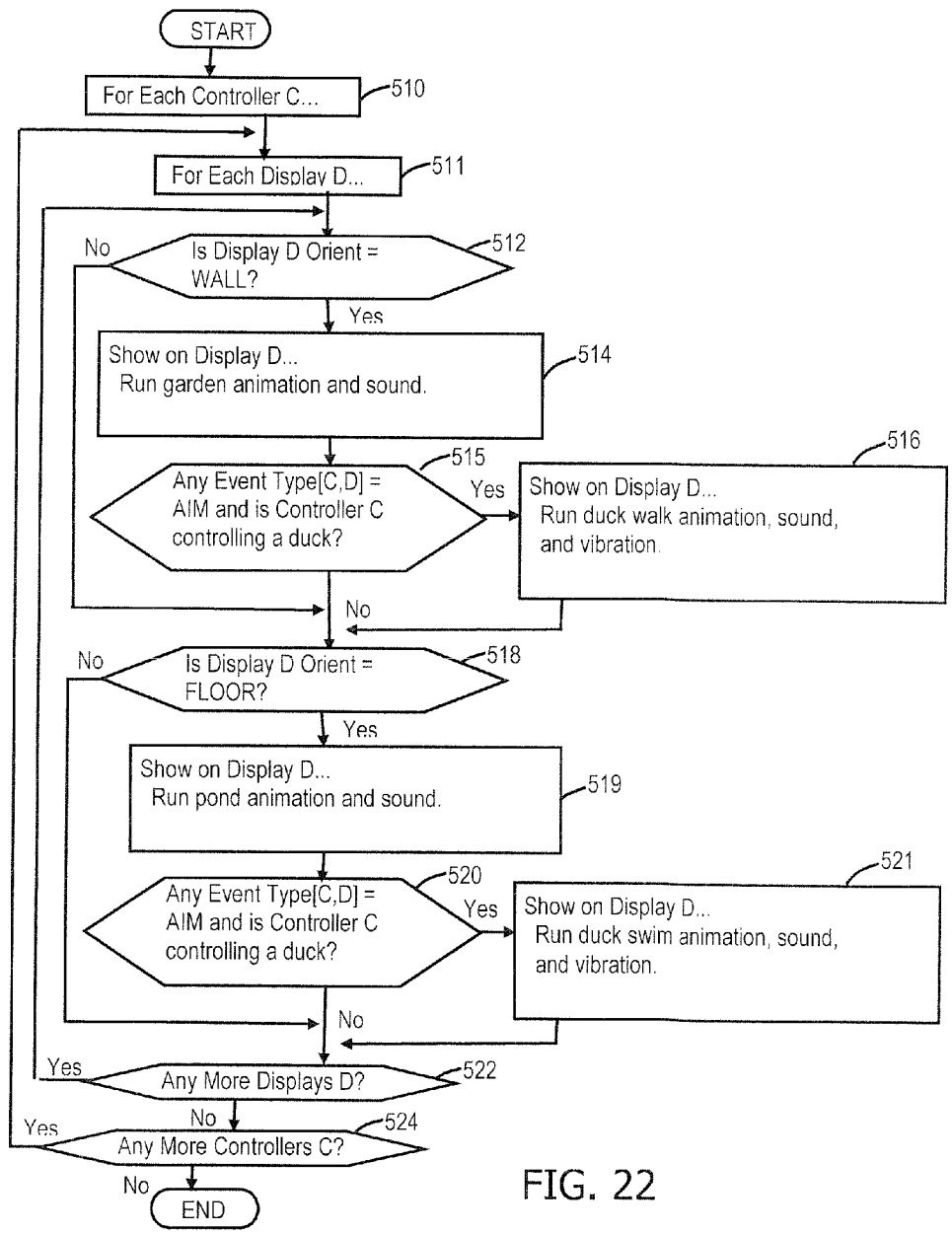
FIG. 22 is a flow diagram of a method that operates the remote displays of FIG. 21.

For illustrative purposes, FIG. 22 shows a method to operate some functions of the previously shown remote displays (of FIG. 21). This method may be invoked periodically (e.g., every 1/30 second) by another operation (e.g., such as by FIG. 11, step 287) and executed by the console control module (e.g., FIG. 1 reference numeral 250).

Starting with step 510, a control module (e.g., FIG. 1 reference numeral 250) selects each controller from the Active Controller List, starting with controller C.

In step 511, the control module selects each display from the Active Display List, starting with display D.

In step 512, if the control module determines that display D has a wall orientation (where Display D Orient=WALL as defined earlier in step 316, FIG. 13A), then continue to step 514. Otherwise, skip to step 518.

In step 514, the control module (e.g., FIG. 1 reference numeral 250) initializes and runs (e.g., that is, coordinate graphic rendering and generate at least one discrete video signal as described by FIGS. 1, 4, 20, etc.) a background graphic animation of "green grass" presented on display D and further initializes and runs (e.g., coordinate and generate at least one discrete audio signal as described by FIGS. 1, 4, etc.) an audio playback of "crickets chirping."

In step 515, if the control module determines any Event Type[C,D]=AIM (as defined earlier in step 485, FIG. 19A) where controller C is aimed at display D and is controlling a duck character, continue to step 516. Otherwise, skip to step 518.

In step 516, the control module (e.g., FIG. 1 reference numeral 250) initializes and runs (e.g., that is, coordinate graphic rendering and generate at least one discrete video signal as described by FIGS. 1, 4, 20, etc.) a graphic animation of a "walking duck" centered on the controller C Aim Point presented on display D and further initializes and runs (e.g., coordinate and generate audio and haptic signals as described by FIGS. 1, 4, etc.) the audio and haptic effects to accompany the graphics.

Continuing to step 518, if the control module determines that display D has a floor orientation (where Display D Orient=FLOOR as defined earlier in step 316, FIG. 13A), then continue to step 519. Otherwise, skip to step 522.

In step 519, the control module (e.g., FIG. 1 reference numeral 250) initializes and runs (e.g., that is, coordinate graphic rendering and generate at least one discrete video signal as described by FIGS. 1, 4, 20, etc.) a background graphic animation of "pond water" presented on display D and further initializes and runs (e.g., coordinate and generate at least one discrete audio signal as described by FIGS. 1, 4, etc.) an audio playback of "croaking frogs."

In step 520, if the control module determines any Event Type[C,D]=AIM (as defined earlier in step 485, FIG. 19A) where controller C is aimed at display D and is controlling a duck character, continue to step 521. Otherwise, skip to step 522.

In step 521, the control module (e.g., FIG. 1 reference numeral 250) initializes and runs (e.g., that is, coordinate graphic rendering and generate at least one discrete video signal as described by FIGS. 1, 4, 20, etc.) a graphic animation of a "duck swimming on water" centered on the controller C Aim Point presented on display D and further initializes and runs (e.g., coordinate and generate audio and haptic signals as described by FIGS. 1, 4, etc.) the audio and haptic effects to accompany the graphics.

Then in step 522, if the control module determines more displays need processing, select the next display D from Active Display List and go back to step 512. Otherwise, continue to step 524.

In step 524, if the control module determines more controllers need processing, then select the next controller C from Active Controller List and go back to step 511. Otherwise, the method ends.

Remote Display Aligned with a Remote Display

Figure 23:
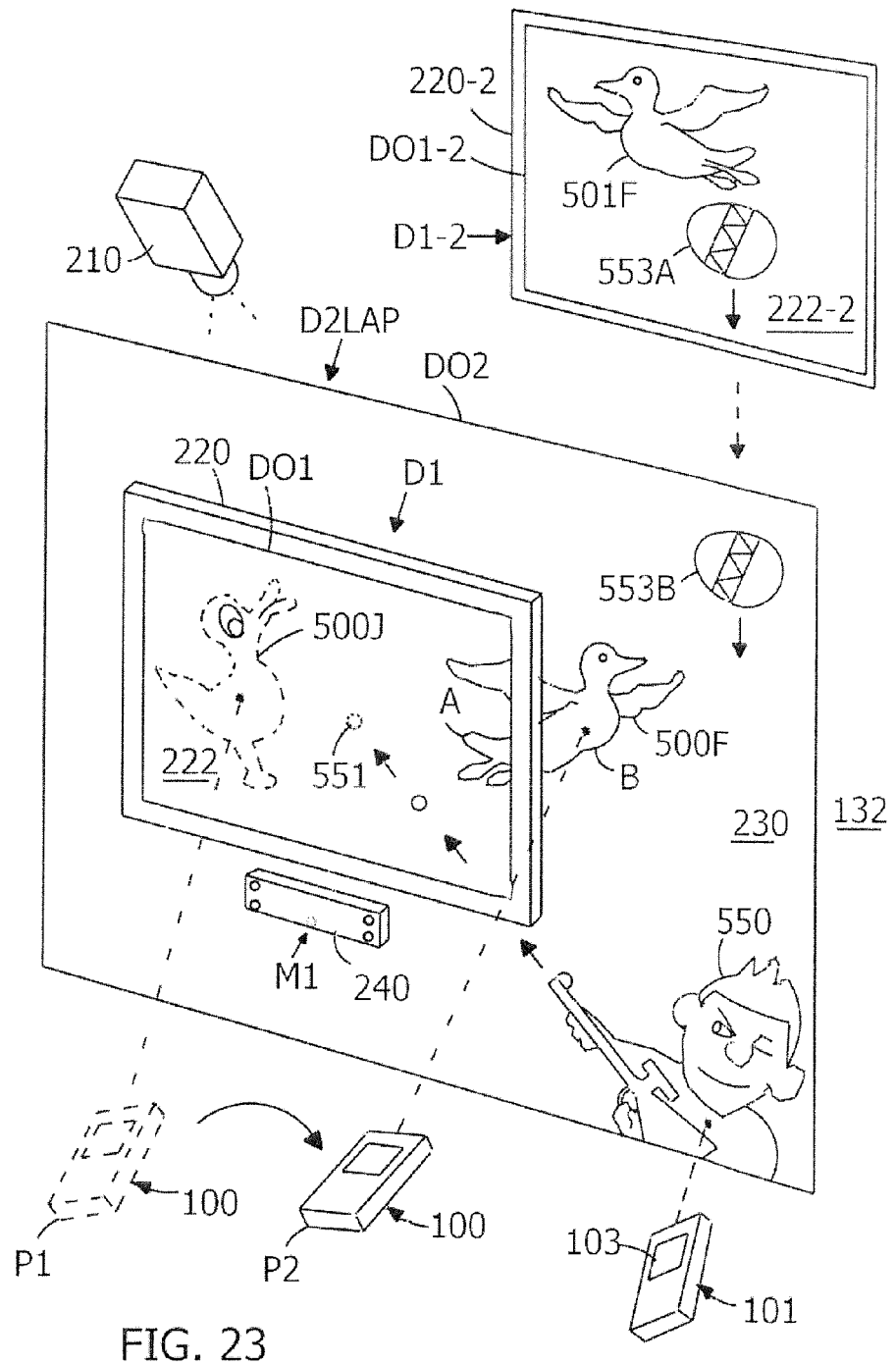
FIG. 23 is a perspective view of remote display images aligned with another remote display image.

Turning now to FIG. 23, presented is a perspective view of aligned remote display images. The displays are being controlled by a user (not shown) moving the controller 100, and another user (not shown) moving a controller 101 having keypad 103.

The remote display D1 may be seen overlapping a remote display D2LAP, along with a remote display D1-2. The remote display D1 is comprised of display panel 220 having panel image 222. Remote display D2LAP is comprised of projector 210 (e.g., mounted to ceiling) illuminating its projected image 230 on the surface 132. Finally, remote display D1-2 is comprised of a display panel 220-2 having a panel image 222-2. All three displays D1, D2LAP, and D1-2 share the same marker M1 and bar emitter 240 for position sensing.

Remote displays D1, D2LAP, and D1-2 have been pre-calibrated and pre-clipped in a previous operation (e.g., as in FIGS. 13A-13B). Further, controllers 100 and 101 may not require a controller projector (as discussed earlier in FIG. 1, reference numeral 110). Though not shown, the console (reference numeral 200 in FIG. 1) may be included in the current configuration.

In an exemplary operation, the system may clip a first remote display image such that an at least portion of the image does not appear on a second remote display image. Further, the system may clip a remote projected image such that an at least portion of the image does not appear on a remote panel image.

For example, the system may compute display outlines DO1, DO2, and DO1-2 for displays D1, D2LAP, and D1-2, respectively. Whereby, if the system determines that the display outline DO2 of the projected image 230 overlaps the panel image 222, the system may clip the projected image 230 such that an at least portion of the image 230 does not appear on the panel image 222. In the current configuration, the system clips the projected image 230 such that image 222 is substantially not illuminated by projector 210.

The system may modify a first remote display image and a second remote display image such that an at least partially aligned and combined image is formed. Moreover, the system may modify a panel image and a projected image such that an at least partially aligned and combined image is formed.

For example, when keypad 103 is pressed on controller 101, a user input signal may be received by the system. Whereupon, the system may modify display images 230 and 222 such that a hunter 550 fires his gun, sending a graphic projectile 551 moving in a straight line across display D2LAP and display D1. Moreover, when controller 100 is moved from position P1 to position P2, a jumping duck 500J takes flight as a flying duck 500F, where a tail part A exists on the panel image 222 and a body part B exists on the projected image 230. Hence, the system may modify the first display D1 image and second display D2LAP image such that an at least partially aligned and combined image is formed.

Additionally, the system may modify a first remote display image and a second remote display image such that at least partially aligned and separated images are formed. Moreover, the system may modify a panel image and a projected image such that at least partially aligned and separated images are formed.

For example, the third display D1-2 with image 222-2 shows a flying duck 501F drop an egg 553A that moves downward on display D1-2 until it disappears. A moment later on display D2, an egg 553B reappears moving downward towards hunter 550. As can be seen, the path of eggs 553A and 553B remains straight and aligned, even though the displays D2LAP and D1-2 are separated.

In some alternative configurations of aligned remote displays, the system may user any number and types of markers and remote displays.

In some alternative configurations, the system may have a plurality of remote image displays that are separated, juxtaposed, and/or overlapped. In some alternative configurations, the system may have a plurality of remote display images clipped and/or aligned.

Controller Display Dissociates from a Remote Display

Figure 24:
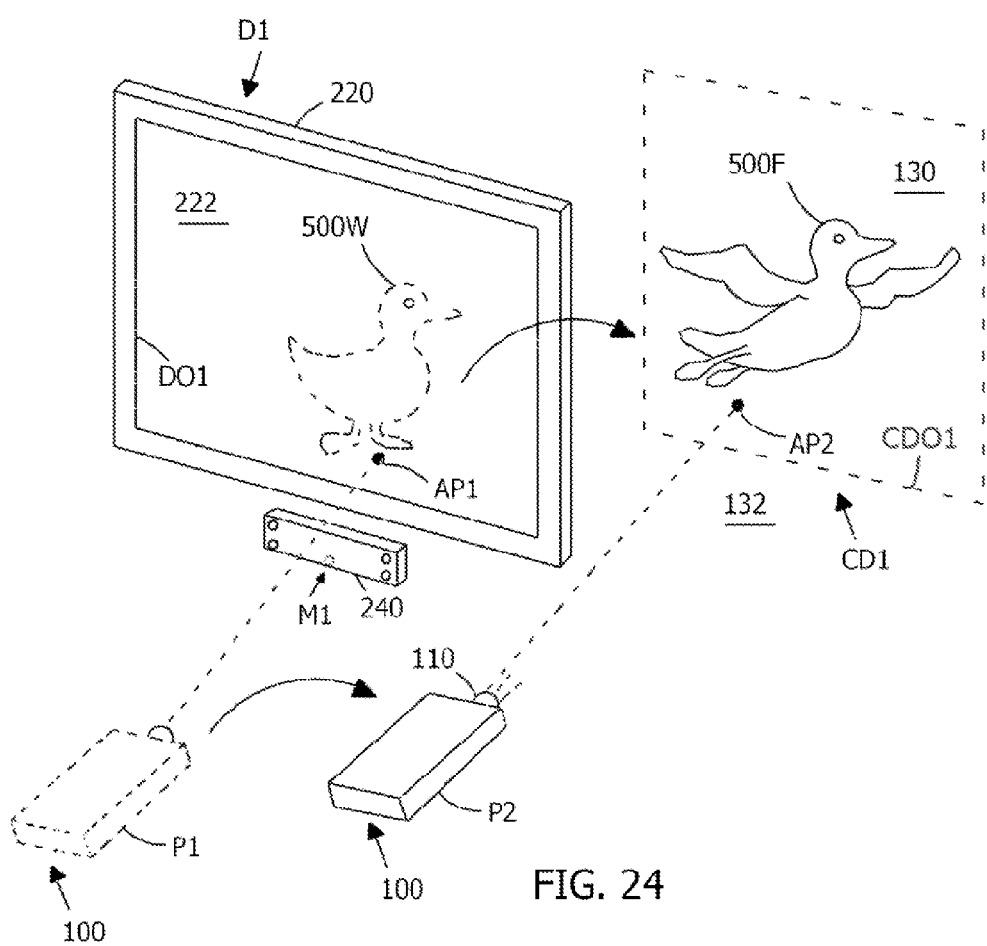
FIG. 24 is a perspective view of a controller display that disassociates an at least partial image from a remote display.

Turning now to FIG. 24, presented is a perspective view of another display configuration, where a controller display dissociates from a remote display. The displays are being controlled by a user (not shown) moving the controller 100.

As can be seen, remote display D1 may be comprised of display panel 220 having panel image 222 with walking duck 500W. Marker M1 and bar emitter 240 may be used for position sensing. The controller 100 may include the controller projector 110 (as discussed earlier in FIG. 1, reference numeral 110). Though not shown, the console (shown in FIG. 1, reference numeral 200) may be included in the current configuration.

During an exemplary operation, the system may disassociate an at least partial image from a remote display, and present the at least partial image on a controller display. The system may also coordinate audio and haptic effects with the modified remote display and controller display.

For example, controller 100 may be moved to a position P1 having an aim point AP1. The system may determine that aim point AP1 exists inside a display outline DO1. Whereby, if the controller 100 is aimed towards the vicinity of the remote display D1, the system may modify the remote display D1 in accordance with the movement of controller 100.

For example, if controller 100 at position P1 moves to the right, a walking duck 500W moves to the right on remote display D1. Further, the system may produce audio effects (e.g., walking feet) and haptic effects (e.g., controller vibration) that are coordinated with the modified display D1.

Now the controller 100 may be moved to a position P2 having an aim point AP2. The system may determine that the aim point AP2 is outside the display outline DO1. Whereby, if the controller 100 is aimed away from the vicinity of the remote display D1, the system may activate the controller display CD1.

For example, the system may activate the controller display CD1 having a projected image 130 of a flying duck 500F on surface 132, such as an adjacent wall. The system may coordinate audio effects (e.g., wings flapping) and haptic effects (e.g., controller vibration) with the modified controller display CD1 image.

At substantially the same time, the system may modify the remote display D1 by removing the image 222 of the walking duck 500W, such that the image 222 has disassociated from remote display D1 and reappears on the controller display CD1. Understandably, the user may be surprised by the visual effect where the duck appears to "jump out" of the remote display D1 onto a nearby wall (e.g. reference numeral 132).

The controller display CD1 of the flying duck 500F may be moved about the user's environment by aiming the controller 100 in various directions, such as at a floor or ceiling.

Moreover, the flying duck 500F image 130 may disassociate from the controller display CD1 and return to the remote display D1 by aiming the controller 100 towards the vicinity of the remote display D1. Whereby, the system deactivates the controller display CD1 and modifies the remote display D1 so the walking duck 500W is displayed again. The system may coordinate audio effects (e.g., duck landing) and haptic effects (e.g., controller vibration) with the modified display D1 image 222.

To avoid undesired visual effects, the system may activate the controller display CDI upon trigger events, such as but not limited to: 1) the controller 100 is aimed away from the vicinity of the remote display D1; 2) the controller's aim point AP2 is outside the remote display outline DO1; 3) an at least portion of the controller display outline CDO1 is outside the remote display outline DO1; 4) the controller 100 is aimed at a specific position on the remote display D1; 5) the controller keypad 102 was pressed at a specific time; 6) the controller 100 was moved in a specific pattern of motion; and/or 7) the program application has reached a specific state (e.g., game level=5).

As suggested above, when the controller display CD1 is activated, the controller projector 110 presents an at least partially lighted image 130 on a projection surface. The system may activate the controller display CD1 using various techniques, such as but not limited to: 1) establish at least one substantially lit image pixel (e.g., white, green, blue, red, etc. colored pixel) in the controller projector's 110 video display buffer; and/or 2) activate the projector's light source of the controller projector 110.

In contrast, when the controller display CD1 is deactivated, the controller projector 110 presents a substantially unlit or dimmed image 130 on a projection surface. The system may deactivate the controller display CD1 using various techniques, such as but not limited to: 1) establish substantially unlit or dimmed image pixels (e.g. black colored pixels) in the controller projector's 110 video display buffer; and/or 2) deactivate or dim the projector's light source of the controller projector.

In some alternative configurations, the system may use a controller display along with any number and types of markers and remote displays.

In some alternative configurations, the system be able to dissociate an at least partial image of a cursor, character, vehicle, avatar, menu, document, or element from a remote display and present the at least partial image on a controller display.

In some alternative configurations, the system may disassociate an at least partial image from a remote display and present the at least partial image on a plurality of controller displays.

In some alternative configurations, the system may disassociate an at least partial image from a plurality of controller displays and present the at least partial image on a remote display.

Methods for Controller Display Dissociation

Figure 25A:
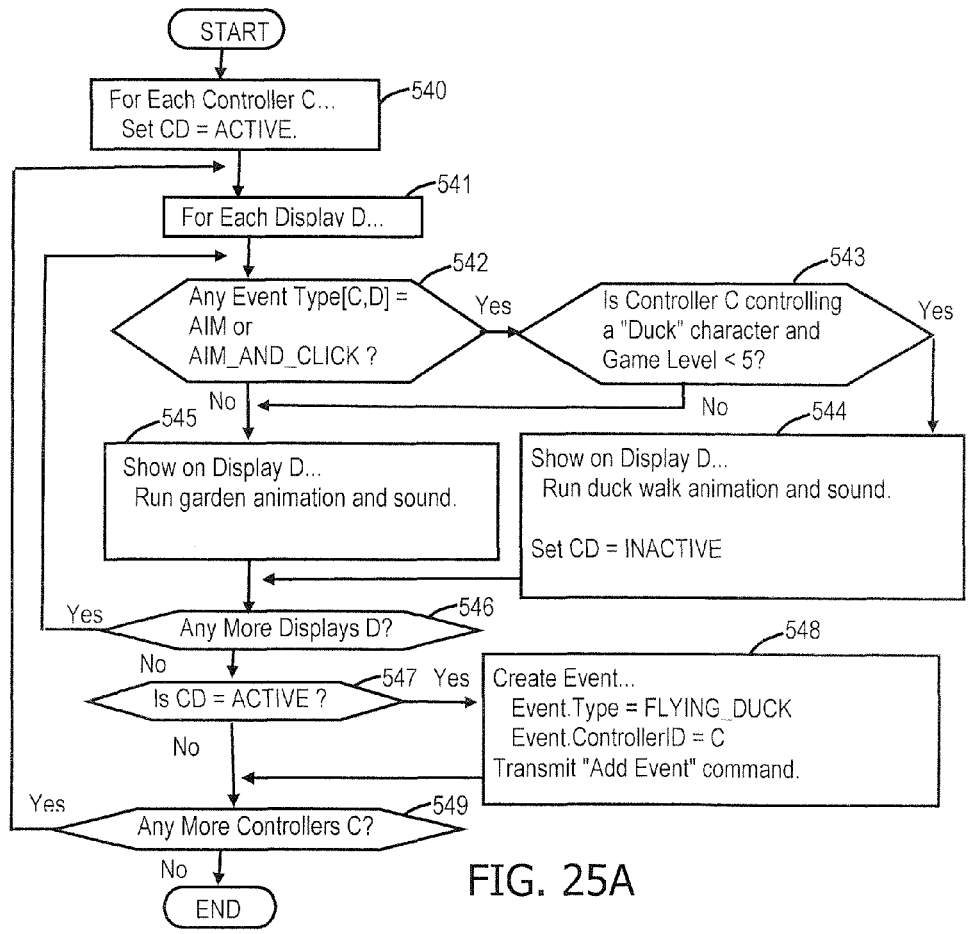
FIG. 25A is a flowchart of a method that operates the remote display of FIG. 24.
Figure 25B:
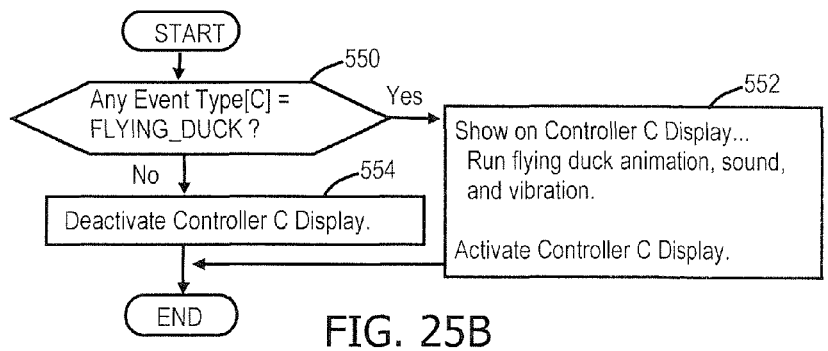
FIG. 25B is a flowchart of a method that operates the controller display of FIG. 24.

For illustrative purposes, FIGS. 25A and 25B show methods to operate some functions of the previously shown display configuration (in FIG. 24) where an image dissociates from a remote display. The methods of FIG. 25A and FIG. 25B may be invoked periodically (e.g., every 1/30 second) by the console control module (e.g., FIG. 1 reference numeral 250) and controller control module (e.g., FIG. 1 reference numeral 150).

Turning now to FIG. 25A, a method for the console and its console control module is presented.

Beginning with step 540, the console control module selects each controller from the Active Controller List, starting with controller C. The control module then sets a variable CD=ACTIVE.

In step 541, the console control module selects each display from the Active Display List, starting with display D.

In step 542, if the console control module searches the event queue in memory and finds an Event Type=AIM or AIM_AND_CLICK for controller C and display D (as defined earlier in steps 484 and 485, FIG. 19A), then continue to step 543. Otherwise, skip to step 546.

In step 543, if the console control module determines that controller C is controlling the duck character and the user has reached a specific game level, then continue to step 544. Otherwise, skip to step 545.

In step 544, the console control module (e.g., FIG. 1 reference numeral 250) creates and runs (e.g., coordinate graphic rendering and generate at least one discrete video signal as described by FIGS. 1, 4, 20, etc.) a graphic animation of a "walking duck" centered on the controller C Aim Point presented on display D. Further, the control module creates and runs (e.g., coordinate and generate audio and haptic signals as described by FIGS. 1, 4, etc.) the audio and haptic effects to accompany the graphics and further sets the variable CD=INACTIVE, and then the method skips to step 546.

In step 545, the console control module (e.g., FIG. 1 reference numeral 250) creates and runs (e.g., coordinate graphic rendering and generate at least one discrete video signal as described by FIGS. 1, 4, 20, etc.) a graphic animation of "green grass" presented on display D and further creates and runs (e.g., coordinate and generate at least one discrete audio signal as described by FIGS. 1, 4, etc.) the audio effects.

In step 546, if the console control module determines more displays need processing, select the next display D from Active Display List and go back to step 542. Otherwise, continue to step 547.

In step 547, if the console control module determines that CD=ACTIVE, then continue to step 548, or otherwise, skip to step 549.

In step 548, the console control module creates an Event Object comprising attributes, such as Event Type=FLYING_DUCK, Controller ID=C, etc., and stores Event Object in memory. The console control module then transmits an "Add Event" command along with a copy of the new Event Object for system-wide data-synchronization, and continues to step 549.

In step 549, if the console control module determines more controllers need processing, then select the next controller C from the Active Controller List and go back to step 541. Otherwise, the method ends.

So turning now to FIG. 25B, a method for the controller and its controller control module (e.g., FIG. 1 reference numeral 150) is described. Multiple controllers may execute this method concurrently, but to simplify the discussion, only one controller C (e.g., FIG. 1 reference numeral 100) will be discussed.

So starting with step 550, if the controller C control module searches the event queue and finds an Event Type=FLYING_DUCK for controller C, then continue to step 552. Otherwise, skip to step 554.

In step 552, the controller control module (e.g., FIG. 1 reference numeral 150) runs (e.g., coordinate graphic rendering and generate at least one discrete video signal as described by FIGS. 1, 3, 20, etc.) a graphic animation of a "flying duck" on the controller display (e.g., FIG. 24 reference numeral CD1). Further, the control module runs (e.g., coordinate and generate audio and haptic signals as described by FIGS. 1, 3, etc.) the audio and haptic effects to accompany the graphics. Control module then activates the controller display (e.g., FIG. 24 reference numeral CD1) so that an illuminated image is projected from controller C, before the method ends.

In step 554, the controller control module deactivates the controller display so that no illuminated image is projected from controller C, before the method ends.

Controller Display Aligned with a Remote Display

Figure 26:
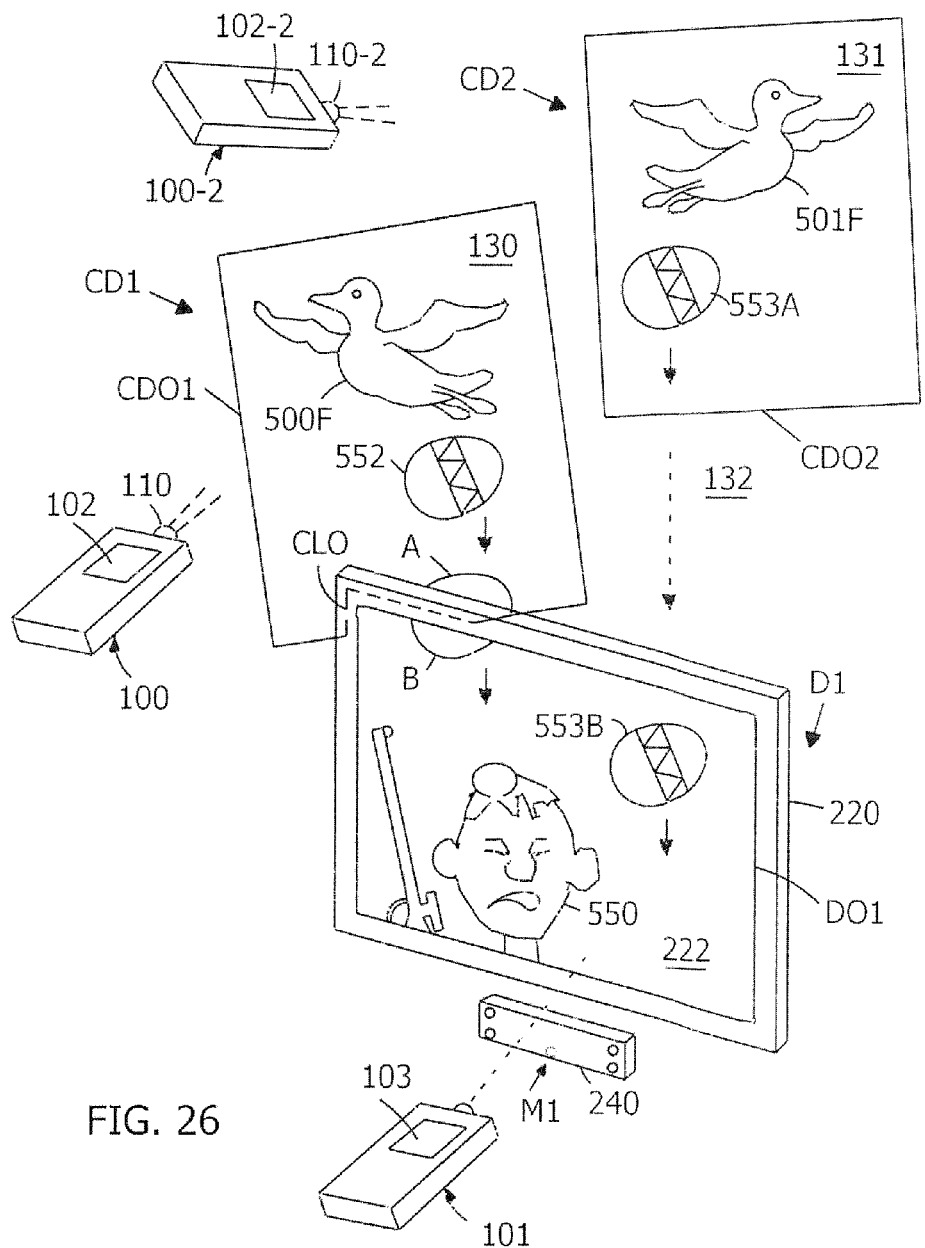
FIG. 26 is a perspective view of controller display images aligned with a remote display image.

Turning now to FIG. 26, presented is a perspective view of another display configuration, where controller displays are aligned with a remote display. The displays are being controlled by a user (not shown) that moves controller 100 having keypad 102, while another user (not shown) moves controller 101 having keypad 103, and another user (not shown) moves controller 100-2 having keypad 102-2.

The remote display D1 may be comprised of display panel 220 with panel image 222. Marker M1 and bar emitter 240 may enable position sensing. Controllers 100 and 100-2 may contain controller projectors 110 and 110-2 that create controller displays CD1 and CD2 with projected images 130 and 131, respectively, on surface 132. Though not shown, the console (as shown in FIG. 1, reference numeral 200) may be included in the current display configuration.

In an exemplary operation, the system may modify a remote display and a controller display such that an at least partially aligned and combined image is formed. The system may also coordinate audio and haptic effects with the at least partially aligned and combined image.

For example, when the keypad 102 is pressed on controller 100, an input signal is created within the system. Whereby, the system may take receipt of the input signal and modify the controller display CD1 image such that the flying duck 500F drops an egg 552 and a partial egg A. Subsequently, when controller 101 is moved a hunter 550 may move on remote display D1, where a partial egg B appears. As can be seen, both partial eggs A and B are modified such that an at least partially aligned and combined image is formed of a substantially whole egg.

Aligning and combining images may be accomplished by the system by computing display outlines CDO1 and DO1 and determining their relative spatial positions. In addition, the system may have the graphic point of views (used for rendering) coincide for both displays CD1 and D1. Whereupon, the system may align and combine the images of both displays CD1 and D1 using image aligning techniques adapted from current art.

The system may clip a controller display image such that an at least portion of the image does not appear on a remote display. For example, the system may clip the controller display CD1 image 130, as seen by a clipped controller display outline CLO, such that an at least portion of the image does not appear on the remote display D1.

Image clipping may be accomplished by the system by computing display outlines CDO1 and DO1 and determining where the outlines overlap. Whereupon, the system may modify and clip the projected image 130 of display CD1 using image clipping techniques adapted from current art.

In another exemplary operation, the system may modify a remote display image and a controller display image such that at least partially aligned and separated images are formed. The system may coordinate audio and haptic effects with the at least partially aligned and separated images.

For example, when the keypad 102-2 is pressed on controller 100-2, another input signal is created within the system. Whereby, the system may take receipt of the input signal and modify the controller display's CD2 image 131 such that the flying duck 501F drops an egg 553A. The egg 553A moves downward until disappearing outside a controller display outline CDO2. A moment later, an egg 553B appears, moving downward on remote display D1. Whereby, even though the controller display CD2 and remote display D1 are spatially separated, the position of the first egg 553A appears to move on a straight path to the position of the second egg 553B. Hence, the system modifies the controller display's CD2 image 131 and the remote display D1's image 222 such that at least partially aligned and separated images are formed.

Image alignment may be accomplished by the system by computing display outlines CDO2 and DO1 and determining their relative spatial positions. In addition, the system may have the graphic point of views (used for rendering) coincide for both displays CD2 and D1. Whereupon, the system may modify and align the images of displays CD2 and D1 using image aligning techniques adapted from current art.

In some alternative configurations, the system may align a controller display with any number and type of remote displays, such as projected displays and/or panel displays.

In some alternative configurations, the system may have a plurality of controllers, where each controller may align its controller display with one or more remote displays.

Controller Display Dissociation from a Controller Display

Figure 27:
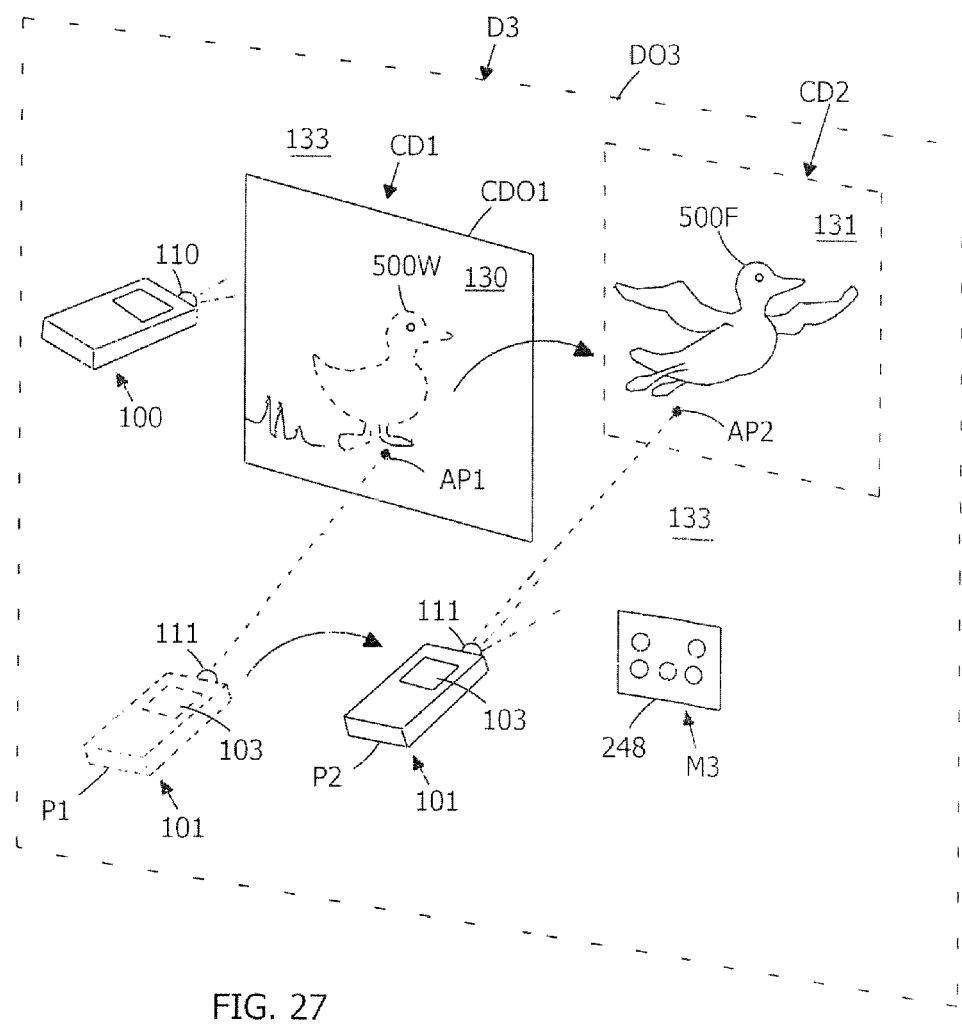
FIG. 27 is a perspective view of a controller display that dissociates an at least partial image from another controller display.

Turning now to FIG. 27, there presented is a display configuration where a controller display disassociates from another controller display. A user (not shown) may be moving controller 100 through space, while another user (not shown) may be moving controller 101 having keypad 103 through space. The controllers 100 and 101 may each include controller projectors 110 and 111, respectively. As shown, controller 100 with projector 110 is illuminating the projected image 130 on the defined surface 133, such as a wall.

Surrounding the area, an imaginary display D3 (defined by display outline DO3) may be comprised of the light reflector 248 that creates marker M3 on the defined surface 133. The imaginary display D3 has been pre-calibrated with the system.

Though not shown, the console (as shown in FIG. 1, reference numeral 200) may be included in the current display configuration.

During an exemplary operation, the system may disassociate an at least partial image from a first controller display, and present the at least partial image on a second controller display. The system may also coordinate audio and haptic effects with the disassociated image.

For example, when controller 101 is located at position P1, its projector 111 may be inactive. Further, the system may compute an aim point AP1 and a controller display outline CDO1. If the system determines that aim point AP1 is inside the region of outline CDO1, the system may modify the controller display CD1 in accordance with the movement of controller 101. That is, if controller 101 moves to the right, the walking duck 500W moves to the right on controller display CD1. Further, the system may produce audio effects (e.g., walking feet) and haptic effects (e.g., controller vibration) that are coordinated with the modified image of the controller display CD1.

Then controller 101 may be moved to position P2. Whereupon, the system may compute an aim point AP2 and controller display outline CDO1. If the system determines that aim point AP2 is outside the region of outline CDO1, the system may activate a controller display CD2 presenting a projected image 131 of a flying duck 500F on surface 133. Further, the system may produce audio effects (e.g., wings flapping) and haptic effects (e.g., the controller vibration) that are coordinated with the modified image of the controller display CD2.

At substantially the same time, the system may modify the controller display CD1 by removing the image of the walking duck 500W. Whereby, the duck image appears to disassociate from controller display CD1 and reappear on controller display CD2. The controller display CD2 of the flying duck 500F may be moved about the user's environment by aiming the controller 101 in various directions, such as at a floor or ceiling.

The system may also disassociate the flying duck 500F image from the controller display CD2 and, once again, present the image on controller display CD1. That is, when the controller 101 is aimed towards the vicinity of controller display CD1, the system may deactivate controller display CD2 and modify the first controller display CD1 so the walking duck 500W is presented again. The system may again produce audio effects and haptic effects that are coordinated with modified controller display CD1.

To avoid unwanted visual effects, the system may activate and deactivate the controller displays in a controlled manner, similar to that explained for the previous controller display configuration (shown in FIG. 24).

In some alternative configurations, the system may use the controller displays along with any number and types of markers and remote displays, such as a passive marker and projected display.

In some alternative configurations, the system be able to dissociate an at least partial image of a cursor, character, vehicle, avatar, menu, document, or element from a first controller display and present the at least partial image on a second controller display.

Controller Display Aligned with a Controller Display

Figure 28:
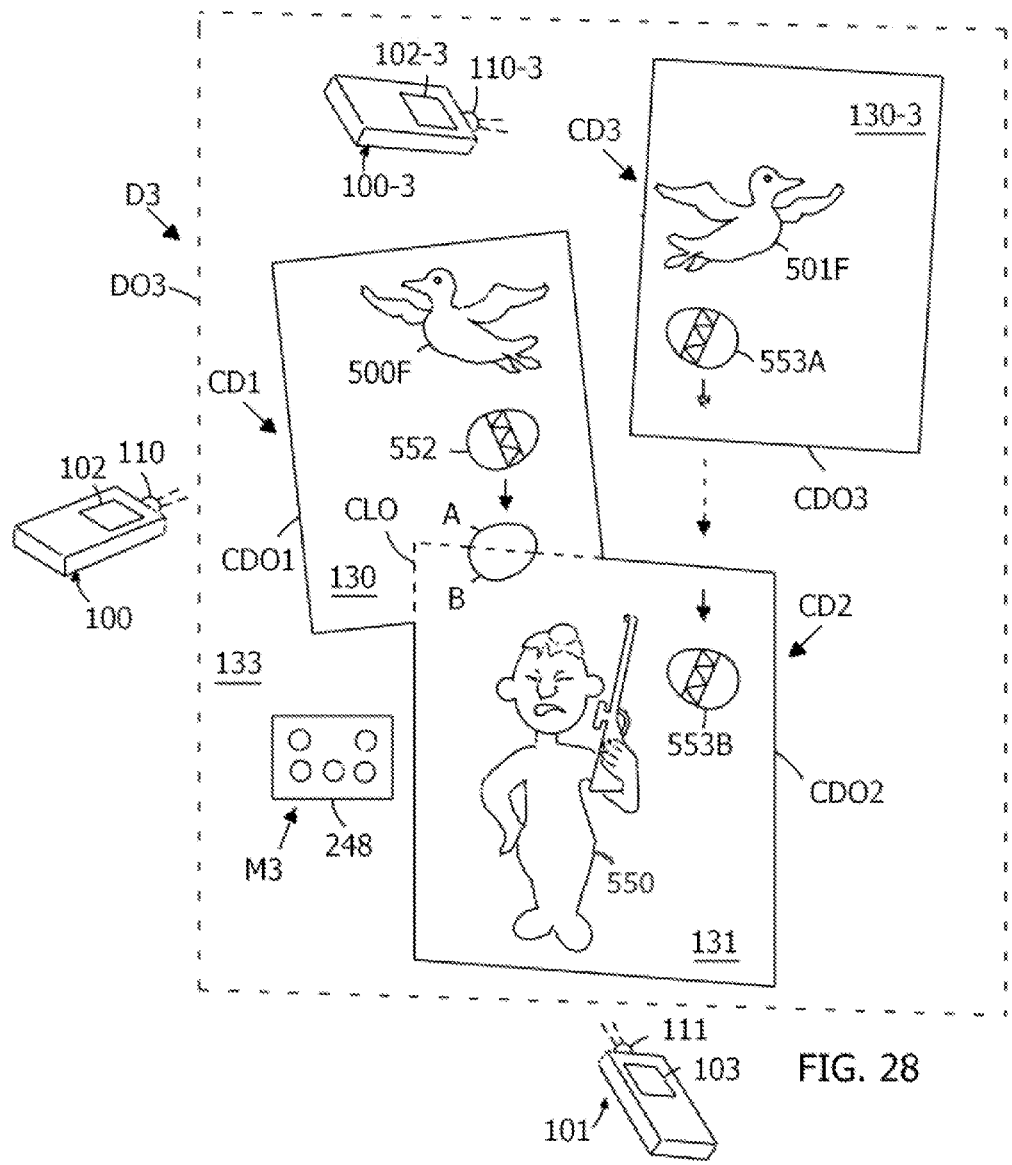
FIG. 28 is a perspective view of controller display images that are aligned with another controller display image.

Turning now to FIG. 28, there presented is another display configuration where controller displays are aligned. A user (not shown) may be moving controller 100 having keypad 102, while another user (not shown) may be moving controller 101 having keypad 103, while yet another user (not shown) may be moving controller 100-3 having keypad 102-3. The controllers 100, 101, 100-3 may each include controller projectors 110, 111, and 110-3 that create projected images 130, 131, 130-3 for the controller displays CD1, CD2, and CD3, respectively.

Surrounding the area, an imaginary display D3 (defined by display outline D03) may be comprised of the light reflector 248 that creates marker M3 on the defined surface 133. The imaginary display D3 has been pre-calibrated with the system.

Though not shown, the console (as shown in FIG. 1, reference numeral 200) may be included in the current display configuration.

During an exemplary operation, the system may modify a first controller display and a second controller display such that an at least partially aligned and combined image is formed. The system may also coordinate audio and haptic effects with the aligned and combined controller display images.

For example, when the keypad 102 is pressed on controller 100, an input signal may be created within the system. Whereby, the system may take receipt of the input signal and modify the controller display CD1 image such that the flying duck 500F drops an egg 552 and a partial egg A. Subsequently, controller 101 may move the hunter 550 within controller display CD2, where a partial egg B appears. As can be seen, both partial eggs A and B are aligned and combined to form a substantially whole egg.

Aligning and combining images 130 and 131 may be accomplished by the system by computing controller display outlines CDO1 and CDO2 and determining their relative spatial positions. In addition, the system may have the graphic point of views (used for graphic rendering) coincide for both displays CD1 and CD2. Whereupon, the system may align and combine the images 130 and 131 of both displays CD1 and CD1 using graphic aligning techniques adapted from current art.

The system may clip a controller display image such that an at least portion of the image does not appear on another controller display. For example, the system may clip the controller display CD1 image 130, as seen by a clipped controller display outline CLO, such that an at least portion of the image does not appear on the controller display CD2.

Image clipping may be accomplished by the system by computing display outlines CDO1 and CDO2 and determining where the outlines overlap. Whereupon, the system may modify and clip the projected image 130 of display CD1 using image clipping techniques adapted from current art.

In another exemplary operation, the system may modify a first controller display image and second controller display image such that at least partially aligned and separated images are formed. The system may coordinate audio and haptic effects with the at least partially aligned and separated images.

For example, when the keypad 102-3 is pressed on controller 100-3, an input signal is created within the system. Whereby, the system may take receipt of the input signal and modify the controller display CD3 image such that the flying duck 501F drops an egg 553A. The egg 553A moves downward until disappearing outside a controller display outline CDO3. A moment later, an egg 553B appears, moving downward on remote display CD2. Whereby, even though the controller displays CD2 and display CD3 are spatially separated, the position of the first egg 553A appears to move on a straight path to the position of the second egg 553B. Hence, the system modifies the controller display CD2 image and the controller display CD3 image such that at least partially aligned and separated images are formed.

Image alignment may be accomplished by the system by computing display outlines CDO2 and CDO3 and determining their relative spatial positions. In addition, the system may have the graphic point of views (used for graphic rendering) coincide for both displays CD2 and CD3. Whereupon, the system may modify and align the images 131 and 130-3 of displays CD2 and CD3 using graphic aligning techniques adapted from current art.

In some alternative configurations, the system may align controller display images using any number and types of markers and emitters, such as a bar emitter.

In some alternative configurations, the system may align a controller display image with a plurality of other controller displays.

Multi-Image Control System

Figure 29:
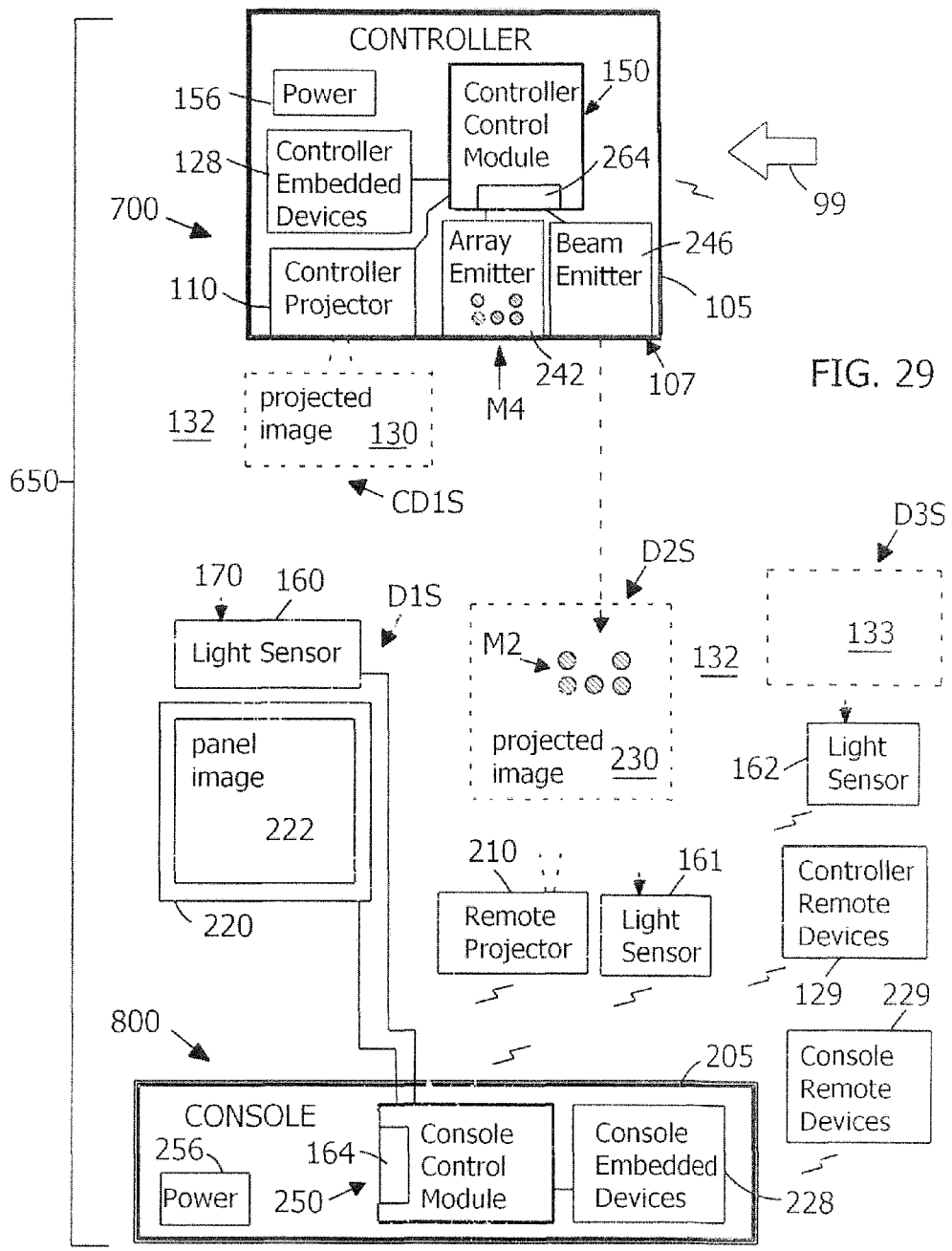
FIG. 29 is a block diagram of a second, alternate embodiment of the present disclosure, referred to as a multi-image control system.

Turning now to FIG. 29, thereshown is a second, alternate embodiment of the present invention, referred to as a multi-image control system 650. Many of the same components described earlier will have similar reference numerals for similar parts. The control system 650 may be comprised of an image-controller 700 and an image-console 800, along with various remote displays. Though the multi-image control system 650 is similar to the previous control system (shown earlier in FIG. 1, reference numeral 50), there are some modifications.

FIG. 29 shows the image-controller 700 may be moved 99 through space and is similar in construction to the previous controller (reference numeral 100 in FIG. 1) except for, but not limited to, the following: 1) the light detect adapter has been replaced with the light emit adapter 264; 2) the light sensor has been replaced with the light array emitter 242 forming marker M4; and 3) the light beam emitter 246 has been added to form marker M2 on the projection surface 132. Moreover, both the light array emitter 242 (as shown earlier in FIG. 5B) and the light beam emitter 246 (shown earlier in FIG. 6A) may be fitted to the controller's 700 housing 105, such that the emitters 242, 246 project light beyond the front end 107 of housing 105 into ambient space. Whereby, when controller 700 is moved through space, the illuminated markers M2 and M4 may move as well. The controller control module 150 may be operatively connected to light array emitter 242, light beam emitter 246, controller projector 110, controller embedded devices 128, and controller remote devices 129.

FIG. 29 also shows that the image-console 800 is similar in construction to the previous console (reference numeral 200 in FIG. 1), except for, but not limited to, the light emit adapter has been replaced with the light detect adapter 164. The console control module 250 may be operatively connected to light sensors 160-162, display panel 220, remote projector 210, console embedded devices 228, and console remote devices 229.

FIG. 29 also shows a panel display D1S, a projected display D2S, and an imaginary display D3S have been modified in respect to the previous remote displays (reference numerals D1, D2, and D3 in FIG. 1). That is, the light emitters/reflectors have been replaced with light sensors 160-162. Each of the light sensors 160-162 may be operatively connected, either by wire or wirelessly, to the console control module 250 of the image-console 800. Each of the light sensors 160-162 may be comprised of a light sensitive device, such as a CMOS or CCD-based camera, photo detector, and/or 3D-depth camera. For example, each of the light sensors 160-162 may be a CMOS or CCD-based camera that is sensitive to infrared light.

Remote Display D1S—Panel Image with Light Sensor

FIG. 29 shows the remote panel display D1S is comprised of the panel image 222, display panel 220, and light sensor 160. The panel image 222 is generated by the display panel 220, such as an LCD- or OLED-based TV. Located substantially nearby or overlapping the panel image 222 is the light sensor 160, which may detect light from marker M4 and transmit a light view signal to the console control module 250. An alternative panel display, similar to display D1S, may be comprised of a display panel having an integral light sensor.

Remote Display D2S—Projected Image with Light Sensor

FIG. 29 also shows the remote projected display D2S comprised of the projected image 230, remote projector 210, and light sensor 161. The projected image 230 is illuminated on projection surface 132 by the remote projector 210 that may be located, for example, on a ceiling or tabletop.

Associated with the remote projector 210 is the light sensor 161, which detects light from position marker M2 and wirelessly transmits a light view signal to the console control module 250. The light sensor 161 may be located at a distance from the projected image 230 such that the light sensor 161 may view the position marker M2 located nearby or overlapping display D2S on projected image 230. Further, an alternative display, similar to display D2S, may be comprised of a projector having an integral light sensor.

Imaginary Display—Defined Surface with Light Beam Emitter

FIG. 29 also shows the imaginary display D3S comprised of defined surface 133 and light sensor 162. Associated with the defined surface 133 is the light sensor 162, which detects light and wirelessly transmits a light view signal to the console control module 250. The sensor 162 may be located at a distance from surface 133 such that light sensor 162 may view a position marker that may be substantially nearby or overlapping display D3S on surface 133, such as marker M2.

Operating the Multi-Image Control System

The reader may recognize the multi-image control system 650 of FIG. 29 uses a different design approach in respect to the previously discussed control system (reference numeral 50 of FIG. 1). Namely, the physical locations of the light emitters and sensors have been switched around. FIG. 29 shows the controller 700 is comprised of light emitters 242 and 246, and the displays D1S, D2S, and D3S are associated with light sensors 160-162. Yet, the behavior and capability of the multi-image control system 650 of FIG. 29 remains substantially equivalent to the previous control system (of FIG. 1). Whereby, most of the operational methods discussed in the previous control system (of FIG. 1) may be readily adapted to the current control system of FIG. 29. For the sake of brevity, only a few aspects of control system 650 will be further discussed.

Method for Computing Controller Positions

Figure 30A:
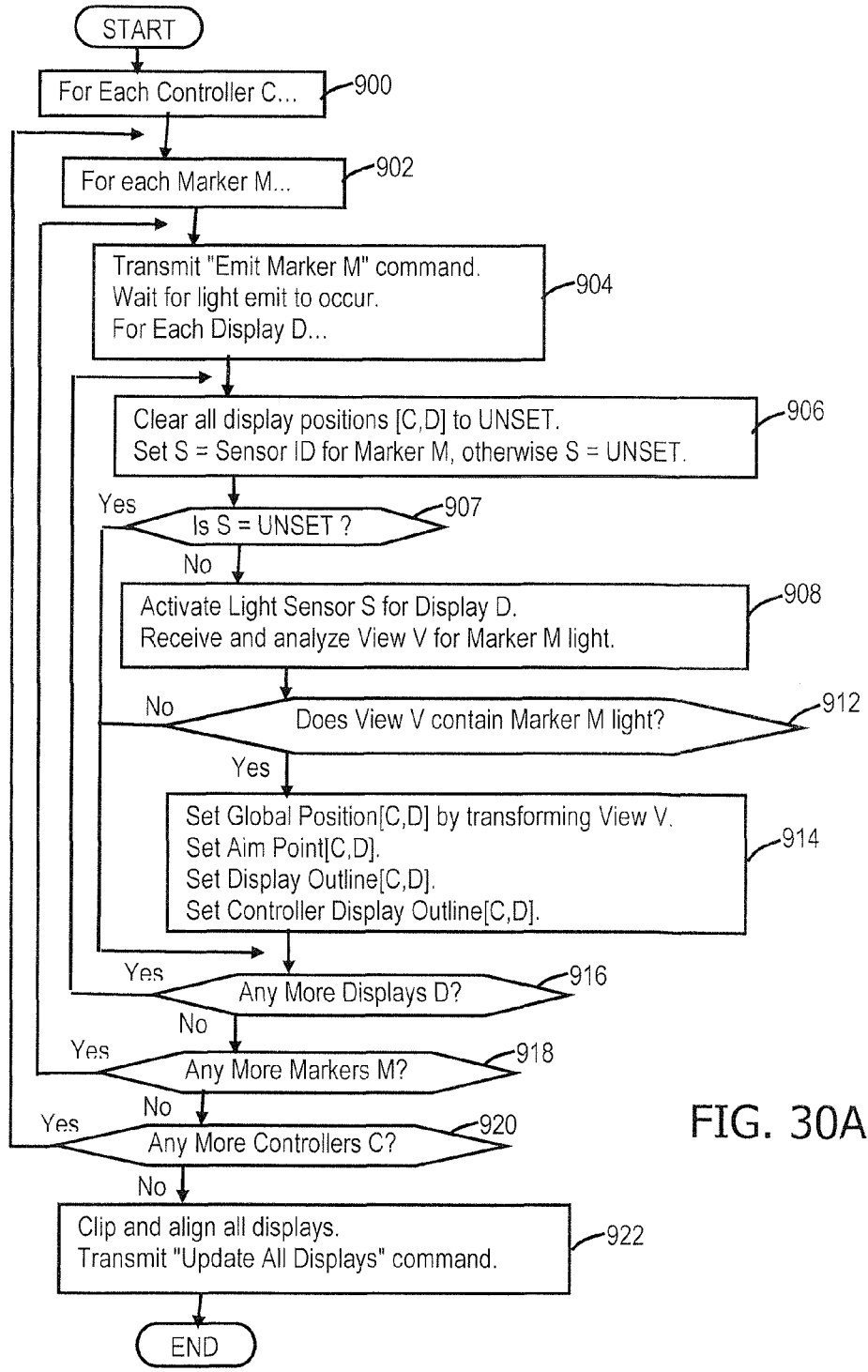
FIG. 30A is a flow diagram of a method for detecting light from position markers and computing controller and display positions for the system of FIG. 29.
Figure 30B:
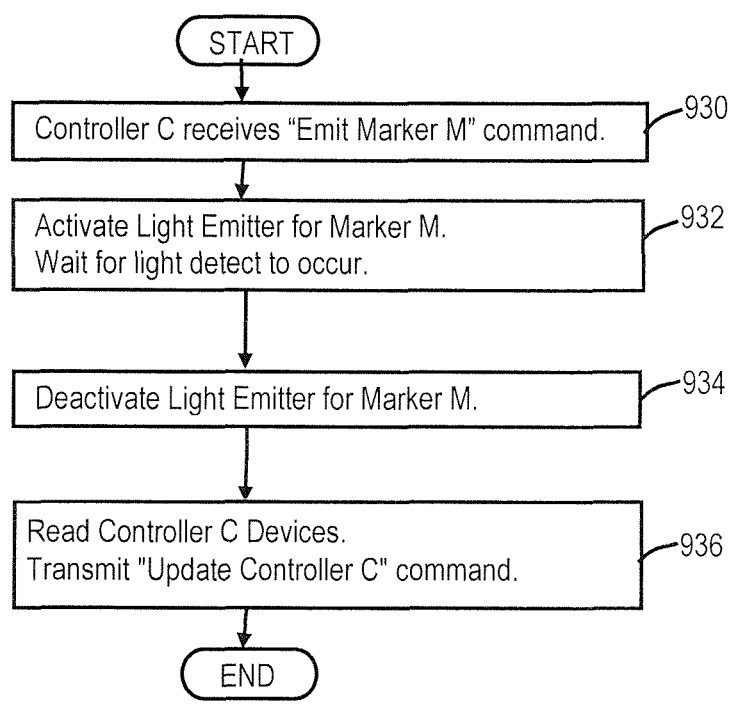
FIG. 30B is a flow diagram of a method for illuminating a position marker for the system of FIG. 29.

FIGS. 30A and 30B present methods that compute the positions of all controllers and displays of the multi-image control system. The method of FIG. 30A may be invoked, for example, periodically every 1/30 of a second (e.g., as from FIG. 11, step 282). The method of FIG. 30A may be executed by the console control module (FIG. 29 reference numeral 250).

So starting with FIG. 30A, step 900, the console control module selects each controller from the Active Controller List, starting with controller C.

In step 902, the console control module selects each marker from the Active Marker List, starting with marker M.

In step 904, the console control module may transmit a system-wide "Emit Marker M" command along with a marker M identifier (e.g., "1") and a controller C identifier (e.g., "1") to start the light emit operation for position marker M. The control module may then wait for a pre-determined period of time (e.g., 1/1000 second) to ensure that marker M is illuminated by light.

The console control module then selects each display from the Active Display List, starting with display D.

Then in step 906, the console control module may clear display positions in the Display Object D to an UNSET state, such as Global Position[C,D], Aim Point[C,D], Display Outline[C,D], and Controller Display Outline[C,D].

Further, the control module sets a variable S equal to the light sensor identifier that has been associated with marker M and display D. If there are no light sensors associated with marker M and display D, then set the variable S to an UNSET state.

In step 907, if the console control module determines that S=UNSET, then skip to step 916. Otherwise, continue to step 908.

In step 908, the console control module may enable its light detect adapter to receive a view signal from an activated light sensor S. The activated light sensor S may use a shutter speed (e.g., 1/120 second) that allows capture of light from position marker M.

Further, the light detect adapter may receive and convert the view signal into a View V, which is an image forward of the light sensor. The console control module and light detect adapter may then segment and analyze View V for light blobs or brightly lit regions that uniquely identify marker M. (For similar techniques, see "Basic Operations of the Multi-Display Control System" section of the prior embodiment.)

In step 912, if View V contains marker M light blobs, continue to step 914. Otherwise, skip to step 916.

In step 914, the console control module may convert the light blobs into variables Global Position and Aim Point for controller C relative to display D. (For similar techniques, see "Computing a Controller Global Position" and "Computing a Controller Aim Point" section of the prior embodiment.)

The control module may also set a variable Display Outline for display D. That is, the control module maps the pre-determined Clipped Outline for display D (from FIG. 17A) to a Display Outline relative to the controller C Global Position. Coordinate mapping may computed, for example, using coordinate matrix transforms adapted from current art.

The control module may also set a variable Controller Display Outline of controller C. See section "Computing a Controller Display Outline" for more details.

In step 916, if the console control module determines more displays need processing, then select the next display D from the Active Display List and go back to step 906. Otherwise, continue to step 918.

In step 918, if the console control module determines more markers need processing, then select the next marker M from the Active Marker List and go back to step 904. Otherwise, continue to step 920.

In step 920, if the console control module determines more controllers need processing, then select the next controller C from the Active Controller List and go back to step 902. Otherwise, continue to step 922.

In step 922, the console control module may clip and align all display images, including remote displays and/or controller displays. This may be accomplished using a method with image clipping and aligning techniques (similar to FIG. 17A, steps 390 to 399) adapted from current art.

Finally, the control module may transmit an "Update All Displays" command along with copies of all active Display Objects for system-wide data synchronization.

Turning now to FIG. 30B, a method for the light emit operation is presented. A plurality of controllers with controller control modules may execute the light emit operation concurrently. However, to simplify the discussion, only one controller C will be mentioned.

So starting with step 930, a controller C (e.g., FIG. 29 reference numeral 700) and its controller control module (e.g., FIG. 29 reference numeral 150) may receive the "Emit Marker M" command (from step 904 of FIG. 30A) having controller C and marker M identifiers and immediately proceed to emit light. The control module may enable its light emit adapter to transmit a light emit signal to a light emitter (e.g., as shown in FIG. 29, reference numeral 242) and generating light for marker M. The control module may then wait for a pre-determined period of time (e.g., 1/100 second) for light detection to occur, then continues to step 934.

In step 934, the controller control module deactivates its light emit adapter, which deactivates the light emitter for marker M.

In step 936, the controller control module may read input signals from the controller C user input devices (e.g., keypad, control buttons, etc.) and motion sensor devices (e.g., accelerometer, etc.). The control module may then convert the input signals to input data, which is stored in the Controller C Object in memory.

Finally, the control module may transmit an "Update Controller C" command along with a copy of the Controller Object C for system-wide data synchronization. Once completed, the method ends.

The methods of FIGS. 30A and 30B suggest that all controller positions are computed for each marker in sequence, although alternative methods may compute positions in a different order.

Some alternative methods may distribute the operations to the control modules in a different manner as described by the methods of FIGS. 30A and 30B.

Some alternative methods may activate the light emit adapter and light emitters at control system start and never deactivate the light emit adapter and emitters, such as methods of an alternative control system comprised of uniquely identifiable markers.

Some alternative methods may use improved light detection. For example, a control module may retrieve a view V1 when a marker M is illuminated, and retrieve a view V2 when the marker M is not illuminated. The control module may then compute a view V3, for example, by digital image subtraction of views V1 and V2.

Alternative Configurations for the Multi-Image Control System

As presented in FIG. 29, the control system 650 may control and modify displays D1S, D2S, and D3S. In some alternative configurations, system 650 may control and modify one display, or a plurality of displays.

Further, in FIG. 29 the light sensors 160, 161, and 162 are associated with displays D1S, D2S, and D3S, respectively. However, in some alternative configurations the system may have one light sensor associated with a plurality of image displays. In other alternative configurations, the system may have a plurality of light sensors associated with one image display.

In another configuration, system 650 may have an alternative controller that relies on a passive marker. For example, an alternative controller similar to controller 700 may be constructed but its active marker M4 and array emitter 242 are replaced with a passive marker (similar to light reflector 248 of FIG. 1) attached to the front 107 of controller. Further, the system may optionally include at least one light emitter that remotely illuminates (with visible and/or invisible light) the passive marker attached to the alternative controller. Whereby, light sensors 160-162 may be able to track the alternative controller in space.

In another configuration, system 650 may have an alternative standalone controller, similar to controller 700 but substantially contained in its housing 105 is the display console 800. Whereby, controller 700 and console 800 may be integrated as a standalone controller with substantially combined capabilities.

Finally, all of the control system embodiments disclosed herein are not necessarily mutually exclusive in their construction and operation, for alternative embodiments may be constructed that combine, in whole or part, aspects of the disclosed embodiments.

Various alternatives and embodiments are contemplated as being within the scope of the following claims particularly pointing out and distinctly claiming the subject matter regarded as the invention.

I claim:

1. An interactive multiple display system, comprising:
  a controller movable through three dimensional space and including a first control module;
  a first display that presents a first image and having a first display outline;
  a second display that presents a second image and having a second display outline, wherein the first control module determines a first and a second positions of the controller relative to the first and second display outlines in the three dimensional space; and
  a display console including a second control module, wherein the first control module coordinates graphic rendering of the first image on the first display and the second control module coordinates graphic rendering of the second image on the second display such that the first and second images have coordinated and related graphics, and wherein the first control module communicates with the second control module such that the second control module receives the determined first and second positions of the controller relative to the first and second display outlines from the first control module and the first control module modifies the graphic rendering of the first image when the controller is aimed toward the first display outline and the second control module modifies the graphic rendering of the second image when the controller is aimed toward the second display outline.

2. The interactive multiple display system of claim 1, wherein when the first image is modified, the first control module generates and coordinates a first audio effect related to the first image, and when the second image is modified, the second control module generates and coordinates a second audio effect related to the second image.

3. The interactive multiple display system of claim 1, wherein when the first image is modified, the first control module generates and coordinates a first haptic effect related to the first image, and when the second image is modified, the second control module generates and coordinates a second haptic effect related to the second image.

4. The interactive multiple display system of claim 1, wherein the first and second display images are modified such that an at least partially aligned and combined image is formed.

5. The interactive multiple display system of claim 1, wherein the first and second display images are modified such that at least partially aligned and separated images are formed.

6. The interactive multiple display system of claim 1, wherein the controller includes a light detect adapter operatively connected to at least one light sensor.

7. The interactive multiple display system of claim 1, wherein the controller includes a light detect adapter operatively connected to at least one light sensor and the display console includes a light emit adapter operatively connected to at least one light emitter.

8. The interactive multiple display system of claim 1, further comprising:
   a first light emitter that illuminates a first position marker substantially nearby or overlapping the first display; and
   a second light emitter that illuminates a second position marker substantially nearby or overlapping the second display.

9. The interactive multiple display system of claim 1, wherein the interactive multiple display system includes an at least one passive marker that is located substantially nearby or overlapping at least the first or the second display.

10. An interactive multiple display system, comprising:
    a controller movable through three dimensional space and including a first control module;
    a first display that presents a first image and having a first display outline;
    a second display that presents a second image and having a second display outline, wherein the first control module determines locations of the first and second display outlines in the three dimensional space relative to the controller; and
    a display console including a second control module, wherein the first control module coordinates graphic rendering of the first image on the first display and the second control module coordinates graphic rendering of the second image on the second display such that the first and second images have coordinated and related graphics, and wherein the first control module communicates with the second control module such that the second control module receives the determined locations of the first and second display outlines relative to the controller from the first control module and the first control module modifies the first image when the controller is aimed toward the first display outline, and the second control module modifies the second image when the controller is aimed toward the second display outline.

11. The interactive multiple display system of claim 10, wherein the controller includes a controller projector that presents the first image.

12. The interactive multiple display system of claim 11, wherein when the controller is aimed away from the vicinity of the second display outline, the controller project presents the first image as an at least partially lighted image on a projection surface.

13. The interactive multiple display system of claim 11, wherein when the controller is aimed towards the vicinity of the second display outline, the controller projector present the first image as a substantially unlit or dimmed image on a projection surface.

14. The interactive multiple display system of claim 11, wherein when the first image overlaps the second image, the interactive multiple display system clips the first image such that an at least portion of the first image does not appear on the second image.

15. The interactive multiple display system of claim 11, wherein when the first image is modified, the interactive multiple display system generates a first audio effect, and when the second image is modified, the system generates a second audio effect.

16. The interactive multiple display system of claim 11, wherein the second display is a panel display.

17. The interactive multiple display system of claim 11, wherein the first and second images are modified such that an at least partially aligned and combined image is formed.

18. The interactive multiple display system of claim 11, wherein the first and second images are modified such that at least partially aligned and separated images are formed.

19. The interactive multiple display system of claim 10, wherein the controller includes a light detect adapter operatively connected to at least one light sensor.

20. The interactive multiple display system of claim 10, wherein the display console includes a light emit adapter operatively connected to at least one light emitter.

21. A method of controlling multiple image displays, the method comprising:
    illuminating a position marker substantially nearby or overlapping a first display including a first image using a light emitter;
    determining a first display outline of the first display;
    detecting a position of a controller relative to the position marker using a light sensor;
    transmitting a view signal from the light sensor to a control module, the view signal being indicative of the position of the controller relative to the first display outline;
    determining if the controller is aimed toward the vicinity of the first display outline or away from the vicinity of the first display outline; and
    coordinating graphic rendering of the first image on the first display and a second image on a second display, wherein the second image is generated on a projection surface when the controller is aimed away from the vicinity of the first display outline such that the first and second images have coordinated and related graphics as the controller is moved through space.

22. The method of claim 21 wherein when the first image is modified, a first audio effect is generated and when the second image is modified, a second audio effect is generated.

23. The method of claim 21 wherein when the first image is modified a first haptic effect is generated and when the second image is modified, a second haptic effect is generated.

24. A method of controlling multiple image displays, the method comprising:
    illuminating a first position marker substantially near or overlapping a first display including a first image using a first light emitter;
    illuminating a second position marker substantially near or overlapping a second display including a second image using a second light emitter;
    moving a controller through three dimensional space, wherein the controller includes a first control module;
    determining a first position of the controller relative to the first display outline of the first display and a second position of the controller relative to the second display outline of the second display, wherein the first and second locations are determined by the first control module;

communicating the first and second positions of the controller to a second control module, wherein a display console includes the second control module;

modifying a first image of the first display when the controller is aimed toward the first display outline, wherein the first image is modified by the first control module; and modifying a second image of the second display when the controller is aimed toward the second display outline, wherein the second image is modified by the second control module.

25. The method of claim 24, wherein the first display is generated by a controller projector.

26. The method of claim 24, wherein when the controller is aimed away from the vicinity of the second display outline, the controller projector presents the first image as an at least partially lighted image on a projection surface.

27. The method of claim 24, wherein the first and second images are modified such that an at least partially aligned and combined image is formed.

28. The method of claim 24, wherein the second image is modified and clipped such that an at least portion of the second image does not appear on the first image.

* * * * *